US012531007B2

(12) United States Patent
Friedman et al.

(10) Patent No.: US 12,531,007 B2
(45) Date of Patent: Jan. 20, 2026

(54) ANALOG VIDEO TRANSPORT TO A DISPLAY PANEL AND SOURCE DRIVER INTEGRATION WITH DISPLAY PANEL

(71) Applicant: HYPHY USA Inc., San Jose, CA (US)

(72) Inventors: Eyal Friedman, Cheltenham (AU); Robert J. Clarke, Rose Park (AU); Alex Henzen, NM Bladel (NL); Dean Rubine, Lee, NH (US); Todd Rockoff, Holgate (AU)

(73) Assignee: HYPHY USA Inc., San Jose, CA (US)

( * ) Notice: Subject to any disclaimer, the term of this patent is extended or adjusted under 35 U.S.C. 154(b) by 0 days.

(21) Appl. No.: 18/442,491

(22) Filed: Feb. 15, 2024

(65) Prior Publication Data

US 2024/0282241 A1 Aug. 22, 2024

Related U.S. Application Data

(60) Provisional application No. 63/625,473, filed on Jan. 26, 2024, provisional application No. 63/611,274, (Continued)

(51) Int. Cl.
*G09G 3/20* (2006.01)

(52) U.S. Cl.
CPC ... *G09G 3/2096* (2013.01); *G09G 2300/0408* (2013.01); *G09G 2310/0275* (2013.01); (Continued)

(58) Field of Classification Search
CPC ......... G09G 3/2096; G09G 2300/0408; G09G 2310/0275; G09G 2310/0291; G09G 2310/0294; G09G 2370/00
See application file for complete search history.

(56) References Cited

U.S. PATENT DOCUMENTS 3,204,035 A 8/1965 Ballard et al.
3,795,765 A 3/1974 DeGroat et al.
(Continued)

FOREIGN PATENT DOCUMENTS

CN 101933277 12/2010
CN 101969319 2/2011
(Continued)

OTHER PUBLICATIONS

English Translation of CN 102314021 (Year: 2012).*
(Continued)

*Primary Examiner* — Patrick N Edouard
*Assistant Examiner* — Eboni N Giles
(74) *Attorney, Agent, or Firm* — Beyer Law Group LLP

(57) ABSTRACT

A transmitter includes a distributor that receives a stream of digital video samples and distributes the digital video samples into vectors in a buffer per a permutation. A digital-to-analog converter (DAC) per vector receives from its corresponding vector the digital video samples and converts the digital video samples into analog video samples. A wiring harness transports each series of analog video samples to a source driver of a display panel of a display unit. Each source driver includes a collector that receives analog video samples from each DAC and stores the analog video samples of the corresponding vector, and amplifiers that receive the stored analog video samples in parallel from the collector and amplifies the stored analog video samples onto a column of the display panel. Synchronization uses modified MFM and sample phase alignment. The source drivers are integrated with the substrate of the display panel using transistors.

16 Claims, 40 Drawing Sheets

Related U.S. Application Data filed on Dec. 18, 2023, provisional application No. 63/516,220, filed on Jul. 28, 2023, provisional application No. 63/500,341, filed on May 5, 2023, provisional application No. 63/447,241, filed on Feb. 21, 2023.

(52) U.S. Cl.
CPC ............... *G09G 2310/0291* (2013.01); *G09G 2310/0294* (2013.01); *G09G 2370/00* (2013.01)

(56) References Cited

U.S. PATENT DOCUMENTS

| | | | | |
|---|---|---|---|---|
| 5,793,759 | A | 8/1998 | Rakib et al. | |
| 5,796,774 | A | 8/1998 | Kato | |
| 5,870,414 | A | 2/1999 | Chaib et al. | |
| 5,936,997 | A | 8/1999 | Kanda | |
| 5,938,787 | A | 8/1999 | Stark et al. | |
| 5,956,333 | A | 9/1999 | Zhou et al. | |
| 5,966,376 | A | 10/1999 | Rakib et al. | |
| 6,018,547 | A | 1/2000 | Arkhipkin | |
| 6,128,309 | A | 10/2000 | Tariki et al. | |
| 6,154,456 | A | 11/2000 | Rakib et al. | |
| 6,289,039 | B1 | 9/2001 | Garodnick | |
| 6,310,923 | B1 | 10/2001 | Lee et al. | |
| 6,456,607 | B2 | 9/2002 | Arai et al. | |
| 6,480,559 | B1 | 11/2002 | Dabak et al. | |
| 6,751,247 | B1 | 6/2004 | Zhengdi | |
| 6,763,009 | B1 | 7/2004 | Bedekar et al. | |
| 6,956,891 | B2 | 10/2005 | Tan et al. | |
| 7,710,910 | B2 | 5/2010 | Ode et al. | |
| 7,793,022 | B2 | 9/2010 | Travers et al. | |
| 7,796,575 | B2 | 9/2010 | Lim et al. | |
| 7,873,097 | B1 | 1/2011 | Luecke et al. | |
| 7,873,980 | B2 | 1/2011 | Horan et al. | |
| 7,908,634 | B2 | 3/2011 | Keady et al. | |
| 7,937,605 | B2 | 5/2011 | Rea et al. | |
| 7,996,584 | B2 | 8/2011 | Keady et al. | |
| 8,073,647 | B2 | 12/2011 | Horan et al. | |
| 8,094,700 | B2 | 1/2012 | Okazaki | |
| 8,272,023 | B2 | 9/2012 | Horan et al. | |
| 8,280,668 | B2 | 10/2012 | Horan et al. | |
| 8,295,296 | B2 | 10/2012 | Keady et al. | |
| 8,369,794 | B1 | 2/2013 | Bharghavan et al. | |
| RE44,199 | E | 5/2013 | Garodnick | |
| 8,520,776 | B2 | 8/2013 | Rea et al. | |
| 8,546,688 | B2 | 10/2013 | Horan et al. | |
| 8,674,223 | B2 | 3/2014 | Horan et al. | |
| 8,674,224 | B2 | 3/2014 | Horan et al. | |
| 8,674,225 | B2 | 3/2014 | Horan et al. | |
| 8,674,226 | B2 | 3/2014 | Horan et al. | |
| 8,680,395 | B2 | 3/2014 | Horan et al. | |
| 8,705,588 | B2 | 4/2014 | Odenwalder | |
| 9,324,478 | B2 | 4/2016 | Horan et al. | |
| 9,970,768 | B2 | 5/2018 | Monroe et al. | |
| 10,158,396 | B2 | 12/2018 | Hannebauer et al. | |
| 10,763,914 | B2 | 9/2020 | Hannebauer et al. | |
| 11,025,292 | B2 | 6/2021 | Hannebauer et al. | |
| 11,394,422 | B2 | 7/2022 | Hannebauer et al. | |
| 11,463,125 | B2 | 10/2022 | Hannebauer et al. | |
| 11,716,114 | B2 | 8/2023 | Hannebauer | |
| 2002/0013926 | A1 | 1/2002 | Kim et al. | |
| 2002/0097779 | A1 | 7/2002 | Bang et al. | |
| 2002/0154620 | A1 | 10/2002 | Azenkot et al. | |
| 2002/0162074 | A1 | 10/2002 | Bickerstaff | |
| 2003/0139178 | A1 | 7/2003 | Uesugi et al. | |
| 2004/0120415 | A1 | 6/2004 | Song et al. | |
| 2005/0069020 | A1 | 3/2005 | Lakkis | |
| 2006/0080711 | A1 | 4/2006 | Kim | |
| 2006/0109228 | A1 | 5/2006 | Kang | |
| 2008/0084920 | A1 | 4/2008 | Okazaki | |
| 2008/0106306 | A1 | 5/2008 | Keady et al. | |
| 2009/0040167 | A1* | 2/2009 | Sun | G09G 3/3696 345/99 |
| 2009/0046044 | A1* | 2/2009 | Chen | G09G 3/3688 345/87 |
| 2010/0013579 | A1 | 1/2010 | Horan et al. | |
| 2010/0091990 | A1 | 4/2010 | Etemad et al. | |
| 2010/0142723 | A1 | 6/2010 | Bucklen | |
| 2010/0321591 | A1 | 12/2010 | Onomatsu | |
| 2011/0037574 | A1 | 2/2011 | Pratt et al. | |
| 2011/0044409 | A1 | 2/2011 | Yoshimoto et al. | |
| 2011/0169870 | A1 | 7/2011 | Yang et al. | |
| 2012/0014464 | A1 | 1/2012 | Eiger et al. | |
| 2012/0047229 | A1 | 2/2012 | Bennett | |
| 2012/0106651 | A1 | 5/2012 | Wang | |
| 2013/0194284 | A1 | 8/2013 | Bi | |
| 2014/0028645 | A1 | 1/2014 | Yamazaki et al. | |
| 2014/0077706 | A1 | 3/2014 | Aldrich et al. | |
| 2014/0218616 | A1 | 8/2014 | Toba et al. | |
| 2014/0340431 | A1 | 11/2014 | Yamakawa | |
| 2015/0014712 | A1 | 1/2015 | Kim et al. | |
| 2016/0127087 | A1 | 5/2016 | Feher | |
| 2016/0163277 | A1 | 6/2016 | Ludden et al. | |
| 2018/0027257 | A1 | 1/2018 | Izumi et al. | |
| 2018/0211620 | A1 | 7/2018 | Kurokawa et al. | |
| 2018/0212646 | A1 | 7/2018 | Hannebauer et al. | |
| 2018/0268780 | A1* | 9/2018 | Bae | G09G 5/026 |
| 2018/0337687 | A1 | 11/2018 | Adjiwibawa et al. | |
| 2019/0088227 | A1 | 3/2019 | Matsumoto | |
| 2019/0174027 | A1 | 6/2019 | Lv et al. | |
| 2019/0260629 | A1 | 8/2019 | Nikopour et al. | |
| 2019/0342564 | A1 | 11/2019 | Kurokawa | |
| 2020/0014419 | A1 | 1/2020 | Hannebauer et al. | |
| 2020/0043440 | A1 | 2/2020 | Qiu et al. | |
| 2020/0359006 | A1 | 11/2020 | Yanagi et al. | |
| 2021/0203904 | A1 | 7/2021 | Wetzstein et al. | |
| 2021/0327366 | A1 | 10/2021 | Maeda et al. | |
| 2021/0398470 | A1 | 12/2021 | Kim et al. | |
| 2022/0101799 | A1 | 3/2022 | Lee et al. | |
| 2022/0190872 | A1 | 6/2022 | Hannebauer | |
| 2022/0302953 | A1 | 9/2022 | Hannebauer et al. | |
| 2022/0368369 | A1 | 11/2022 | Hannebauer et al. | |
| 2022/0397931 | A1 | 12/2022 | Song et al. | |
| 2023/0048629 | A1 | 2/2023 | Friedman | |
| 2023/0119029 | A1* | 4/2023 | Oh | G09G 3/3291 345/204 |
| 2023/0139147 | A1* | 5/2023 | Chae | G09G 3/3291 345/55 |
| 2023/0223981 | A1 | 7/2023 | Hannebauer | |
| 2023/0230559 | A1 | 7/2023 | Friedman | |
| 2023/0327702 | A1 | 10/2023 | Hannebauer et al. | |
| 2024/0212576 | A1* | 6/2024 | Lee | G09G 3/2007 |
| 2025/0069565 | A1 | 2/2025 | Friedman et al. | |
| 2025/0124652 | A1 | 4/2025 | Friedman et al. | |

FOREIGN PATENT DOCUMENTS

| | | |
|---|---|---|
| CN | 101917209 | 7/2015 |
| CN | 210390948 | 4/2020 |
| EP | 0 727 881 | 8/1996 |
| EP | 1 079 536 | 2/2001 |
| EP | 1 968 324 | 9/2008 |
| EP | 3979229 | 4/2022 |
| JP | 08293818 | 11/1996 |
| JP | H09312590 | 12/1997 |
| JP | 2001-144653 | 5/2001 |
| JP | 2001156861 | 6/2001 |
| JP | 2001510658 | 7/2001 |
| JP | 2002281545 | 9/2002 |
| JP | 2007-150971 | 6/2007 |
| JP | 2011003331 | 6/2011 |
| KR | 10-2019-0026701 | 3/2019 |
| WO | WO 97/02663 | 1/1997 |
| WO | WO 98/52365 | 11/1998 |
| WO | WO 2007/075052 | 7/2007 |
| WO | 2010/106330 | 9/2010 |
| WO | 2018-170546 | 9/2010 |

(56) References Cited

FOREIGN PATENT DOCUMENTS

| | | |
|---|---|---|
| WO | WO 2012/007785 | 1/2012 |
| WO | WO 2017/049347 | 3/2017 |

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.
Van der Heijden, "An Analog Correlator for a High Speed DS-CDMA Modem", Eindhoven University of Technology, Department of Electrical Engineering Telecommunication Technology and Electromagnetics, 1998, 65 pages.
Shanmugam et al., "An Analog Spread-Spectrum Interface for Power-Line Data Communication in Home Networking", IEEE transactions on Power Delivery, vol. 20, No. 1, Jan. 2005.
Immink, "Construction of DC-free Codes Using the fast Hadamard Transform", Nov. 7, 2001, 6 pages.
International Search Report and Written Opinion dated May 31, 2024 from International Application No. PCT/US2024/016006.
Supplementary European Search Report dated Mar. 17, 2025, from European Application No. EP24724073.

* cited by examiner

SOURCE DRIVER ARCHITECTURE

RGB Sub-pixel Indices Collected by Each S/H Amplifier of a Source Driver

800

804

Control

| S/H Amplifier Number \ Subpixel Order | 0 | 1 | 2 | 3 |
|---|---|---|---|---|
| 0 | 0 | 16 | 32 | 48 |
| 1 | 1 | 17 | 33 | 49 |
| 2 | 2 | 18 | 34 | 50 |
| 3 | 3 | 19 | 35 | 51 |
| 4 | 4 | 20 | 36 | 52 |
| 5 | 5 | 21 | 37 | 53 |
| 6 | 6 | 22 | 38 | 54 |
| 7 | 7 | 23 | 39 | 55 |
| 8 | 8 | 24 | 40 | 56 |
| 9 | 9 | 25 | 41 | 57 |
| 10 | 10 | 26 | 42 | 58 |
| 11 | 11 | 27 | 43 | 59 |
| 12 | 12 | 28 | 44 | 60 |
| 13 | 13 | 29 | 45 | 61 |
| 14 | 14 | 30 | 46 | 62 |
| 15 | 15 | 31 | 47 | 63 |

Red Sub-Pixels

| S/H Amplifier Number \ Subpixel Order | 0 | 1 | 2 | | 17 | 18 | 19 |
|---|---|---|---|---|---|---|---|
| 0 | 0 | 48 | 96 | | 816 | 864 | 912 |
| 1 | 3 | 51 | 99 | | 819 | 867 | 915 |
| 2 | 6 | 54 | 102 | | 822 | 870 | 918 |
| 3 | 9 | 57 | 105 | | 825 | 873 | 921 |
| 4 | 12 | 60 | 108 | | 828 | 876 | 924 |
| 5 | 15 | 63 | 111 | | 831 | 879 | 927 |
| 6 | 18 | 66 | 114 | | 834 | 882 | 930 |
| 7 | 21 | 69 | 117 | | 837 | 885 | 933 |
| 8 | 24 | 72 | 120 | ..... | 840 | 888 | 936 |
| 9 | 27 | 75 | 123 | | 843 | 891 | 939 |
| 10 | 30 | 78 | 126 | | 846 | 894 | 942 |
| 11 | 33 | 81 | 129 | | 849 | 897 | 945 |
| 12 | 36 | 84 | 132 | | 852 | 900 | 948 |
| 13 | 39 | 87 | 135 | | 855 | 903 | 951 |
| 14 | 42 | 90 | 138 | | 858 | 906 | 954 |
| 15 | 45 | 93 | 141 | | 861 | 909 | 957 |

Green Sub-Pixels

| S/H Amplifier Number \ Subpixel Order | 0 | 1 | 2 | | 17 | 18 | 19 |
|---|---|---|---|---|---|---|---|
| 0 | 1 | 49 | 97 | | 817 | 865 | 913 |
| 1 | 4 | 52 | 100 | | 820 | 868 | 916 |
| 2 | 7 | 55 | 103 | | 823 | 871 | 919 |
| 3 | 10 | 58 | 106 | | 826 | 874 | 922 |
| 4 | 13 | 61 | 109 | | 829 | 877 | 925 |
| 5 | 16 | 64 | 112 | | 832 | 880 | 928 |
| 6 | 19 | 67 | 115 | | 835 | 883 | 931 |
| 7 | 22 | 70 | 118 | | 838 | 886 | 934 |
| 8 | 25 | 73 | 121 | ..... | 841 | 889 | 937 |
| 9 | 28 | 76 | 124 | | 844 | 892 | 940 |
| 10 | 31 | 79 | 127 | | 847 | 895 | 943 |
| 11 | 34 | 82 | 130 | | 850 | 898 | 946 |
| 12 | 37 | 85 | 133 | | 853 | 901 | 949 |
| 13 | 40 | 88 | 136 | | 856 | 904 | 952 |
| 14 | 43 | 91 | 139 | | 859 | 907 | 955 |
| 15 | 46 | 94 | 142 | | 862 | 910 | 958 |

Blue Sub-Pixels

| S/H Amplifier Number \ Subpixel Order | 0 | 1 | 2 | | 17 | 18 | 19 |
|---|---|---|---|---|---|---|---|
| 0 | 2 | 50 | 98 | | 818 | 866 | 914 |
| 1 | 5 | 53 | 101 | | 821 | 869 | 917 |
| 2 | 8 | 56 | 104 | | 824 | 872 | 920 |
| 3 | 11 | 59 | 107 | | 827 | 875 | 923 |
| 4 | 14 | 62 | 110 | | 830 | 878 | 926 |
| 5 | 17 | 65 | 113 | | 833 | 881 | 929 |
| 6 | 20 | 68 | 116 | | 836 | 884 | 932 |
| 7 | 23 | 71 | 119 | | 839 | 887 | 935 |
| 8 | 26 | 74 | 122 | ..... | 842 | 890 | 938 |
| 9 | 29 | 77 | 125 | | 845 | 893 | 941 |
| 10 | 32 | 80 | 128 | | 848 | 896 | 944 |
| 11 | 35 | 83 | 131 | | 851 | 899 | 947 |
| 12 | 38 | 86 | 134 | | 854 | 902 | 950 |
| 13 | 41 | 89 | 137 | | 857 | 905 | 953 |
| 14 | 44 | 92 | 140 | | 860 | 908 | 956 |
| 15 | 47 | 95 | 143 | | 863 | 911 | 959 |

802

FIG. 11

810

RGB Sub-pixel Indices Collected
by Each S/H Amplifier of a Source Driver

814

| Subpixel Order | | Red Sub-Pixels | | | | | | | Green Sub-Pixels | | | | | | | Blue Sub-Pixels | | | | | | |
|---|---|---|---|---|---|---|---|---|---|---|---|---|---|---|---|---|---|---|---|---|---|---|
| SHA Amplifier Number | 0 | 0 | 15 | 30 | | 285 | 300 | 315 | 1 | 16 | 31 | | 286 | 301 | 316 | 2 | 17 | 32 | | 287 | 302 | 317 |
| | 1 | 3 | 18 | 33 | | 288 | 303 | 318 | 4 | 19 | 34 | | 289 | 304 | 319 | 5 | 20 | 35 | | 290 | 305 | 320 |
| | 2 | 6 | 21 | 36 | ..... | 291 | 306 | 321 | 7 | 22 | 37 | ..... | 292 | 307 | 322 | 8 | 23 | 38 | ..... | 293 | 308 | 323 |
| | 3 | 9 | 24 | 39 | | 294 | 309 | 324 | 10 | 25 | 40 | | 295 | 310 | 325 | 11 | 26 | 41 | | 296 | 311 | 326 |
| | 4 | 12 | 27 | 42 | | 297 | 312 | 327 | 13 | 28 | 43 | | 298 | 313 | 328 | 14 | 29 | 44 | | 299 | 314 | 329 |
| | 5 | 321 | 336 | 351 | | 606 | 621 | 636 | 322 | 337 | 352 | | 607 | 622 | 637 | 323 | 338 | 353 | | 608 | 623 | 638 |
| | 6 | 324 | 339 | 354 | | 609 | 624 | 639 | 325 | 340 | 355 | | 610 | 625 | 640 | 326 | 341 | 356 | | 611 | 626 | 641 |
| | 7 | 327 | 342 | 357 | ..... | 612 | 627 | 642 | 328 | 343 | 358 | ..... | 613 | 628 | 643 | 329 | 344 | 359 | ..... | 614 | 629 | 644 |
| | 8 | 330 | 345 | 360 | | 615 | 630 | 645 | 331 | 346 | 361 | | 616 | 631 | 646 | 332 | 347 | 362 | | 617 | 632 | 647 |
| | 9 | 333 | 348 | 117 | | 618 | 633 | 648 | 334 | 349 | 118 | | 619 | 634 | 649 | 335 | 350 | 119 | | 620 | 635 | 650 |
| | 10 | 642 | 657 | 672 | | 927 | 942 | 957 | 640 | 658 | 673 | | 928 | 943 | 958 | 641 | 659 | 674 | | 929 | 944 | 959 |
| | 11 | 645 | 660 | 675 | | 930 | 945 | 960 | 646 | 661 | 676 | | 931 | 946 | 961 | 647 | 662 | 677 | | 932 | 947 | 962 |
| | 12 | 648 | 663 | 678 | ..... | 933 | 948 | 963 | 649 | 664 | 679 | ..... | 934 | 949 | 964 | 650 | 665 | 680 | ..... | 935 | 950 | 965 |
| | 13 | 651 | 666 | 681 | | 936 | 951 | 966 | 652 | 667 | 682 | | 937 | 952 | 967 | 653 | 668 | 683 | | 938 | 953 | 968 |
| | 14 | 654 | 669 | 684 | | 939 | 954 | 969 | 655 | 670 | 685 | | 940 | 955 | 970 | 656 | 671 | 686 | | 941 | 956 | 971 |
| | 15 | 0 | 1 | 2 | ..... | 19 | 20 | 21 | 22 | 23 | 24 | ..... | 41 | 42 | 43 | 44 | 45 | 46 | ..... | 63 | 64 | 65 |
| | | 0 | 1 | 2 | | 19 | 20 | 21 | 0 | 1 | 2 | | 19 | 20 | 21 | 0 | 1 | 2 | | 19 | 20 | 21 |
| | | 0 | | | | | | | 1 | | | | | | | 2 | | | | | | |

ControlTrack

816

812

FIG. 12A

815

RGB Sub-Pixel Indices Collected by Each S/H Amplifier of a Source Driver

| Subpixel Order | | Red Sub-Pixels | | | | | | | | Green Sub-Pixels | | | | | | | | Blue Sub-Pixels | | | | | | | | |
|---|---|---|---|---|---|---|---|---|---|---|---|---|---|---|---|---|---|---|---|---|---|---|---|---|---|---|
| SHA Amplifier Number | 0 | 0 | 1 | 2 | 3 | ... | 18 | 19 | 19 | 21 | 22 | 23 | 24 | ... | 40 | 41 | 42 | 43 | 44 | 45 | 46 | ... | 62 | 63 | 64 |
| | 1 | ***tr0*** | 30 | 75 | 120 | | 795 | 840 | 885 | 930 | 1 | 46 | 91 | | 811 | 856 | 901 | 946 | 17 | 62 | 107 | | 827 | 872 | 917 |
| | 2 | ***tr1*** | 33 | 78 | 123 | | 798 | 843 | 888 | 933 | 4 | 49 | 94 | | 814 | 859 | 904 | 949 | 20 | 65 | 110 | | 830 | 875 | 920 |
| | 3 | ***tr2*** | 36 | 81 | 126 | | 801 | 846 | 891 | 936 | 7 | 52 | 97 | | 817 | 862 | 907 | 952 | 23 | 68 | 113 | | 833 | 878 | 923 |
| | 4 | ***tr3*** | 39 | 84 | 129 | | 804 | 849 | 894 | 939 | 10 | 55 | 100 | | 820 | 865 | 910 | 955 | 26 | 71 | 116 | | 836 | 881 | 926 |
| | 5 | ***tr4*** | 42 | 87 | 132 | | 807 | 852 | 897 | 942 | 13 | 58 | 103 | | 823 | 868 | 913 | 958 | 29 | 74 | 119 | | 839 | 884 | 929 |
| | 6 | 0 | 45 | 90 | 135 | | 810 | 855 | 900 | 945 | 16 | 61 | 106 | | 826 | 871 | 916 | ***tb0*** | 32 | 77 | 122 | | 842 | 887 | 932 |
| | 7 | 3 | 48 | 93 | 138 | | 813 | 858 | 903 | 948 | 19 | 64 | 109 | | 829 | 874 | 919 | ***tb1*** | 35 | 80 | 125 | | 845 | 890 | 935 |
| | 8 | 6 | 51 | 96 | 141 | | 816 | 861 | 906 | 951 | 22 | 67 | 112 | | 832 | 877 | 922 | ***tb2*** | 38 | 83 | 128 | | 848 | 893 | 938 |
| | 9 | 9 | 54 | 99 | 144 | | 819 | 864 | 909 | 954 | 25 | 70 | 115 | | 835 | 880 | 925 | ***tb3*** | 41 | 86 | 131 | | 851 | 896 | 941 |
| | 10 | 12 | 57 | 102 | 147 | | 822 | 867 | 912 | 957 | 28 | 73 | 118 | | 838 | 883 | 928 | ***tb4*** | 44 | 89 | 134 | | 854 | 899 | 944 |
| | 11 | 15 | 60 | 105 | 150 | | 825 | 870 | 915 | ***tg0*** | 31 | 76 | 121 | | 841 | 886 | 931 | 2 | 47 | 92 | 137 | | 857 | 902 | 947 |
| | 12 | 18 | 63 | 108 | 153 | | 828 | 873 | 918 | ***tg1*** | 34 | 79 | 124 | | 844 | 889 | 934 | 5 | 50 | 95 | 140 | | 860 | 905 | 950 |
| | 13 | 21 | 66 | 111 | 156 | | 831 | 876 | 921 | ***tg2*** | 37 | 82 | 127 | | 847 | 892 | 937 | 8 | 53 | 98 | 143 | | 863 | 908 | 953 |
| | 14 | 24 | 69 | 114 | 159 | | 834 | 879 | 924 | ***tg3*** | 40 | 85 | 130 | | 850 | 895 | 940 | 11 | 56 | 101 | 146 | | 866 | 911 | 956 |
| | 15 | 27 | 72 | 117 | 162 | ... | 837 | 882 | 927 | ***tg4*** | 43 | 88 | 133 | ... | 853 | 898 | 943 | 14 | 59 | 104 | 149 | ... | 869 | 914 | 959 |

818

816

817

FIG. 12B

| S/H AMPLIFIER NUMBER | | | | | | | |
|---|---|---|---|---|---|---|---|
| 0 | 0 | 1 | 2 | | 61 | 62 | 63 |
| 1 | 64 | 65 | 66 | | 125 | 126 | 127 |
| 2 | 128 | 129 | 130 | | 189 | 190 | 191 |
| 3 | 192 | 193 | 194 | | 253 | 254 | 255 |
| 4 | 256 | 257 | 258 | | 317 | 318 | 319 |
| 5 | 320 | 321 | 322 | | 381 | 382 | 383 |
| 6 | 384 | 385 | 386 | | 445 | 446 | 447 |
| 7 | 448 | 449 | 450 | • • • | 509 | 510 | 511 |
| 8 | 512 | 513 | 514 | | 573 | 574 | 575 |
| 9 | 576 | 577 | 578 | | 637 | 638 | 639 |
| 10 | 640 | 641 | 642 | | 701 | 702 | 703 |
| 11 | 704 | 705 | 706 | | 765 | 766 | 767 |
| 12 | 768 | 769 | 770 | | 829 | 830 | 831 |
| 13 | 832 | 833 | 834 | | 893 | 894 | 895 |
| 14 | 896 | 897 | 898 | | 957 | 958 | 959 |
| 15 | 0 | 1 | 2 | • • • | 61 | 62 | 63 |

306

RGB SUB-PIXEL INDICES COLLECTED
BE EACH S/H AMPLIFIER OF A SOURCE DRIVER

RGB Sub-Pixels Indices
Collected by each S/HAmplifier of a
Source Driver

842 844 846

| SubpixelOrder | | RGB Sub-Pixels | | | | | | |
|---|---|---|---|---|---|---|---|---|
| SHA Amplifier Number | **0** | ctl0 | ctl1 | ctl2 | ***** | ctl61 | ctl62 | ctl63 |
| | **1** | 0 | 1 | 2 | | 61 | 62 | 63 |
| | **2** | 64 | 65 | 66 | | 125 | 126 | 127 |
| | **3** | 128 | 129 | 130 | | 189 | 190 | 191 |
| | **4** | 192 | 193 | 194 | | 253 | 254 | 255 |
| | **5** | 256 | 257 | 258 | | 317 | 318 | 319 |
| | **6** | 320 | 321 | 322 | | 381 | 382 | 383 |
| | **7** | 384 | 385 | 386 | | 445 | 446 | 447 |
| | **8** | 448 | 449 | 450 | ***** | 509 | 510 | 511 |
| | **9** | 512 | 513 | 514 | | 573 | 574 | 575 |
| | **10** | 576 | 577 | 578 | | 637 | 638 | 639 |
| | **11** | 640 | 641 | 642 | | 701 | 702 | 703 |
| | **12** | 704 | 705 | 706 | | 765 | 766 | 767 |
| | **13** | 768 | 769 | 770 | | 829 | 830 | 831 |
| | **14** | 832 | 833 | 834 | | 893 | 894 | 895 |
| | **15** | 896 | 897 | 898 | | 957 | 958 | 959 |
| | | 0 | 1 | 2 | ***** | 61 | 62 | 63 |

FIG. 17D

MFM Encoding in Control Sequence

Phase Alignment

Sampling PhaseAdjustment Circuit

Synchronization Flow Diagram

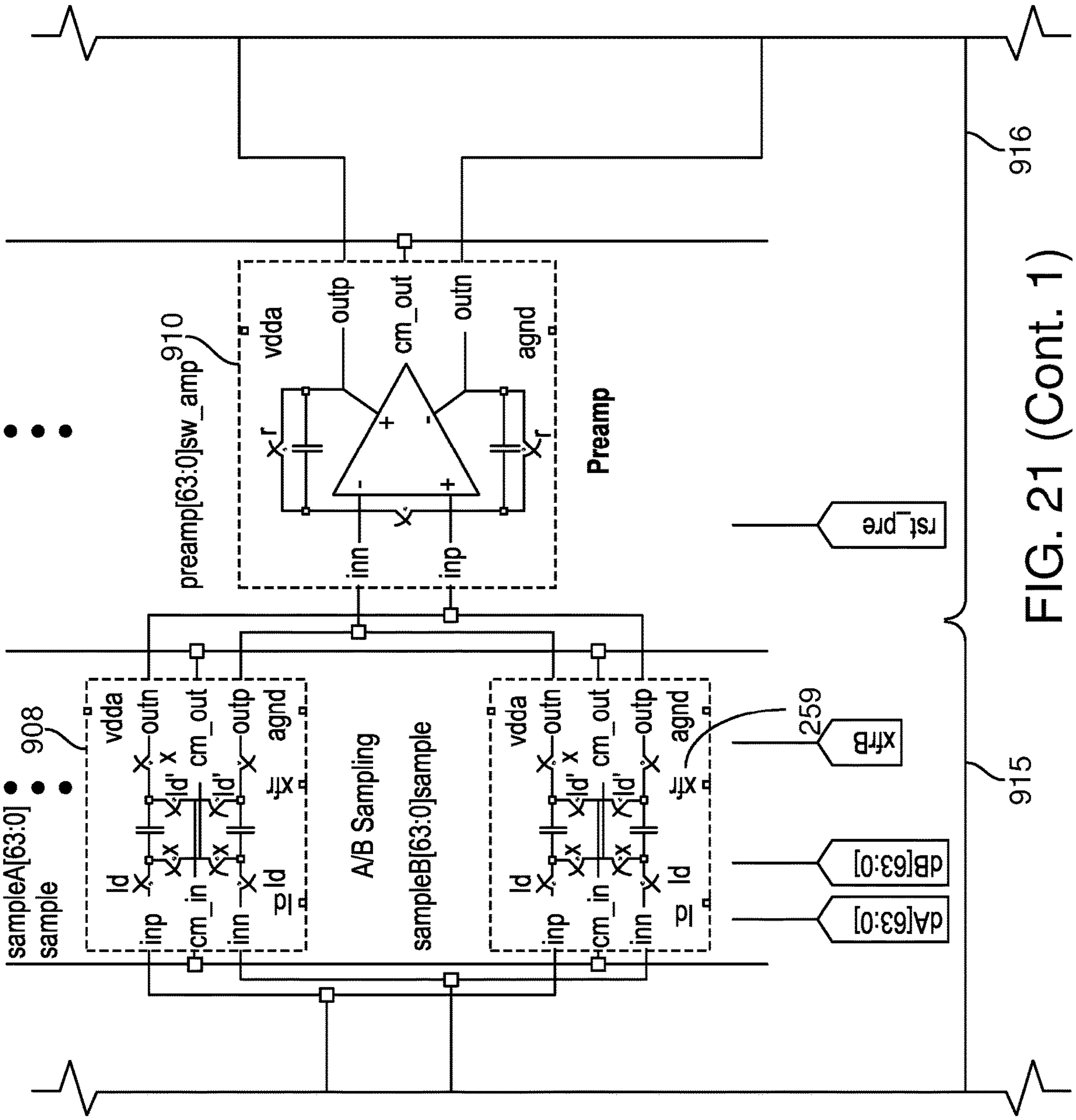
FIG. 21 (Cont. 1)

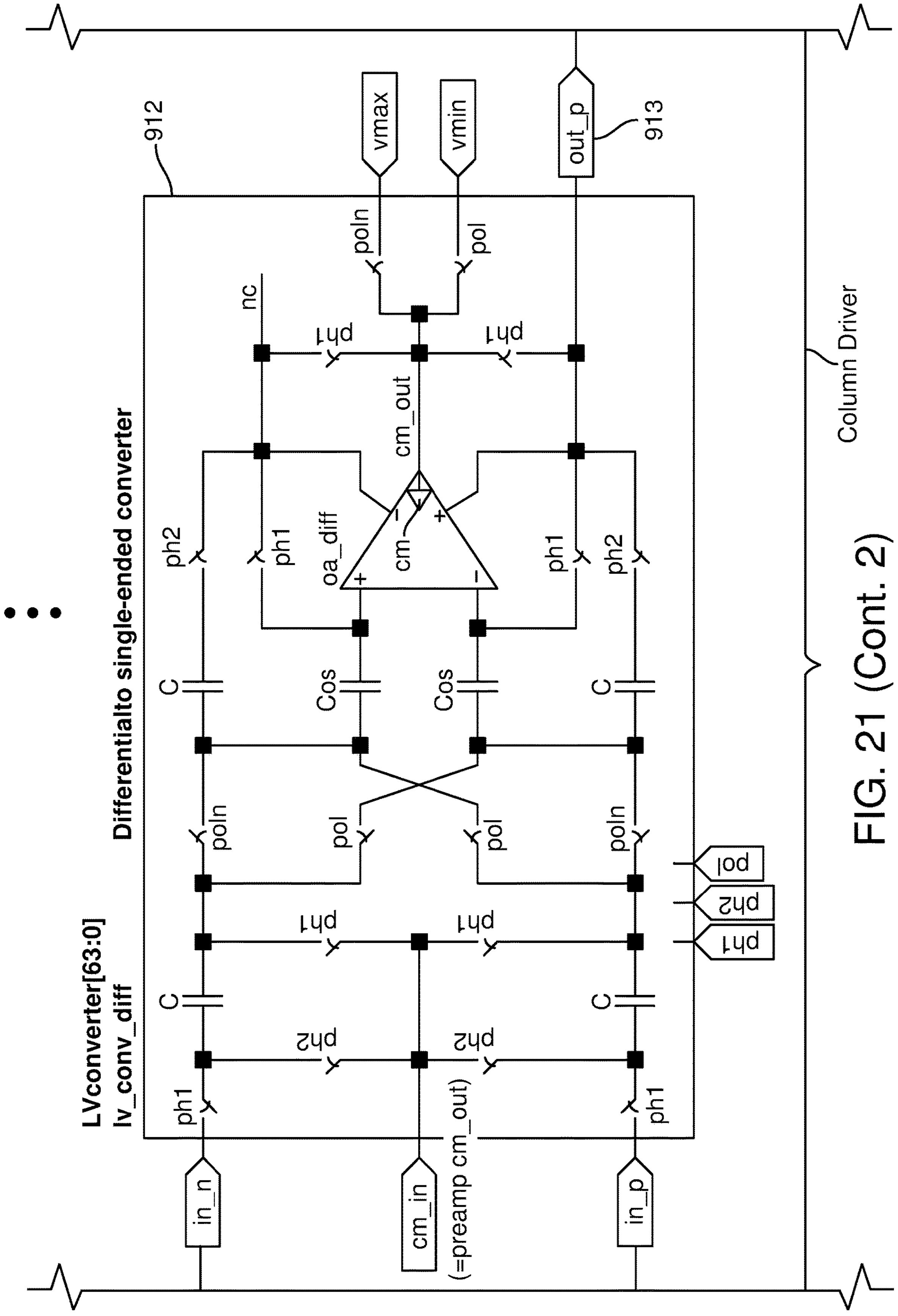
FIG. 21 (Cont. 2)

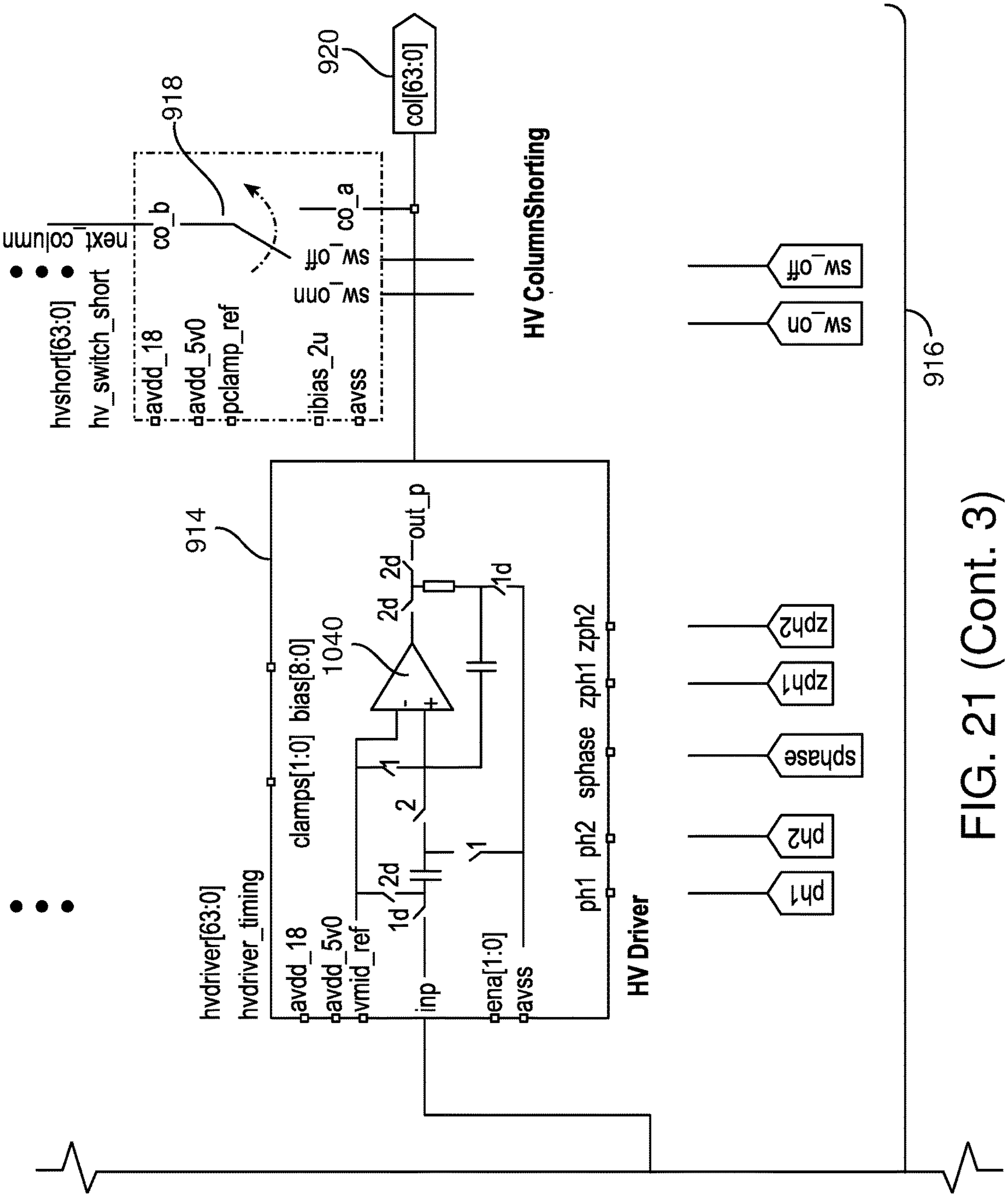
FIG. 21 (Cont. 3)

Smartphone Display with SAVT

Digital FeedbackArchitecture

Digital Feedback Detail

SAVT Transmitter

SAVT Receiver

ANALOG VIDEO TRANSPORT TO A DISPLAY PANEL AND SOURCE DRIVER INTEGRATION WITH DISPLAY PANEL

CROSS-REFERENCE TO RELATED APPLICATIONS

This application claims priority to U.S. provisional patent application Nos. 63/500,341 filed May 5, 2023, entitled "Analog Video Transport to a Display Panel and Source Driver Integration with a Display Panel" and 63/447,241 filed Feb. 21, 2023, entitled "Analog Video Transport to a Display Panel" which are both hereby incorporated by reference.

This application claims priority to U.S. provisional patent application Nos. 63/611,274 filed Dec. 18, 2023, entitled "VIDEO TRANSPORT WITHIN A MOBILE DEVICE" and 63/516,220 filed Jul. 28, 2023, which are both hereby incorporated by reference.

This application claims priority to U.S. provisional patent application No. 63/625,473 filed Jan. 26, 2024, entitled "Signal Transport Within Vehicles" which is hereby incorporated by reference.

This application incorporates by reference U.S. patent application Ser. No. 17/900,570 (HYFYP009), filed Aug. 31, 2022, U.S. patent application Ser. No. 18/098,612 (HYFYP013), filed Jan. 18, 2023, now U.S. Pat. No. 11,769, 468, and U.S. application Ser. No. 18/117,288 filed on Mar. 3, 2023, now U.S. Pat. No. 11,842,671.

This application incorporates by reference U.S. patent application Ser. No. 18/442,447 (HYFYP017), filed on an even date herewith.

FIELD OF THE INVENTION

The present invention relates generally to video transport. More specifically, the present invention relates to transporting analog video samples within a display unit or to a display unit, for example.

BACKGROUND OF THE INVENTION

Image sensors, display panels, and video processors are continually racing to achieve larger formats, greater color depth, higher frame rates, and higher resolutions. Local-site video transport includes performance-scaling bottlenecks that throttle throughput and compromise performance while consuming ever more cost and power. Eliminating these bottlenecks can provide advantages.

For instance, with increasing display resolution, the data rate of video information transferred from the video source to the display screen is increasing exponentially: from 3 Gbps a decade ago for full HD, to 160 Gbps for new 8K screens. Typically, a display having a 4K display resolution requires about 18 Gbps of bandwidth at 60 Hz while at 120 Hz 36 Gbps are needed (divided across P physical channels). And, an 8K display requires 72 Gbps at 60 Hz and 144 Gbps at 120 Hz.

Until now, the data is transferred digitally using variants of low-voltage differential signaling (LVDS) data transfer, using bit rates of 16 Gbps per signal pair, and parallelizing the pairs to achieve the required total bit rate. With a wiring delay of 5 ns/m, the wavelength of every bit on the digital connection is 12 mm, which is close to the limit of this type of connection and requires extensive data synchronization to obtain useable data. This digital information then needs to be converted to the analog pixel information on the fly using ultra-fast digital-to-analog (D-to-A) conversion at the source drivers of the display or using ultra-parallel slow conversion.

Nowadays, D-to-A converters use 8 bits; soon, D-to-A conversion may need 10 or even 12 bits and then it will become very difficult to convert accurately at a fast enough data rate. Thus, displays must do the D-to-A conversion in a very short amount of time, and the time being available for the conversion is also becoming shorter, resulting in stabilization of the D-to-A conversion also being an issue.

Accordingly, new apparatuses and techniques are desirable to eliminate the need for D-to-A conversion at a source driver of a display, to increase bandwidth, to utilize an analog video signal within a display unit, and to transport video signals in other locations.

SUMMARY OF THE INVENTION

To achieve the foregoing, and in accordance with the purpose of the present invention, a sampled analog video transport (SAVT) technique is disclosed that addresses the above deficiencies in the prior art. The technique may also be referred to as "clocked-analog video transport" or CAVT.

It is realized that the requirements for bit-perfect communication (e.g., text, spreadsheets) between computing devices are very different from those for communicating video content to humans for viewing. Fundamentally, as a video signal is a list of brightness values, it is realized that precisely maintaining fixed-bit-width (i.e., digital) brightness values is inefficient for video transport, and because there is no requirement for bit-accurate reproduction of these brightness values, analog voltages offer greater resolution. The unnecessary requirement for bit-perfect video transmission imposes a costly burden—a "digital overhead." Therefore, the present invention proposes to transport video signals as analog signals rather than as digital signals.

Whereas conventional digital transport uses expensive, mixed-signal processes for high-speed digital circuits, embodiments of the present invention make use of fully depreciated analog processes for greater flexibility and lower production cost. Further, using an analog signal for data transfer between a display controller (for example) and source drivers of a display panel reduces complexity when compared to traditional transport between a signal source (via LVDS or Vx1 transmitter) and a source driver receiver having D-to-A converters.

In one embodiment, a transmitter is disclosed that processes incoming digital video samples, converts them to analog, and transports them to a display panel; also disclosed is a source driver of a display panel that receives the analog samples and drives them on to the display panel. An analog signal is used to transmit the digital video data received from a video source (or storage device) to a video sink for display. The analog signal may originate at a transmitter of a computer (or other processor) and be delivered to source drivers of a display unit for display upon a display panel, thus originating outside of the display unit, or the analog signal may be generated at a transmitter within the display unit itself.

In an alternative embodiment, portions of the, or the entire, source driver, may be integrated with the glass substrate of the display panel given the necessary analog speed and accuracies. Prior art source drivers have been mounted at the edge of the display panel (but not integrated with it) because of the complexity of high-speed digital circuits, as well as the large area required for D-to-A conversion. The present invention is able to integrate source drivers with the glass itself because no D-to-A converters are required in the source drivers, no decoders are needed, and because of the lower frequency sample transfer of an SAVT signal; e.g., the SAVT video signal arrives at the source drivers at a frequency of one-tenth the data rate of a 3 GHz digital video signal.

The invention may be used on any active-matrix display substrate. Best suited are substrates with high mobility (e.g., low-temperature poly-silicon (LTPS) or oxide (IGZO) TFTs). The resulting display panel can be connected to the GPU by only an arbitrary length of signal cable and a power supply when the entire source driver is integrated. There is no need for further electronics connected to the glass, providing great opportunity for further edge width reduction and module thinning.

The invention is especially applicable to displays used in computer systems, televisions, monitors, game displays, home theater displays, retail signage, outdoor signage, etc. Embodiments of the invention are also applicable to video transport within vehicles such as within automobiles, trains, airplanes, ships, etc., and applies not only to video transport from a transmitter to displays or monitors of the vehicle, but also to video transport within such a display or monitor. The invention is also applicable to video transport to or within a mobile device such as a telephone. In a particular embodiment, the invention is useful within a display unit where it is used to transmit and receive video signals. By way of example, a transmitter of the invention may be used to implement the transmitter as described in U.S. Pat. No. 11,769,468 (HYFYP013), and a receiver of the invention may be used to implement the receiver as described in U.S. application Ser. No. 17/900,570 (HYFYP009).

BRIEF DESCRIPTION OF THE DRAWINGS

The invention, together with further advantages thereof, may best be understood by reference to the following description taken in conjunction with the accompanying drawings in which:

FIG. 11 illustrates a particular sub-pixel transmission order in which sub-pixels are grouped by color in order to minimize transmission bandwidth;

FIG. 12A illustrates a particular sub-pixel transmission order in which sub-pixels are still grouped by color in order to minimize transmission bandwidth and the control signals all arrive at one dedicated amplifier channel;

FIG. 12B illustrates a particular sub-pixel transmission order in which sub-pixels are grouped by color with a transition band between;

FIG. 17D is a summary of a sub-pixel order collected by the input amplifiers of FIG. 17C;

DETAILED DESCRIPTION OF THE INVENTION

Figure 1:
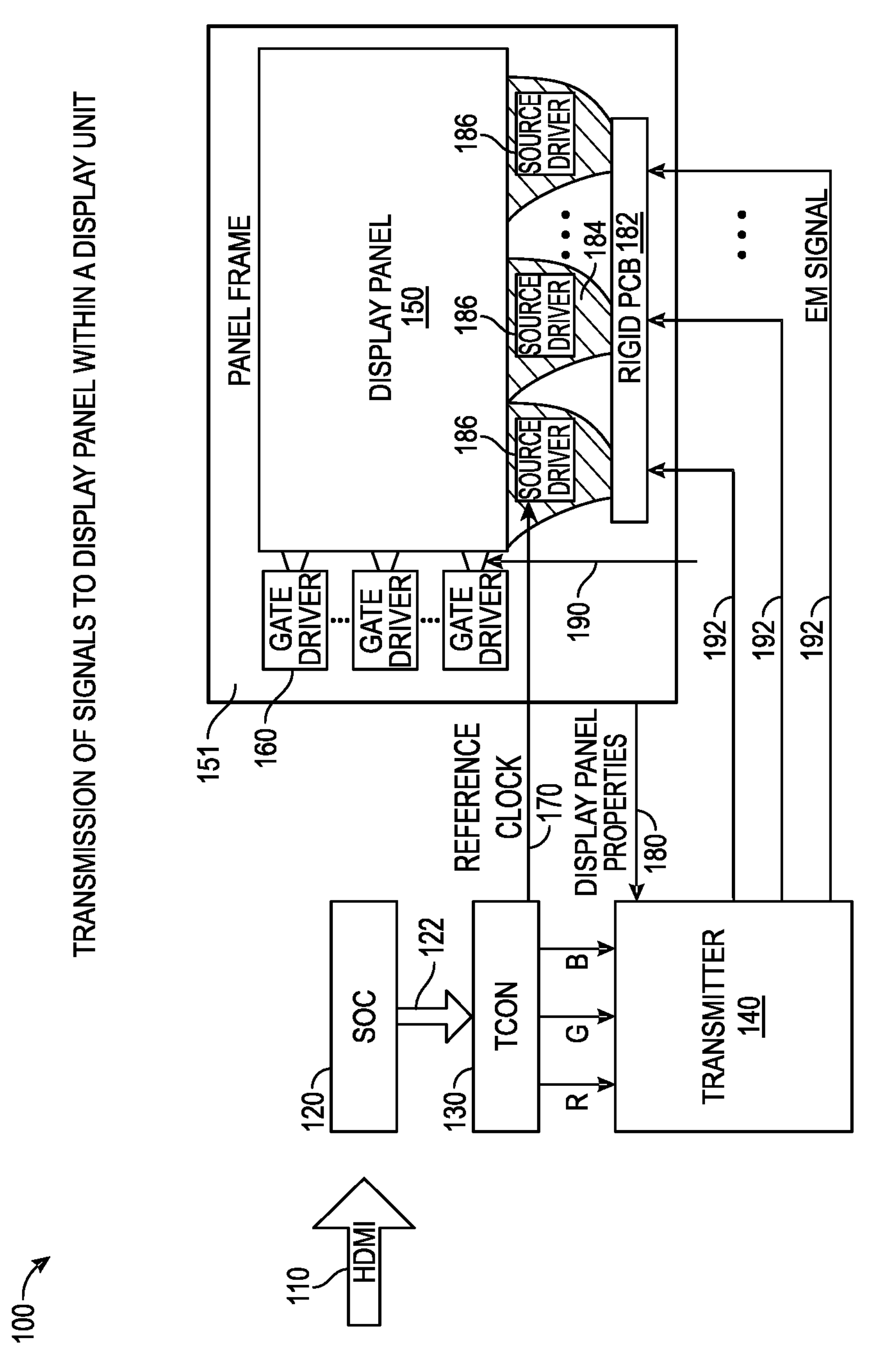
FIG. 1 illustrates delivery of electromagnetic (EM) analog signals to a display panel of a display unit using conversion within the display unit.

It is realized that the wiring loom in a display unit conforms closely to its design values, such that the resilience afforded by the use of spreading codes (to encode and decode video samples for transport within the display unit, such as is described in U.S. Pat. No. 10,158,396) may be outweighed by the circuit overhead of decoding at the source drivers. In particular, the use of spreading codes affords a degree of resilience against thermal noise in a transmitter's DAC and in the sample and hold amplifiers of a source driver. Nevertheless, it is realized that such thermal noise is stochastic and therefore should be imperceptible. Accordingly, in some applications spreading codes are not strictly necessary, obviating the need for encoding and then decoding in the source drivers. Accordingly, it is proposed to transmit video data as analog signals from a transmitter to any number of source drivers of a display panel.

It is further realized that digitization of a video signal typically takes place at the signal source of the system (often at a GPU) and then the digital signal is transferred, usually using a combination of high-performance wiring systems, to the display panel source drivers, where the digital signal is returned to an analog signal again, to be loaded onto the display pixels. So, the only purpose of the digitization is data transfer from video source to display pixel. Therefore, we realize that it is more beneficial to avoid digitization altogether (to the extent possible), and to directly transfer the analog data from video source (or from a suitable transmitter) to the display source drivers. Such an analog signal has high accuracy (subject to circuit imperfections) and is a continuous value meaning that its possible resolution in value is always higher than can be represented by an arbitrarily long digital representation. This means the sample rate is at least a factor of ten lower than in the case of digital transfer, leaving further bandwidth for expansion.

Further it can be easier to perform the D-to-A conversion at the point where less power is needed than at the end point where the display panel is driven. Thus, instead of transporting a digital signal from the video source (or from an SoC or timing controller) to the location where the analog signal needs to be generated, we convert to analog near the SoC or timing controller within a transmitter and then transport the analog signal to the display panel over a much lower sample rate than one would normally have with digitization. That means that instead of having to send Gigabits per second over a number of lines, we send only a few hundred mega samples per second in case of the analog signal, thus reducing the bandwidth of the channel that has to be used. The rate is approximately one-tenth of the digital rate required for the same number of physical communication paths. Further, with prior art digital transport, every bit will occupy just about 1.25 cm (considering that propagation in cable is approximately 0.2 m/ns, 16 Gbps means 1/16 ns/bit, so one bit is 0.2/16 meter), whereas transporting analog data results in an increase of tenfold amount of time available, meaning extra bandwidth available. And further, a bit in digital data must be well defined. This definition is fairly sensitive to errors and noise, and one needs to be able to detect the high point and the low point very accurately.

The invention is especially applicable to high-resolution, high-dynamic range display units used in computer systems, televisions, monitors, machine vision, automotive displays, aeronautical displays, virtual or augmented reality displays, mobile telephones, billboards, scoreboards, etc.

Transmission of Analog Signals to a Display Panel

FIG. 1 illustrates delivery of electromagnetic (EM) analog signals to a display panel 150 of a display unit 100 using conversion within the display unit. In this embodiment, conversion of the digital video signal into analog signals occurs within the display unit 100 itself, thus improving display connectivity.

Figure 7:
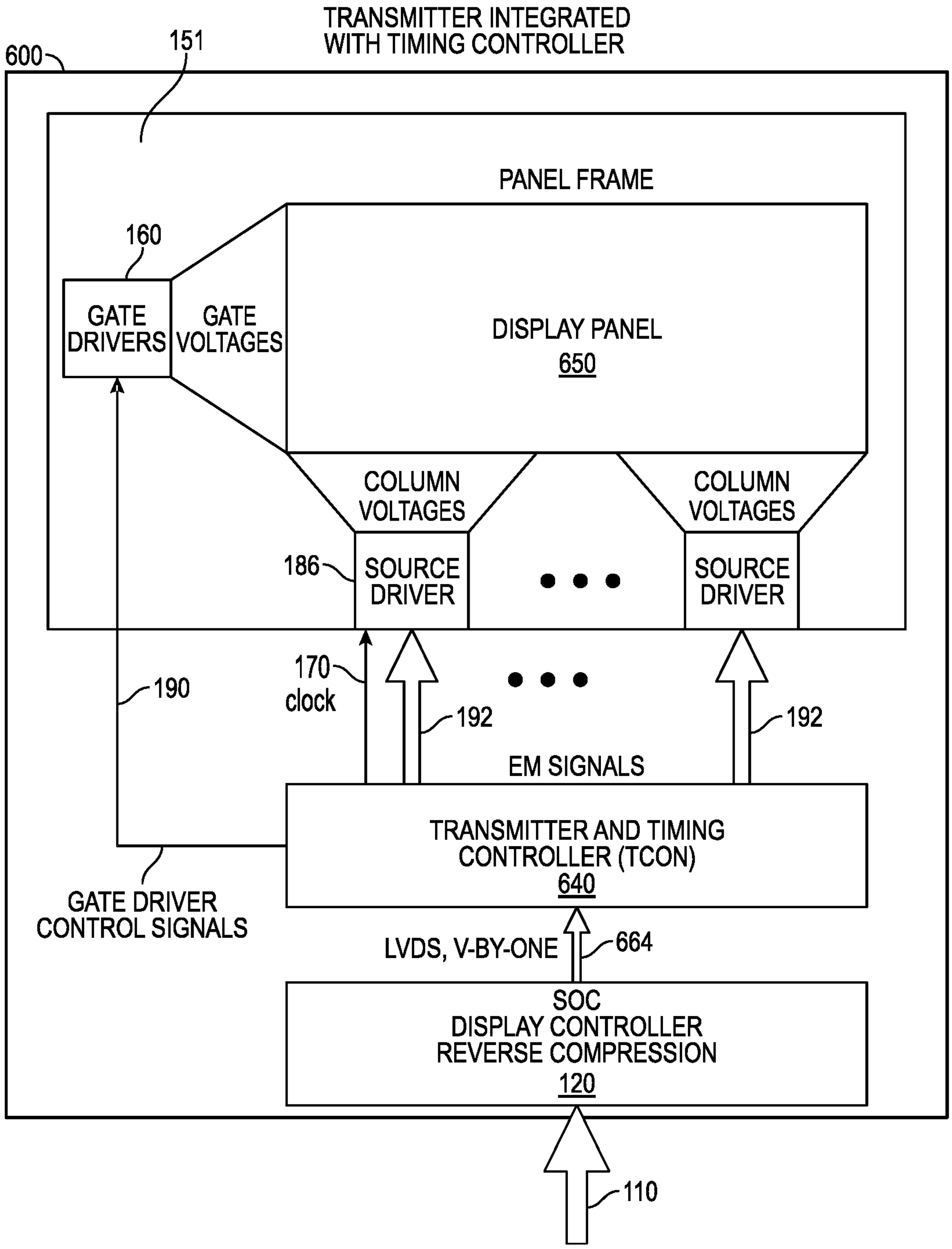
FIG. 7 is a block diagram showing an integrated transmitter and timing controller located immediately after the SoC of the display unit.

Shown is a video signal 110 being delivered to the display unit using an HDMI interface (an LVDS, HDBaseT, MIPI, IP video, etc., interface may also be used). Shown generally are the system-on-chip (SoC) 120 and the timing controller (TCON) 130 which deliver digital video samples from the video signal to the transmitter 140. SoC 120 performs functions such as a display controller, reverse compression, certain digital signal processing and outputs the video signal to the TCON. Typically, LVDS or V-by-One will be used to deliver the digital video data 122 from the SoC to the TCON. If via LVDS pairs (for example), the number of pairs is implementation specific and depends upon the data rate per pair as well as upon panel resolution, frame rate, bandwidth etc. Furthermore, a variety of physical layers may be used to transport the video data from SoC 120 to TCON 130 including a serial-deserializer or SerDes layer, as is known in the art; if transmitter 140 is integrated with TCON 130, then this physical layer delivers the video data from SoC 120 to the integrated TCON and transmitter as shown in FIG. 7. For example, up to 48 SerDes channels or more may be used to deliver this video data.

Figure 2:
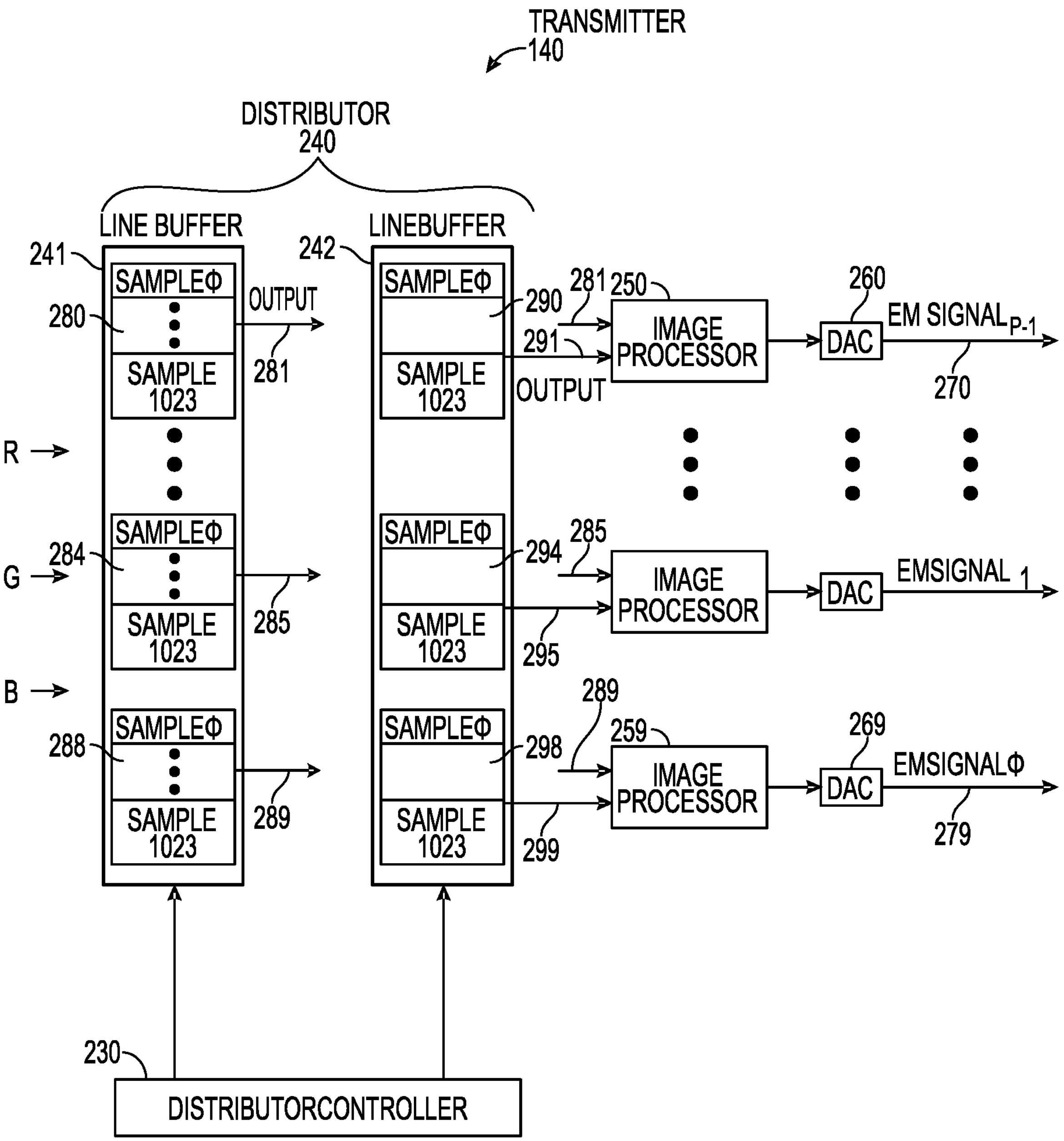
FIG. 2 shows an architecture of a transmitter within a display unit.

It is also possible that some or all digital or image processing is performed in the SoC, in which case there is no image processing performed after the line buffer and before the DAC in FIG. 2. Preferably, the image processing includes some form of Gamma correction and demura correction, and may include image enhancement or modification (e.g., motion compensation or compensation to adjust between the bottom and top of the panel). The image processing is easier to do while in parallel format, although it may be done in serial format (e.g., in processors 250-259) or even using sequential pixel conversion to serial format.

Various embodiments are possible: a discrete implementation in which the transmitter 140 is embedded in a mixed-signal integrated circuit and the TCON and SoC are discrete components; a mixed implementation in which the transmitter 140 is integrated with the TCON in a single IC and the SoC is discrete; and a fully-integrated implementation in which as many functions as possible are integrated in a custom mixed-signal integrated circuit in which the transmitter is integrated with the TCON and the SoC.

In this example of FIG. 1, the display panel 150 is within a panel frame 151 of the display unit. As shown, transmitter 140 and the panel frame 151 are all within the display unit 100. Display panel 150 may be a display panel of any size such as a monitor, large-screen television, billboard, scoreboard, or may be a display or displays within a VR headset, may be a heads-up display (HUD) in which the display is projected onto a windshield, a screen of a visor, etc. For purposes of this disclosure, "display panel" refers to those interior portions of a display unit (often referred to as the "glass") that implement pixels that produce light for viewing, while "display unit" refers to the entire (typically)

rectangular enclosure that includes the display panel, a panel assembly, a frame, drivers, cabling, and associated electronics for producing video images. In general, a mass-producible display panel containing on the order of N^2 pixels is controlled by on the order of N voltages, each updated on the order of N times per display interval (the inverse of the frame rate).

There is a significant advantage to using analog signals for transport within a display unit even if the signal input to the display unit is a digital video signal. In prior art display units, one decompresses the HDMI signal and then one has the full-fledged, full-bit rate digital data that must then be transferred from the receiving point of the display unit to all source drivers within the display unit. Those connections can be quite long for a 65- or 80-inch display; one must transfer that digital data from one position inside of the unit where the input is to another position (perhaps on the other side) where the final source driver is. Therefore, there is an advantage to converting the digital signal to analog signals internally and then sending those analog signals to the source drivers, such as the use of lower frequency signals.

Also shown within FIG. 1 is a transmitter 140 that generates analog EM signals 192 for the source drivers 186. Included are a rigid PCB 182 as well as individual flexible PCBs 184 each holding a source driver 186 which generate source voltages for the display panel. As will be described in greater detail below, signals 180 optionally provide information concerning the display panel back to the transmitter 140 to assist with processing of the video samples. Generation of the gate driver control signals 190 may be performed by the timing controller as is known in the art (or by other specific hardware) and may be based on synchronization information from the source drivers.

Typically, a transmitter 140 and a receiver (in this case, source drivers 186) are connected by a transmission medium. In various embodiments, the transmission medium can be a cable (such as HDMI, flat cable, fiber optic cable, metallic cable, non-metallic carbon-track flex cables, metallic traces, etc.), or can be wireless. There may be numerous EM pathways of the transmission medium, one pathway per EM signal 192. The transmitter includes a distributor that distributes the incoming video samples to the EM pathways. The number of pathways may widely range from one to any number more than one. In this example, the transmission medium will be a combination of cable, traces on PCBs, IC internal connections, and other mediums used by those of skill in the art.

During operation, a stream of time-ordered digital video samples 110 containing color values and pixel-related information is received from a video source at display unit 100 and delivered to the transmitter 140 via the SoC and TCON. The number and content of the input video samples received from the video source depends upon the color space in operation at the source (and the samples may be in black and white). Regardless of which color space is used, each video sample is representative of a sensed or measured amount of light in the designated color space.

The signal from the SoC (typically an LVDS digital signal, but others may be used) in which the pixel values come in row-major order through successive video frames. More than one pixel value may arrive at a time (e.g., two, four, etc.); they are serial in the sense that groups of pixels are transmitted progressively, from one side of the line to the other. A processing unit such as an unpacker of a timing controller may be used to unpack (or expose) these serial pixel values into parallel RGB values, for example. Also, it should be understood that the exposed color information for each set of samples can be any color information (e.g., Y, C, Cr, Cb, etc.) and is not limited to RGB. Use of color information other than RGB sub-pixels may require additional processing before the source drivers can drive the columns (which are natively sub-pixel intensity values). The number of output sample values S in each set of pixel samples is determined by the color space applied by the video source. With RGB, S=3, and with YCbCr 4:2:2, S=2. In other situations, the sample values S in each set of samples can be just one or more than three.

The unpacker may also unpack from the digital signal framing information in the form of framing flags that come along with the pixel values. Framing flags indicate the location of pixels in a particular video frame; they mark the start of a line, the end of the line, the active video section, the horizontal and vertical blanking sections, etc., as is known in the art. Framing flags are used to tell the gate drivers which line is currently sent to the display panel and will also control the timing of gate drivers' action. Framing flags may be included within gate driver control signals 190 as is known in the art. In general, symbol and sampling synchronization occurs before extracting framing information such as Hsync and Vsync (and other line control information).

TCON 130 provides a reference clock 170 to each of source drivers 186, i.e., each source driver chip (e.g. a Hyphy HY1002 chip) has a clock input that is provided by the TCON (whether it is an FPGA or IC). Clock 170 is only shown input to the first source driver for clarity, but each source driver receives the reference clock. This reference clock may be relatively low frequency, around 10.5M Hz, for example. More detail on the reference clock is provided in FIG. 17C.

Transmitter

FIG. 2 shows an architecture of a transmitter 140 within a display unit. Shown is a distributor 240 that includes two line buffers 241 and 242 and a distributor controller 230, a number of P image processors 250-259, a digital-to-analog converter 260-269 following each image processor, and an analog EM signal 270-279 output from each DAC. In this example there are 24 source drivers, meaning 24 EM pathways, or P=24; there may be a single EM pathway or multiple EM pathways. Depending upon the implementation and design decisions, multiple outputs may increase performance but require more pathways.

Controller 630 stores a line of pixels for the display into one of the line buffers and then that line is output (into the DACs or into the other line buffer as explained below) when the line is complete. Typically, pixels for a line of the display panel arrive serially from the SoC, but as the gate drivers will enable a line of pixels to be displayed at the same time, the source drivers will need pixels for an entire line to be ready at the same time. Thus, each line buffer provides storage for a line of pixels. Furthermore, at times only half of a line of pixels is enabled on the display panel by the gate drivers, thus a line is stored in a line buffer, and then extracted half-by-half to be transmitted, while a new line is being stored.

In general, as a stream of input digital video samples is received within the transmitter 140 in row-major order, the input digital video samples are repeatedly (1) distributed to one of the EM pathways according to a predetermined permutation (in this example, row major order, i.e., the identity permutation) (2) converted into analog, and (3) sent as an analog EM signal over the transmission medium, one EM signal per EM pathway. At each source driver 186 the incoming analog EM signal is received at an input terminal and each analog sample in turn is distributed via sampling circuitry to a storage cell of a particular column driver using the inverse of the predetermined permutation used in the transmitter. Once all samples for that source driver are in place they are driven onto the display panel. As a result, the original stream of time-ordered video samples containing color and pixel-related information is conveyed from video source to video sink. The inverse permutation effectively stores the incoming samples as a row in the storage array (for display on the panel) in the same order that the row of samples was received at the distributor. The samples may arrive serially, e.g., R then G then B, or in parallel i.e., RGB in parallel as three separate signals. Using distributor 240, we can reorder the samples as needed.

In one embodiment, four control signals for every 60 video samples are inserted into the stream of samples in the distributor to be sent to the source driver. As shown, each input vector 280 in the line buffer includes a total of 1024 values, including the four control signals per every 60 video samples. The control signals may be inserted into various positions in the input vector, by way of example, "samples" 960-1023 of the input vectors 280-288 may actually be control signals. Any number of control signals in each input vector may be used. Further, an arbitrary but finite number of control signals is possible. The more control signals that are transmitted, the higher the data transmission rate needed. Ideally, the number of control signals is limited to what fits into the blanking periods so that there can be a correspondence between transmit rate and displayed lines (thus reducing the amount of storage required, or any additional resynchronization). And further, the control signals may be inserted into the stream of samples at the distributor or insertion of control signals be performed in another location.

Distributor 240 is arranged to receive the pixel color information (e.g., R, G, and B values) exposed in the input sets of samples. The distributor 240 takes the exposed color information and writes multiple input vectors 280-288 into the first line buffer 241 (one input vector per EM pathway) according to the predefined permutation. Once line buffer 241 is full then each input vector 280-288 is read out via its corresponding output port 281-289 into its corresponding DAC or optionally into its corresponding image processor 250-259. As these input vectors from line buffer 241 are being read out (or once line buffer 241 is full) then the next line of RGB input samples are written into input vectors 290-298 in the second line buffer 242. Thus, once the second line buffer 242 is full (and the DACs or image processors have finished reading input vectors from the first line buffer 241) the DACs or image processors begin reading samples from the second line buffer 242 via their output ports 291-299. This writing to, and reading from, the first and second line buffers continues in this "ping-pong" fashion as long as input samples arrive at the transmitter. Output ports 281-289 and 291-299 may possibly be bit-serial communications, but are more likely to be sequential word-wide samples or even parallel word-wide samples.

In a preferred embodiment for writing into and reading out from the line buffers, samples are only written into one of the line buffers, e.g., into buffer 241, as they arrive at the transmitter 140. Once that buffer is full then all samples are written in parallel from buffer 241 into line buffer 242. Samples are then only output into the DACs (or image processors) from buffer 242. The process is continuous: buffer 241 is filled as buffer 242 outputs its samples, once buffer 242 is depleted the all samples of buffer 241 are written into buffer 242, and so on. The samples can be written from buffer 241 into buffer 242 during the horizontal blanking period.

The number of line buffers required depends on the relative time required to load the buffers and then to unload them. There is a continuous stream of data coming in on the RGB inputs. If it takes time T to load all the samples into a buffer and the same time T to unload them, we use two buffers (so that we can unload one while the other is being loaded). If the time taken to unload becomes shorter or longer, the buffer length can always be adjusted (i.e., adjust the number of input vectors or adjust N of each input vector) so that the number of line buffers required is always two. Nevertheless, more than two buffers may be used if desired and either embodiment described above may be used for writing into and reading from the buffers.

Distributor controller 230 controls the operation and timing of the line buffers. In particular, the controller is responsible for defining the permutation used and the number of samples N when building the four input vectors. In this example, N=1024. Controller 230 may also include a permutation controller that controls distribution of the RGB samples to locations in the input vectors.

Controller 230 may also include a permutation controller that controls distribution of the samples to locations in the input vectors. The controller is also responsible for coordinating the clock domain crossing from a first clock frequency to a second clock frequency. In one particular embodiment, the samples are clocked in at a frequency of $F_{PIXEL}$ and the samples are clocked out serially from each input vector at a sampled analog video transport (SAVT) frequency of Fsavt. It is also possible to clock in two samples at a time instead of one each, or three at a time, etc. The analog samples are transmitted along an electromagnetic pathway of a transmission medium as an analog EM signal 270-279 to the SAVT receiver.

In one particular embodiment, each line buffer 241 or 242 has three input ports for the incoming RGB samples and the samples are clocked in at a frequency of $F_{PIXEL}$; each line buffer also has 24 output ports, e.g., 281 or 291 (in the case where there are 24 EM signals, each being sent to one of 24 source drivers) and the samples are clocked out from each input vector at a sampled analog video transport (SAVT) frequency of Fsavt. It is also possible to clock in two R, two G and two B samples at a time instead of one each, or three at a time, etc. In one embodiment, Fsavt=663.552 MHz for 24 channels.

For purposes of explanation, one possible permutation is one in which each of the input vectors includes N samples of color information and control signals. The exposed RGB samples of the sets of samples in this example are assigned to input vectors from left to right. In other words, the "R", "G" and "B" values of the first set of samples, the "R", "G" and "B" values of the next set of samples, etc. are assigned to input vector 280 in that order (i.e., RGBRGB, etc.). Once input vector 280 has been assigned its N samples and control signals, the above process is repeated for the other input vectors in order until each of the input vectors have N values. The number of N values per input vector may widely vary. As shown in this example, this predetermined permutation preserves the row-major order of the incoming samples, that is, the first input vector 280 includes sample 0 through sample 1023 of the first row in that order and the succeeding input vectors continue that permutation (including control signals). Thus, distributor controller 230 performs a permutation by assigning the incoming samples to particular addresses within the line buffer. It should also be understood that any permutation scheme may be used by the distributor 230, and, whichever permutation scheme that is used by the transmitter, its inverse will be used by control logic in each source driver in order to distribute the incoming samples to the column drivers. In the situation where only one electromagnetic pathway is used and where the video samples are received at the SAVT transmitter, the distributor writes into one input vector in each line buffer.

Image processors 250-259 are shown after the line buffers and before the DACs, although it is preferable to have an image processor (or processors) before the line buffers thus reducing the number needed, i.e., as the RGB samples arrive image processing is performed and then the samples are distributed into the line buffers. Shown are pixels arriving one at a time; if pixels arrive one at a time then one image processor is used, if two at a time then two are used, and so on. Certain processing such as gain management may be performed after the line buffers even if the image processors are located before the line buffers.

Typically, image processing: a) applies gamma correction on each sample; b) level shifts each gamma-corrected sample, mapping the range (0 . . . 255) to (−128 . . . 127), in order to remove the DC component from the signal; c) applies the path-specific amplifier variance correction to each gamma-corrected, level-shifted sample; performs gain compensation for each sample; performs offset adjustment for each sample; and performs demura correction for each sample. Other corrections and adjustments may also be made depending upon the target display panel. An individual image processor 250-259 may process each output stream of samples (e.g., 281 and 291) or a single, monolithic image processor may handle all outputs (e.g., 281 and 291, 285 and 295, etc.) at once. In order to avoid performing image processing on the control signals in the line buffer, the control signal timing and positions in buffers is known so that logic can determine that image processing of control signals should not be done. As mentioned above, image processing need not occur within transmitter 140 but may occur in SoC 120, in the TCON, or in another location such as in the receiver. E.g., Gamma correction is traditionally done in the receiver (source driver), but demura and more complex image processing are not feasible in a source driver.

The processed digital samples of each input vector are input serially into one of DACs 260-269 (whether image processing happens before or after the line buffers); each DAC converts these modified digital samples at a frequency of Fsavt and transmits the modified analog samples along an electromagnetic pathway of a transmission medium as an analog EM Signal 270-279 to a source driver of the display unit. Each DAC converts its received sample from the digital domain into a single analog level, which may be transmitted as a differential pair of voltage signals having a magnitude that is proportional to its incoming digital value, the analog levels being sent serially as they are output from each DAC. The output of the DACs may range from a maximum voltage to a minimum voltage, the range being about 1 volts to 4 volts, Vpp (peak-to-peak); about 2 volts Vpp works well. In one particular embodiment, we represent signals in the range of +/−500 mV or a 1V dynamic range (in reality the dynamic range at the input is about 30% higher or about 1.3V).

Although two line buffers are shown within distributor 240 (which is preferable), it is possible to use a single line buffer and as samples from a particular input vector are being read into its image processor (or its DAC) the distributor back fills that input vector with incoming samples such that there is no pause in the serial delivery of samples from the line buffer to the DAC or image processor. Further, and also less desirable, it is also possible to place each DAC (or a number of DACs per EM pathway) after the distributor and before the image processors (if any), thus performing image processing on analog samples.

Figure 3:
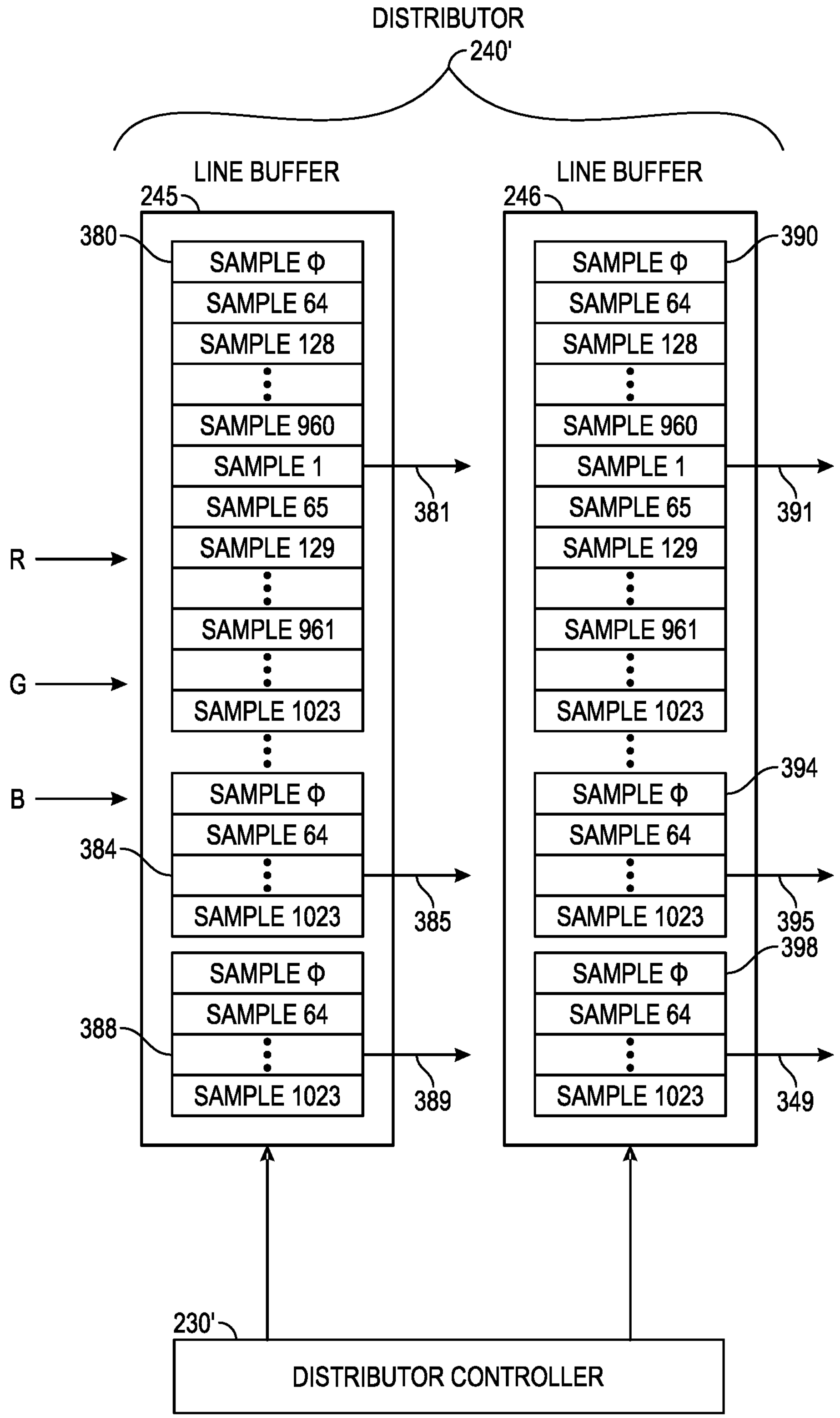
FIG. 3 illustrates an embodiment of the distributor in which a different predetermined permutation is used.

FIG. 3 illustrates an embodiment of the distributor 240' in which a different predetermined permutation is used. This predetermined permutation may be used in order to reduce the wiring complexity in each source driver. Distributor 240' orders the samples and control signals in each input vector 380-388 in this order: 0, 64, 128, . . . 960, 1, 65, 129, . . . , 961, and so on, up to 63, 127, 255, . . . , 1023. (The indices corresponding to the indices shown in FIG. 6, i.e., each amplifier handles 64 samples and control signals.) Thus, each input vector inputs 1,024 values for its particular EM pathway at a time (assuming that 64 control signals are added to each 960 actual samples from the TCON), the samples being distributed by the controller into each input vector as shown using the predetermined permutation. Although not shown, the 64 control signals may be added at the end of each input vector, thus distributing four control signals to each amplifier as shown in the source driver of FIG. 6. Note that the numbers 64 and 960 are implementation dependent; it is possible to use different numbers of control signals and a different number of columns per vector.

Figure 6:
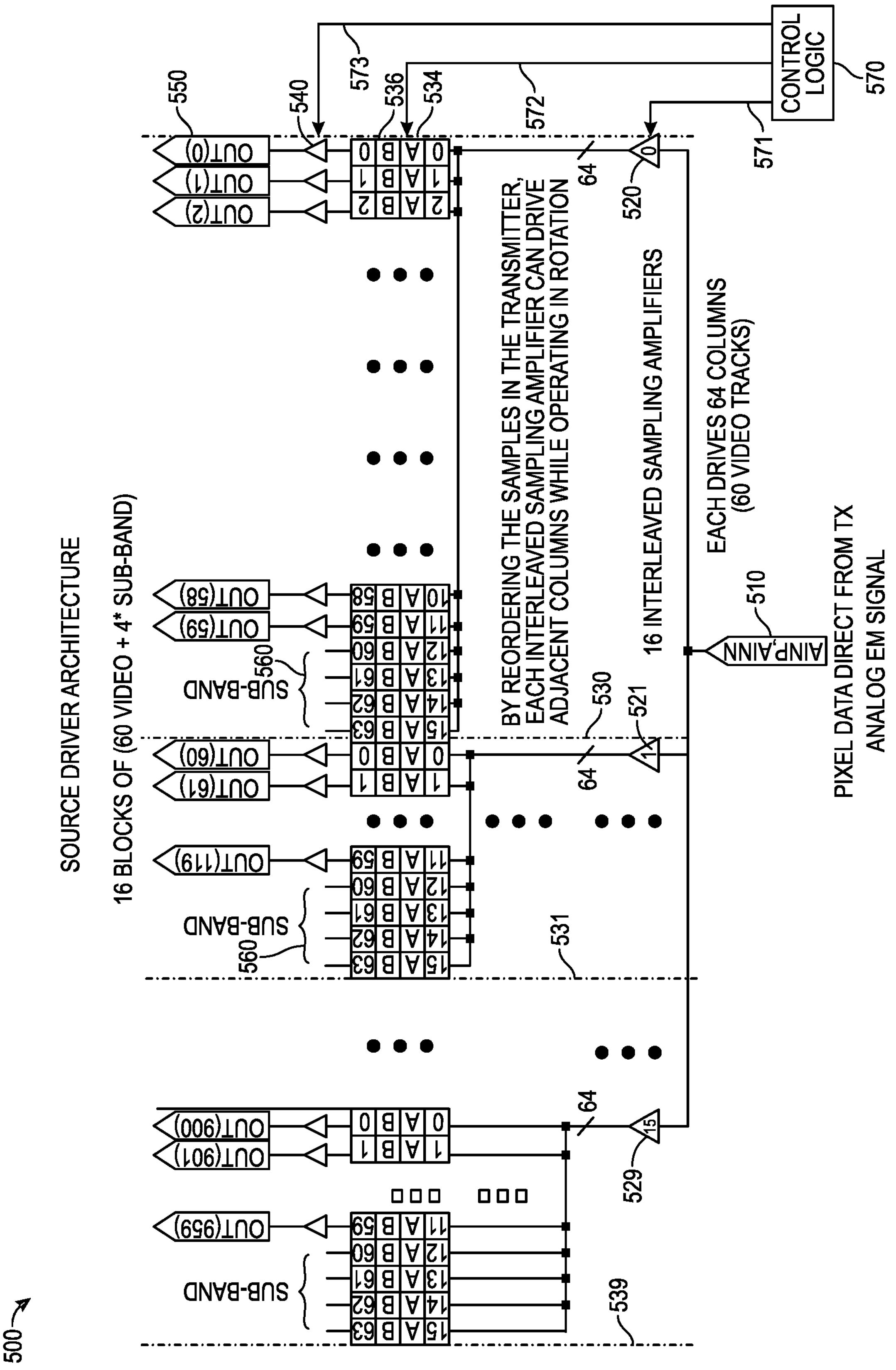
FIG. 6 shows another architecture of a source driver of a display panel.

The samples of input vectors 380-388 are then output from line buffer 245 into image processors 250-259 via output ports 381-389. As in the distributor of FIG. 2, the distributor alternates writing samples into, and reading samples from, line buffer 245 or line buffer 246. Line buffer 246 outputs its samples via output ports 391-399 into the image processors. Thus, by reordering the samples in the transmitter, each interleaved input sampling amplifier of a source driver (e.g., as shown in FIG. 6) can drive adjacent columns while operating in rotation. Output ports 381-389 and 391-399 may possibly be bit-serial communications, but are more likely to be sequential word-wide samples or even parallel word-wide samples.

In another embodiment (not shown), the predetermined permutation used by distributor 240 orders the samples by color for each input vector, i.e., send all 320 red sub-pixels, followed by all 320 green sub-pixels, followed by all 320 blue sub-pixels, followed by all 64 sub-band signals. Thus, using the first input vector as an example, sample positions 0-319 will contain the red sub-pixels, sample positions 320-639 contain the green sub-pixels, sample positions 640-959 contain the blue sub-pixels, and positions 960-1023 contain the 64 sub-band signals for a particular row. The samples are then sent out to the image processor (all red, all green, all blue, all sub-band). The other input vectors use the same permutation of grouping the samples by color. Of course, the color groupings of sub-pixels in an input vector may be in any order (not necessarily red, green, blue) and the 64 sub-band signals may be inserted anywhere in the groupings. The reason for this ordering is to exploit a heuristic of natural images that individual color components tend not to exhibit high spatial frequency, thereby reducing potential electromagnetic interference signals generated by the system when the samples are grouped in this fashion. In fact, substantial EMI is reduced as long as substantially most all of the sub-pixels of a particular color are grouped together. Further, this ordering not only allows for slower S/H amplifiers in the source driver to be used but also for a lower bandwidth requirement for the transmitter to receiver communication channels. Control logic in each source driver will then use the inverse of this permutation in order to direct the incoming samples to the correct column driver.

Figure 4:
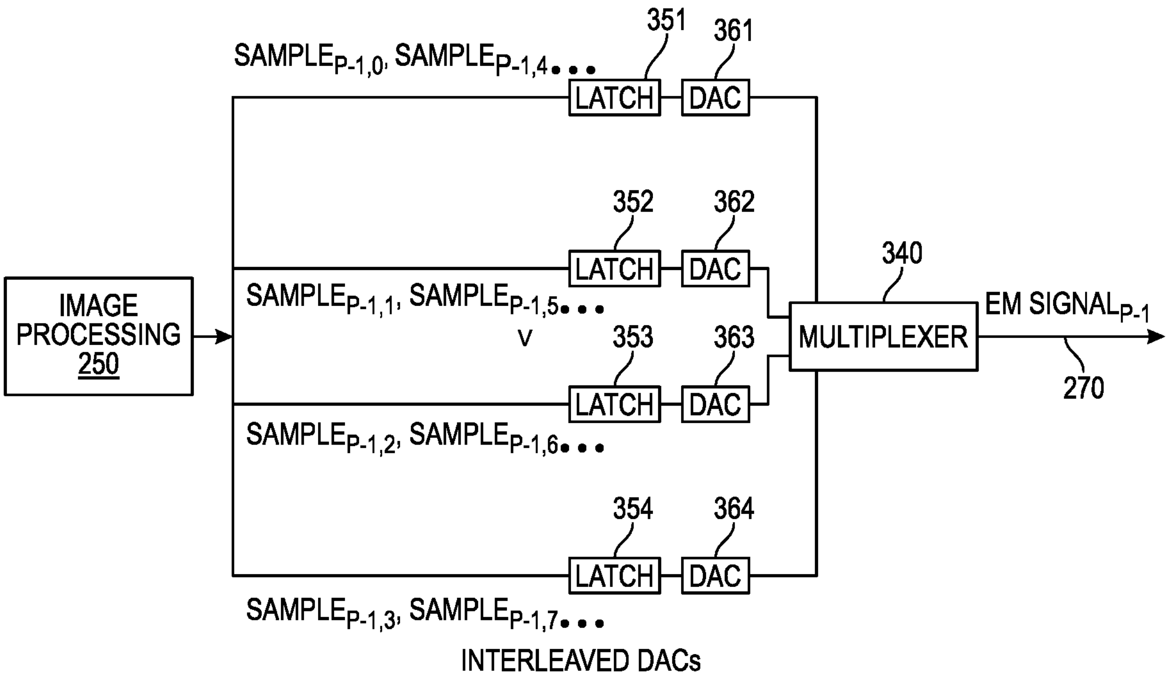
FIG. 4 is a block diagram of an alternative embodiment for each DAC that follows an image processor.

FIG. 4 is a block diagram of an alternative embodiment for each DAC that follows an image processor. As shown, instead of a single DAC following image processor 250 (for example), there are four interleaved DACs 361-364 that process the modified samples output from the image processor. Any number of DACs are possible, although DACs in multiples of two (e.g., two, four, eight, sixteen) are common. Latches 351-354 are used to sample and then deliver a particular sample output from the image processor to the corresponding DAC. Thus, for example, using four DACs, the first four samples (Sample0, Sample1, Sample2, Sample3) are delivered to DACs 361-364 in that order, and the next four samples (Sample4, Sample5, Sample6, Sample7) are also delivered to DACs 361-364 in that order. A multiplexer 340 is used to multiplex the analog samples output from each DAC so that they are ordered in EM Signal 270 in the same order as they were output from image processor 250. Multiplexer 340 may be implemented as a selector, and the selector's control may be either a rotating enable bit in a shift register or a counter plus decoder. Although not shown, each of the other image processors will have similar interleaved DACs. This embodiment allows slower-speed DACs to be used. Image processor 250 may also follow the DACs, in which case it is an analog signal processor.

Source Driver Architectures

Figure 5:
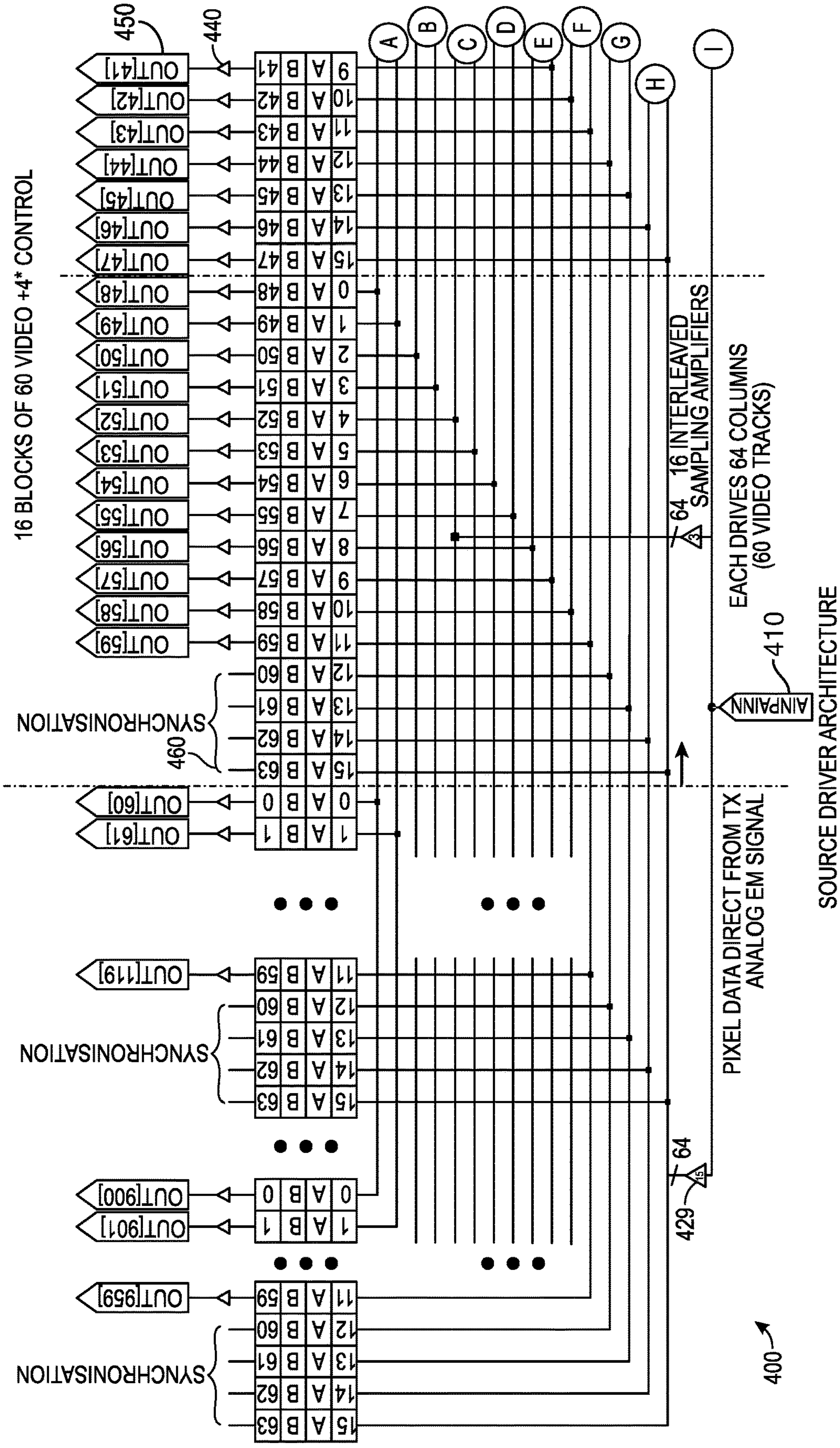
FIG. 5 shows an architecture of a source driver of a display panel.
Figure 5:
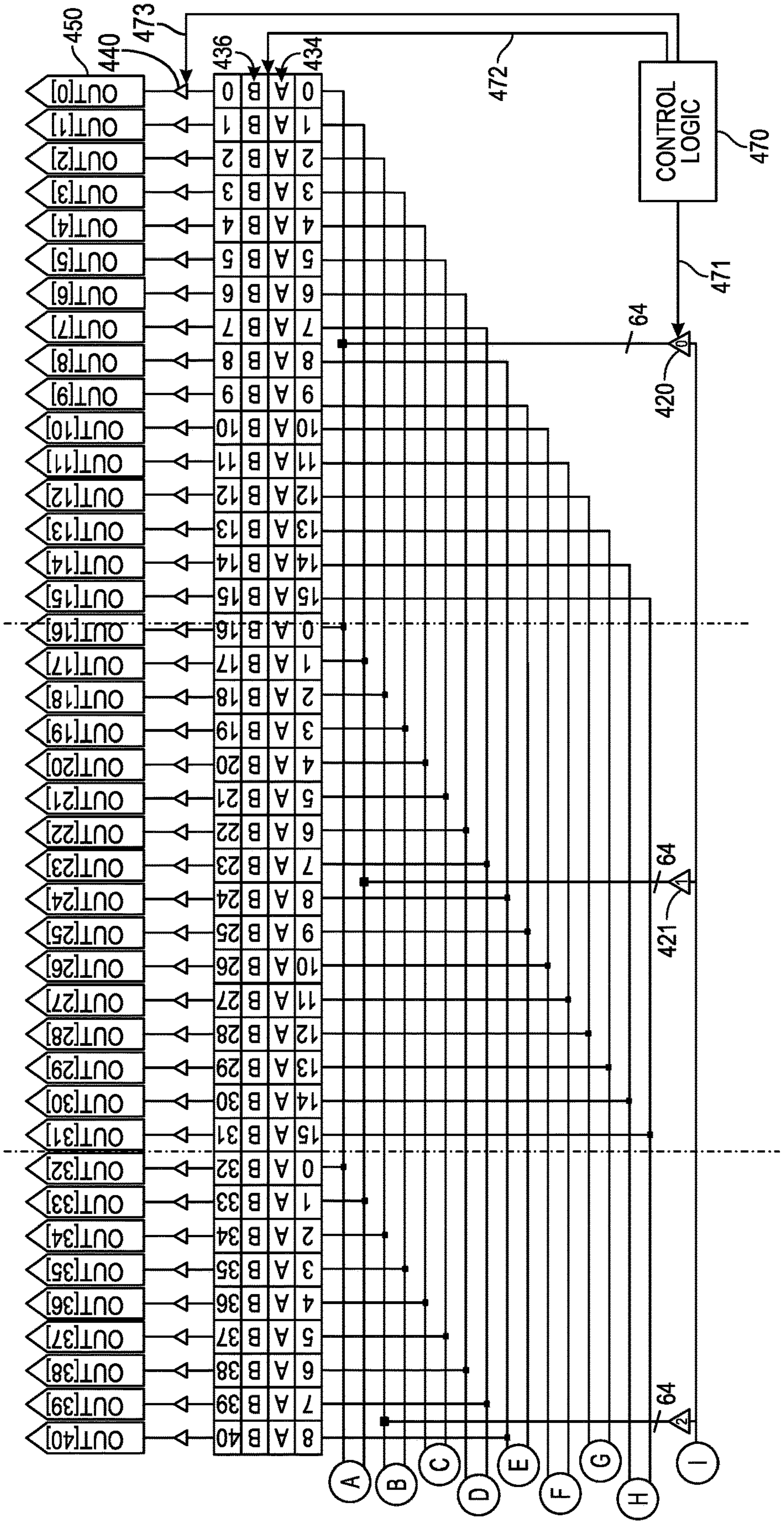

FIG. 5 shows one embodiment of an architecture of a source driver 400 of a display panel. Typically, there may be 24 such source drivers of a display panel, i.e., P equals 24 (for 8K displays, 4K displays will have fewer). Note that no analog-to-digital converters (ADCs) are needed in the source driver in order to convert samples to analog for display. Table 1 shows parameters, values and units of the source driver for use with an 8K144 display panel. Thus, each of 24 source drivers drives 960 columns, providing the sub-pixels for a row of the display (23,040 sub-pixels per line).

TABLE 1

8K144 Example Values

| Parameter | Value | Units |
|---|---|---|
| Hpix | 7680 | Pixels |
| Vpix | 4500 | Pixels |
| Screen Refresh | 144 | Hz |
| RxChips | 24 | Chips/system |
| Hsubpix | 23040 | Subpixels/line |
| SubpixRate | 149299200000 | Samples/sec |
| SubpixelOverhead | 1.067 | =64/60 (synch. and control overhead) |
| SampleRate | 15925248000 | Samples/sec |
| Rate Per Chip | 663552000 | Samples/sec/chip |

Input into source driver 400 at input terminal 410 is one of the EM Signals from transmitter 140. In this example, terminal 410 serially receives 1,024 analog values at a time which are then stored into either the row of A or B storage arrays 434 or 436 via S/H amplifiers 420-429. The analog video samples arrive in their natural order according to the predetermined permutation shown in example of FIG. 2, although this requires more complex wiring in the source driver as shown. Other permutations may also be used.

The source driver 400 consists of 16 interleaved Sample/Hold input amplifiers 420-429 that sample the input 410 at Fsavt/16. There are 16 blocks (430 being the first block) of 60 video and 4 control signals. Each of the S/H amplifiers 420-429 samples a particular analog sample in turn and stores it into one of the 64 storage arrays 434 or 436, 60 of which directly feed the column drivers 440. Because input amplifiers 420-429 are interleaved they may be run 16 times slower than the input signal, each one being phase shifted by one SAVT interval. As shown, S/H amplifier #0 420 drives columns 0, 16, 32, etc., and S/H amplifier #1 421 drives columns 1, 17, 33, etc., and so on. Therefore, each S/H amplifier output spans the range of all 960 columns (an amplifier output every 16 columns).

In one embodiment, each of these storage elements in storage array A or B is a storage cell, such as a switched capacitor. Other terms for the storage cell are "sampler capacitor" or "analog latch." There are also 960 high-voltage column drivers 440 which each drive a column 450 (via output pins) providing the voltage that the display panel 480 requires. As shown, there are 16 blocks of 60 video plus four synchronization signals 460 (such as Hsync, Vsync, CTRL) per block.

Figure 21:
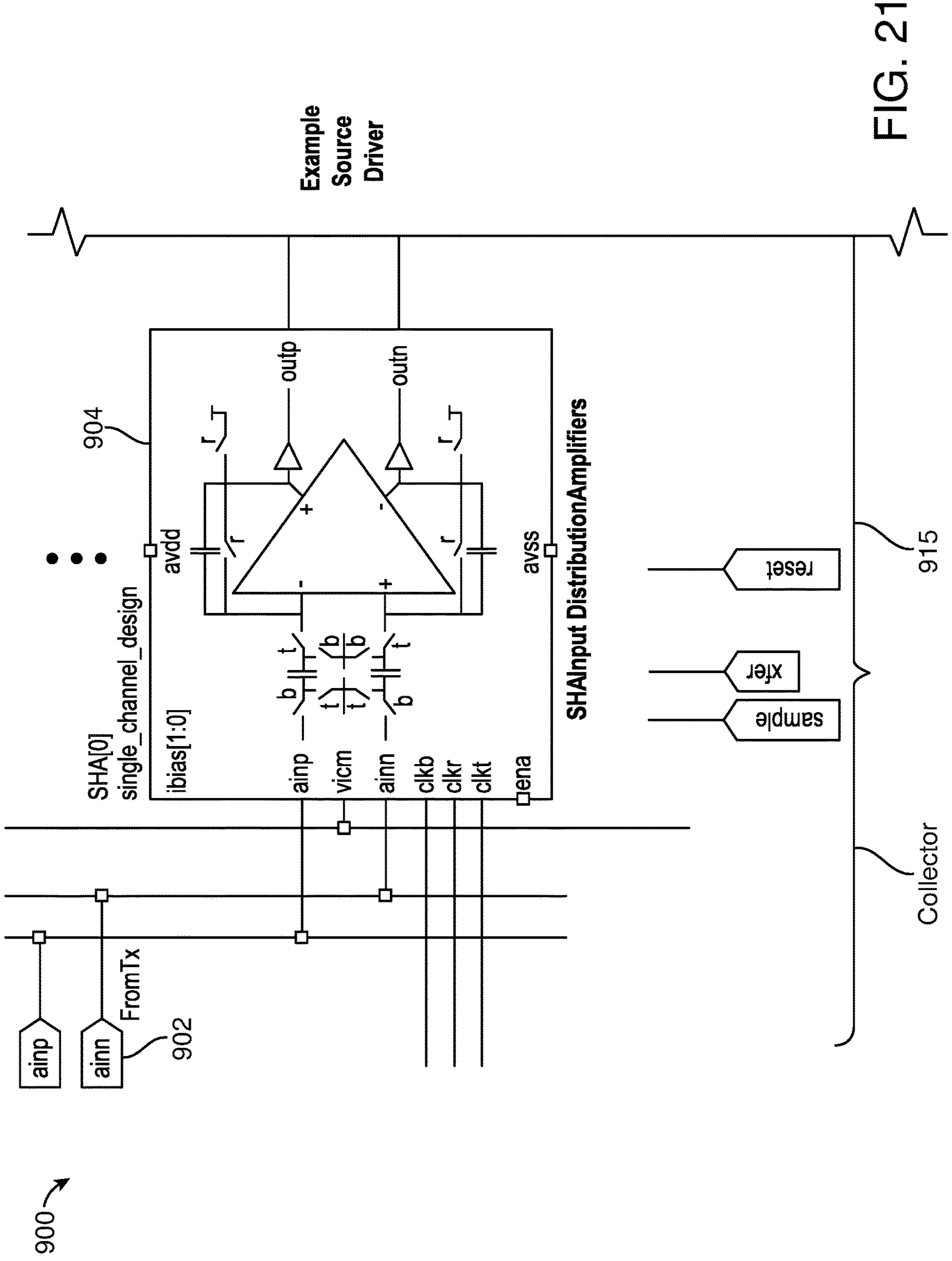
FIG. 21 illustrates the analog data path of one channel of an example source driver.

Once stored (in row A, for example) these 960 samples are driven to each output column 450 via column drivers 440 while at the same time the next set of 960 analog samples are being stored into the other row (B, for example). Thus, while one set of incoming 960 samples are being driven to the columns from one of the A or B rows, the next set of 960 samples are being stored in the other row. In one particular implementation, each analog level is a differential signal arriving at an S/H amplifier 420 and swings between about +0.5 or −0.5 V, and has a maximum swing of about 18 V around a mid-range voltage in each single-ended column driver, thus requiring amplification. Note that in addition to amplification, at some point the differential signal (−full scale represents dark and +full scale represents bright) is converted to single-ended and drive polarity is applied so that dark sub-pixels are at, e.g., 9V and bright sub-pixels are either full-scale positive (e.g., 18V) or minimum voltage (e.g., 1V) depending upon the polarity setting. FIG. 21 shows an example source driver in more detail.

Control logic 470 implements the inverse of the predetermined permutation used in the transmitter 140 and controls the timing of the S/H amplifiers (when each samples a particular incoming analog sample) via control lines 471, controls the timing of the storage elements of rows A and B (when each row latches a particular analog sample) via control lines 472, and controls the timing of when each column driver 440 drives each column via control lines 473. For example, if the transmitter uses the predetermined permutation described above in which particular sub-pixel colors are grouped together in an input vector and then transmits those groups within an EM signal then control logic 470 will use the inverse of this predetermined permutation in order to route incoming samples to the correct column driver. At the very least, control logic 470 is aware of how distributor controller 242 has placed the incoming samples into an input vector and uses this a priori knowledge in order to direct the incoming samples to the correct column driver so that the samples are displayed as they appeared in the original source image.

Note that the number of S/H amplifiers 420-429 is a tradeoff between number and quality. The more amplifiers that are added, the slower they run, the smaller and more noisy they become, and the smaller load each one drives. The load presented to the input terminal 410, however, grows with the number of S/H amplifiers, which will impact the quality of the transfer. Therefore, it is a design decision as to how many input amplifiers to use. It is possible to vary the intervals of each clock period slightly in order to address any RFI/EMI emissions issues. The inputs to the SHA amplifiers only have a +/−250 mV swing around their common mode voltage (each of positive and negative inputs) leading to +/−500 mV signal (lv dynamic range). This is a similar voltage swing to conventional digital signaling such as CEDS or LVDS. The clock modulation may be done to reduce the RFI/EMI emissions in both cases, although this modulation eats into the sampling window and is not preferred. In addition, in order to optimize the performance of the source driver (to counteract any process variations in the S/H amplifiers as implemented), a low-frequency feedback network may be added off-chip in order to characterize the gain and offset of every amplifier of the source driver, although this technique is not preferred due to area and performance constraints.

An alternative method to optimize the performance of the source driver outputs is to utilize existing compensation techniques of the display unit itself. Modern OLED (and micro-LED) manufacturing techniques characterize the response of every sub-pixel in the array and pre-compensate for the individual offsets from a table of manufacturing data stored in the TCON and used when generating samples. Thus, based upon the physics of the entire display unit (including transmitter, amplifiers, source drivers, each pixel, etc.) each sub-pixel may have a different characteristic response, i.e., it might be too bright or too dark. This table includes an individual offset for each characteristic response.

Note that in the source driver architecture 400 or 500, a predetermined one of the interleaved sampling amplifiers 420-429 or 520-529 stores pixel voltages into the switched capacitors that are then amplified into a given column. Thus, every column is driven through the same amplifiers on each row. Any linear errors in the amplifiers as manufactured, such as gain errors, will be overlaid as a regular pattern onto any other errors measured for the individual sub-pixels along the column via the existing compensation techniques. Therefore, these existing OLED error compensation techniques will compensate also for all linear errors in the proposed source driver's amplifiers. This observation suggests that it may be possible to relax the design requirements (for example with respect to gain accuracy) and thereby enable lower-cost implementations. In one particular preferred embodiment, there are three amplifier stages and the amplifiers include common-mode feedback amplifiers.

FIG. 6 shows another embodiment of an architecture of a source driver 500 of a display panel. As in FIG. 5, shown is input terminal 510, input S/H amplifiers 520-529, rows of storage elements in arrays 534 and 536, column drivers 540, outputs 550, sub-band signals 560 (e.g., synchronization signals such as Hsync, Vsync) and CTRL), control logic 570 and a display panel 580.

In this embodiment each S/H amplifier 520-529 drives 64 neighboring locations (60 columns plus four sub-band values), thus reducing the wiring complexity in the source driver, reducing the physical distance in which one of the amplifiers 520-529 must drive, and also making Demura correction easier. For example, a first block 530 of 60 video and four sub-band signals is driven by amplifier 520, block 531 is driven by amplifier 521, and block 539 is driven by amplifier 529. Because this configuration also causes the gain error from any given input sampling amplifier to manifest in 60 neighboring columns, it facilitates conventional high-MTF Mura compensation solutions making it easier for the Demura system to detect.

In order to implement this embodiment, as illustrated in FIG. 3, distributor 240' sends the samples in this order: 0, 64, 128, . . . 960, 1, 65, 129, . . . , 961, and so on, up to 63, 127, 255, . . . , 1023, the last 64 values being the control signals. Thus, by reordering the samples in the transmitter, each interleaved sampling amplifier can drive adjacent columns while operating in rotation. Control logic 570 implements the inverse of the predetermined permutation used in distributor 240' of FIG. 3 and controls the timing of the S/H amplifiers (when each samples a particular incoming analog sample) via control lines 571, controls the timing of the storage elements of rows A and B (when each row latches a particular analog sample) via control lines 572, and controls the timing of when each column driver 540 drives each column via control lines 573. Note that in this embodiment each sampling amplifier drives 60 columns as well as 4 sub-band signals.

Source Driver Architecture Embodiments

Above, FIGS. 5 and 6 disclose architectures for source drivers. Other architectures may also be used in which the transmission order of the sub-pixels from the transmitter is manipulated such that control signals may be spread out amongst the amplifiers, control signals may be sent exclusively over one channel to one amplifier, sub-pixels may be grouped together by color, all for a variety of reasons depending upon the particular implementation.

FIG. 11 illustrates a particular sub-pixel transmission order in which sub-pixels are grouped by color in order to minimize transmission bandwidth. Table 800 shows the RGB sub-pixel indices of the sub-pixels that are collected by each input amplifier of a source driver. As shown, each amplifier 802 receives control signals first followed by a series of sub-pixels 804, in this example, first the red, then the green, followed by the blue. The transmission order of the sub-pixels from the transmitter is from top-to-bottom, left-to-right and are received at a particular amplifier as shown. Because color information tends to change more slowly than luminance information in a given video image, by grouping sub-pixels by color there will be fewer transitions and bandwidth will be reduced.

Although a desirable architecture for certain applications, when the control signals are spread across all S/H amplifiers (as in FIGS. 5 and 6 as well) it can be difficult to extract the control information, and this architecture (as in FIG. 5) also requires each amplifier to drive across all 960 columns of the display, thus increasing the load on each of the amplifier channels.

FIG. 12A illustrates a particular sub-pixel transmission order in which sub-pixels are still grouped by color in order to minimize transmission bandwidth and the control signals all arrive at one dedicated amplifier channel. Table 810 shows the RGB sub-pixel indices of the sub-pixels that are collected by each input amplifier of a source driver. As shown, the amplifiers 812 are numbered 0 to 15 and each amplifier 0-14 receives a series of sub-pixels 804, in this example, first the red, then the green, followed by the blue. Amplifier 15 exclusively receives the control track 816 of the control signals. Advantages include fewer transitions and reduced bandwidth as described above, as well as making extraction of control information simpler. And, each amplifier only spans 320 columns instead of all 960 columns.

Even though grouping by color has some advantages, and although is a desirable architecture for certain applications, the video data must be padded because 960 sub-pixels/15 amplifiers/3 colors is not an integer. The additional overhead for padding means that 66 samples per amplifier are sent per line instead of 64. This means that the transmission frequency needs to be increased by a factor of 64 or 66, which partially defeats the purpose of reducing the transmission bandwidth by grouping colors. And driving across 320 columns is not as desirable as driving only 64 columns.

FIG. 12B illustrates a specific embodiment in which sub-pixels are grouped by color with a transition band between groups. This embodiment may be used in implementation of HYPHY integrated circuit chip "1002." It is realized that because color has a lower frequency content than luminance, when colors change it can be an abrupt change, so we perform that change more slowly. For example, going from pixel index 958 to 2 (from green to blue) can take time if the bandwidth of the transmitter channel is not wide enough. A blanked transition band 817 is added to slow down that change and to assist in minimizing bandwidth.

This 1002 chip minimizes SAVT bandwidth requirements and thus uses the permutation shown whereby all sub-pixels of each color are transmitted as a group, with a blanked transition band between groups (i.e., a band of blanking transition signals) in order to lower the bandwidth required between groups. SHA amplifier 0 is the control channel 818 showing control signals 0 to 64, i.e., 65 samples are transmitted per line. As shown, the red sub-pixel indices extend from 0 to 957, the green from 1 to 958, and the blue from 2 to 959. Samples 815 are the red blanking transition signals (tr0 . . . tr4), samples 816 are the green blanking transition signals (tg0 . . . tg4), and samples 817 are the blue blanking transition signals (tb0 . . . tb4). These bands 815, 816 and 817 provide a blanked transition between the colors.

In view of the above, realizing that bandwidth limitations may not be critical in certain applications, that the control information is effectively random, that padding can be undesirable, and that grouping control signals on one channel is advantageous, another architecture is proposed.

Figure 13:
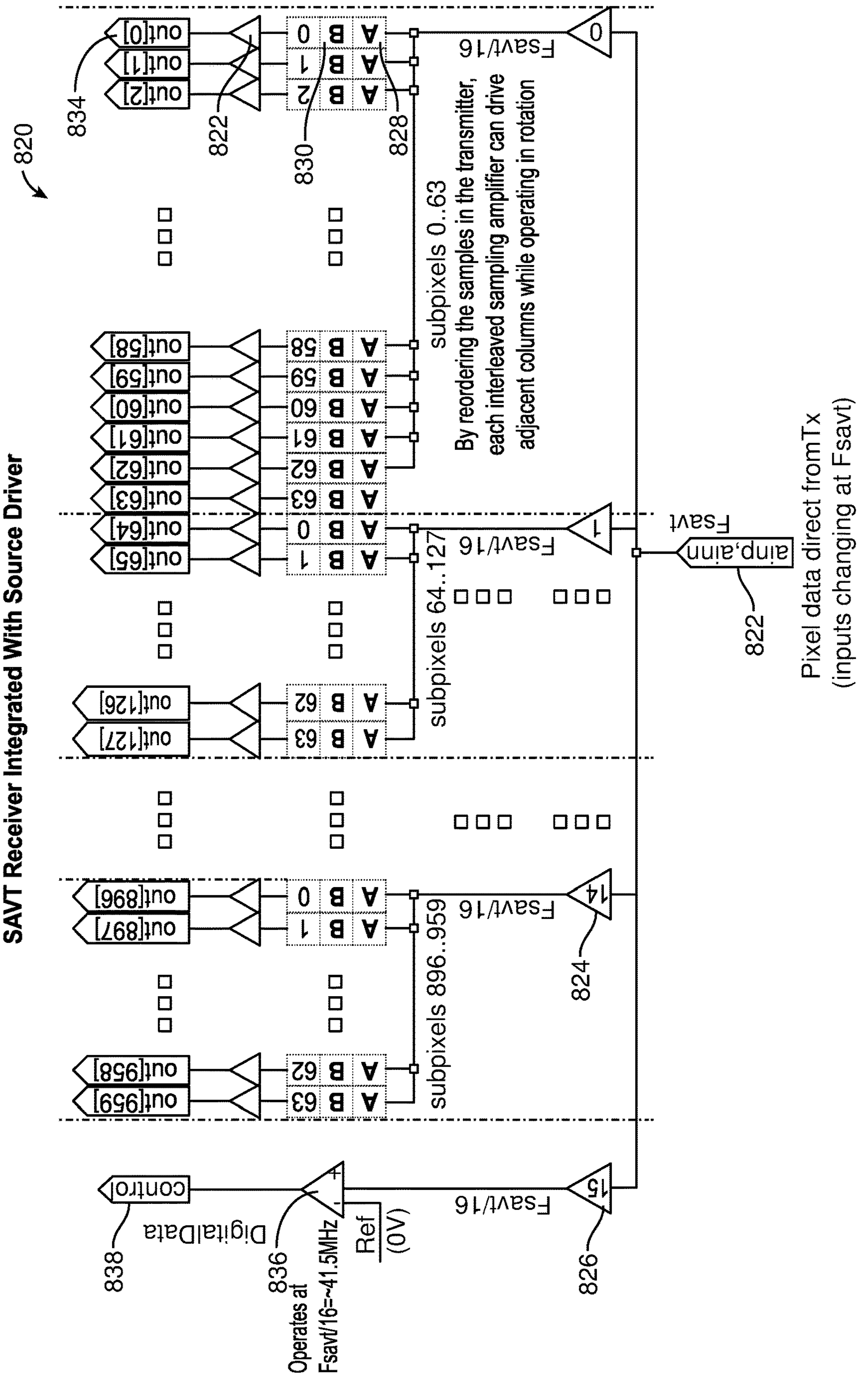
FIG. 13 illustrates an SAVT receiver integrated with a source driver in which each distributor amplifier drives adjacent columns and all control signals are handled by a single amplifier.

FIG. 13 illustrates another architecture of a source driver in which each distributer amplifier drives adjacent columns and all control signals are handled by a single amplifier. If bandwidth is adequate, FIG. 13 provides an architecture that minimizes routing. Shown is an input terminal 822 which de-multiplexes and distributes the incoming pixel data and control signals from the transmitter to S/H amplifiers 824 (inputting the pixel data numbered from 0 to 14) and to amplifier 826 which receives the control signals. The pixel data from amplifiers 824 is transferred to either storage array A 828 or to storage array B 830 as is described above and the control signal is handled by component 836 and output at 838. The pixel data from either storage array is then input into column drivers 832 and output onto the columns 834 as has been described above. Not shown is control logic for controlling the timing of the input amplifiers, storage arrays and column drivers, although such control logic is described above with reference to FIGS. 5 and 6. As the pixel data is received sequentially on a single channel (per chip), it is stored into the A/B collectors sequentially (one Fsavt cycle apart), although it is also possible to store 15 sub-pixels into the array in parallel from the 15 SHA amplifiers.

Thus, 15 interleaved S/H amplifiers receive the incoming pixel data and each drives 64 columns which are adjacent, i.e., 64 video tracks, thereby minimizing the span of columns that are driven by each amplifier. This architecture provides 15 blocks of 64 video samples plus one sub-band channel (control signals) of 64 bits per display line (per source driver). For example, amplifier 0 drives columns 0-63, the second amplifier drives columns 64-127, etc., the 15th amplifier drives columns 896-959 and amplifier 826 drives the control signals. Having all control signals on one channel means no difference in amplitude, delays or other from one signal to the next (if they were on different channels). It is also possible that the control signals arrive on channel zero (i.e., amplifier 0) instead of amplifier 15; that is advantageous in that the control information arrives earlier than the pixel data. Another advantage of this architecture is that control signal extraction needs to look at only one de-interleaving amplifier output rather than be distributed across all amplifiers, simplifying synchronization.

In this figure there are 15 video amplifiers, each driving 64 subpixels=960 subpixels/chip. There is one channel devoted to control, carrying 64 symbols per line (per source driver). By using MFM for timing synchronization (as described below), the 64 symbols will be transition encoded, and after accounting for flag and command bits, that will leave 24 or 25 control bits per line.

As shown, the control channel receives a control signal at amplifier 826 which is input to comparator 836 having a reference voltage of 0 V and operating at a 16th of Fsavt or approximately 41.5 MHz. Assuming that the control signals are in the range of −0.5 V up to +0.5 V, the comparator will detect if the control signal is greater than 0 V (meaning a digital 1) or if the control signal is less than 0 V (meaning a digital zero). This digital data is then output at 838 and thus provides a single control bit every 16 samples. Control signals provide synchronization and phase alignment as described below.

This particular embodiment is for an 8K144 display and example parameter values are shown in Table 1 above. One of skill in the art will find it straightforward to modify the architecture to suit other display sizes and speeds. By reordering the samples in the transmitter, each interleaved S/H amplifier can drive adjacent columns while operating in rotation as is described below.

Figure 14:
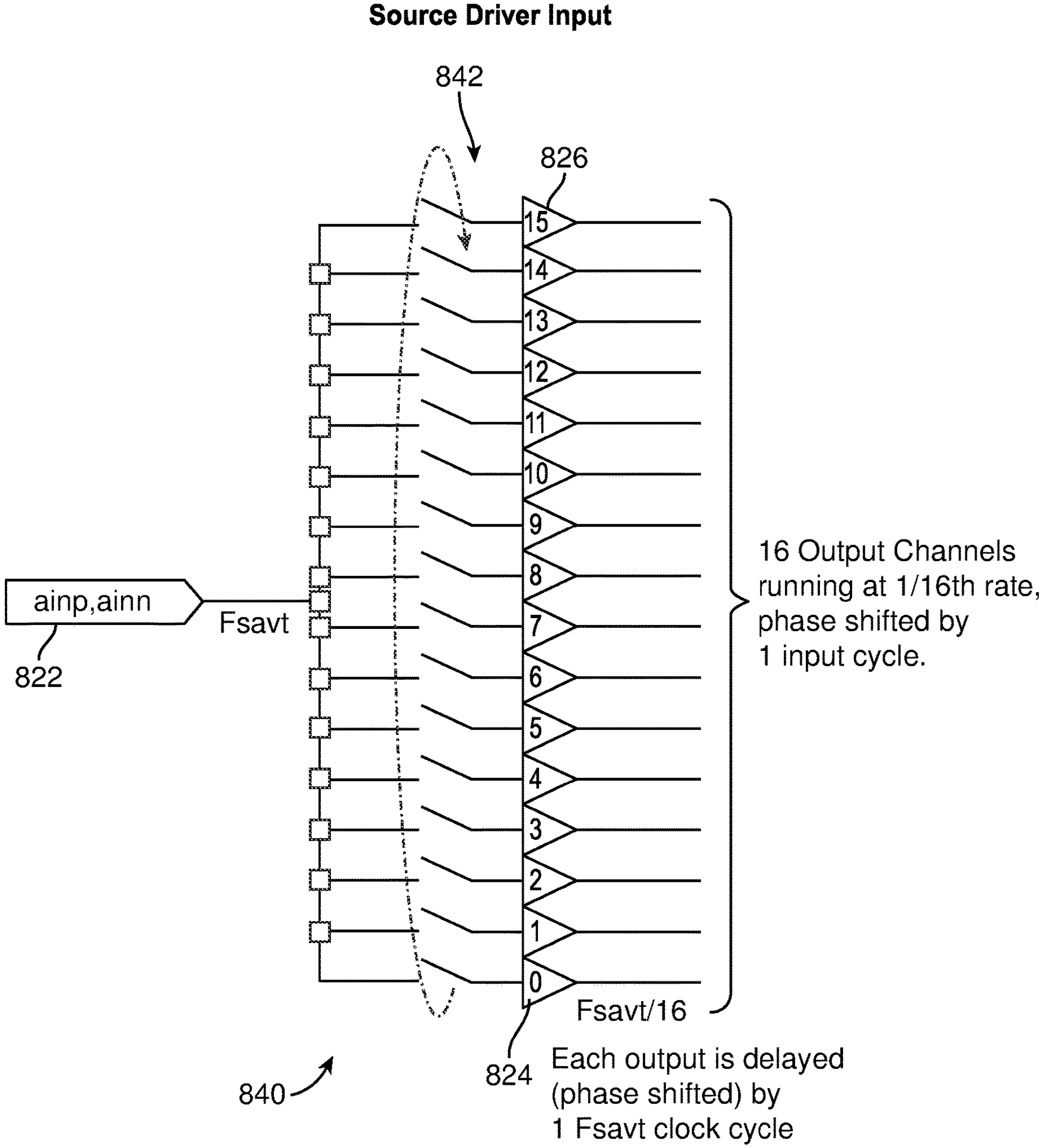
FIG. 14 illustrates a source driver input of source driver 820 for interleaving multiple input amplifiers which allows speed requirements to be met.

FIG. 14 illustrates a source driver input of source driver 820 for interleaving multiple input amplifiers which allows speed requirements to be met. (It is possible to use a single amplifier but transmission speed would be reduced.) Shown is the input terminal 822, distribution amplifiers 0-14 824 and amplifier 826 and an associated switch 842 which rotates in order to effectively connect one amplifier at a time to receive one of the incoming sub-pixels or control signal, as the case may be. Thus, the input is interleaved 16 ways and the outputs of the switch are de-multiplexed into 16 channels running at 1/16 the data rate. Each of the 960 sub-pixels in a line are conveniently grouped into 15 groups of 64 sub-pixels each and one channel is dedicated for detection of, and handling of, control signals.

Figures 15, 16:
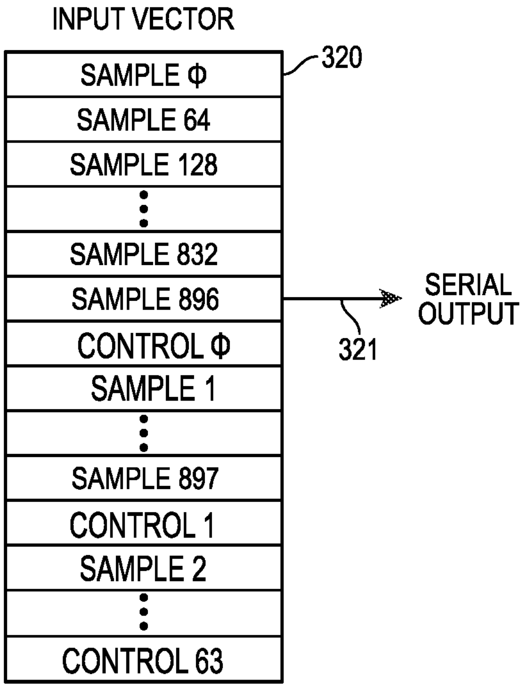
FIG. 15 is a summary of a pixel transmission order showing how pixels and control signals are transmitted from the transmitter to the source driver of FIG. 13 and to which amplifier each is assigned.
FIG. 16 is a block diagram of an input vector of a transmitter having a predetermined permutation that provides for the sequence of sub-pixel transmission required by FIG. 15.

FIG. 15 is a summary of a pixel transmission order 300 showing how pixels 0-959 and control signals 0-63 are transmitted from the transmitter to the source driver of FIG. 13 and to which amplifier each is assigned. Shown is the natural order of sub-pixels as delivered via conventional CEDS from the TCON to the source drivers, for example, the sub-pixels arriving as read from left-to-right and then from top-to-bottom. Because of the 16-way interleaving of the input data at the source driver, the preferred method of transmitting the sub-pixels to the source driver is starting at the top left from top-to-bottom and then from left-to-right, i.e., the indices of the sub-pixels (and control signals) transmitted are 0, 64, 128, etc. Shown are indices for the S/H amplifiers 302, an example of a sub-pixel index 304 and control track 306 of the 16th amplifier.

In this permutation, 15 of the amplifiers (0-14) each drive 64 adjacent columns with sub-pixel values, while amplifier 15 handles all 64 of the control signals. This variation minimizes the hardware in the source driver and also minimizes the wiring load on the input amplifiers. Further, this variation allows for the slowest possible SAVT (Sampled Analog Video Transport) transmission rate (64×16 sampled per line) as padding is not required in the data sequences. In order to best display text and other sharp transitions in intensity, it is preferable that the sampling amplifiers be able to settle to a new value every 1/Fsavt, or approximately 1.5 ns per sample. In order to implement this architecture, the sequence of sub-pixel indices for transmission in a transmitter is: 0, 64, 128, . . . 832, 896; 1, 65, . . . 897; . . . ; 63, 127, 191, . . . 895, 959.

FIG. 16 is a block diagram of an input vector 320 of a transmitter having a predetermined permutation that provides for the sequence of sub-pixel transmission required by FIG. 15. As described earlier, as the sub-pixels arrive in the distributor from the timing controller they are distributed into input vector 320 in the order shown. When full, the samples in the input vector are then output serially via output port 321 to an image processor as described above, converted and then transmitted to a source driver having an architecture as is described in FIG. 13. Not shown are other input vectors of the line buffer; each input vector will have a similar permutation and the other source drivers corresponding to each input vector will have the same architecture as shown in FIG. 13. Shown also are control samples in particular locations. As with any of the synchronization signals, sub-bands, control tracks, digital data of FIGS. 5, 6, 11, 12A, 12B, 13 and 16, that is, those signals sent for control and not actual video samples to be displayed, these signals may be spread over many S/H amplifiers as shown or may be sent on a dedicated channel or track, i.e., track 15 of FIG. 12A or track 0 of FIG. 12B, for example.

The above architecture of source driver 820 of FIG. 13 along with the above transmission order provides the advantages above and also retains the slowest possible SAVT clock rate. Accurate sampling of each sub-pixel within the time available is provided by synchronization as is described below.

Transmitter Integrated with Timing Controller

As mentioned above, in an alternative embodiment the transmitter is integrated with the timing controller, rather than the discrete implementation shown in FIG. 1.

FIG. 7 is a block diagram showing an integrated transmitter and timing controller 640 located immediately after the SoC 120 of the display unit 600. Shown is input of the digital video signal 110 via an HDMI connector (or via LVDS, HDBaseT, MIPI, IP video, etc.) into a system-on-a-chip 120 which performs functions such as a display controller, reverse compression, brightness, contrast, overlays, etc. The modified digital video signal 664 is then delivered to the integrated transmitter and timing controller 640 using LVDS, V-by-one, etc. In this embodiment, the timing controller is integrated with the transmitter and both are implemented within a circuit, preferably an integrated circuit on a semiconductor chip. Note that transmitter and timing controller chip 640 is located immediately after SoC chip 120 thus making transmission of the digital signal (at that point) easier. Preferably, chip 640 is located about 10 cm or less from the SoC chip, in another embodiment about 5 cm or less, and in another embodiment, about 2 cm or less. The physical properties of LVDS will restrict the maximum chip-to-chip communication distance to about several inches.

The integrated transmitter/timing controller 640 receives the digital video signal 664, distributes it into a line buffer or buffers, performs image processing and converts the digital samples into analog samples and transmits EM signals to source drivers as described above. Typically, EM signals 192 are delivered to the source drivers 186 using differential pairs of wires (or metallic traces), e.g., one pair per source driver. The gate driver control signals 190 control the gate drivers 160 so that the correct line of the display is enabled in synchronization with the source drivers. A single reference clock 170 from transmitter and timing controller 640 may be fanned out to all source drivers because each source driver chip performs its own synchronization, but practical realities in drive strength may mean that it is preferable that multiple clocks are distributed. In any case, frequency lock between source driver chips is maintained.

Figure 8:
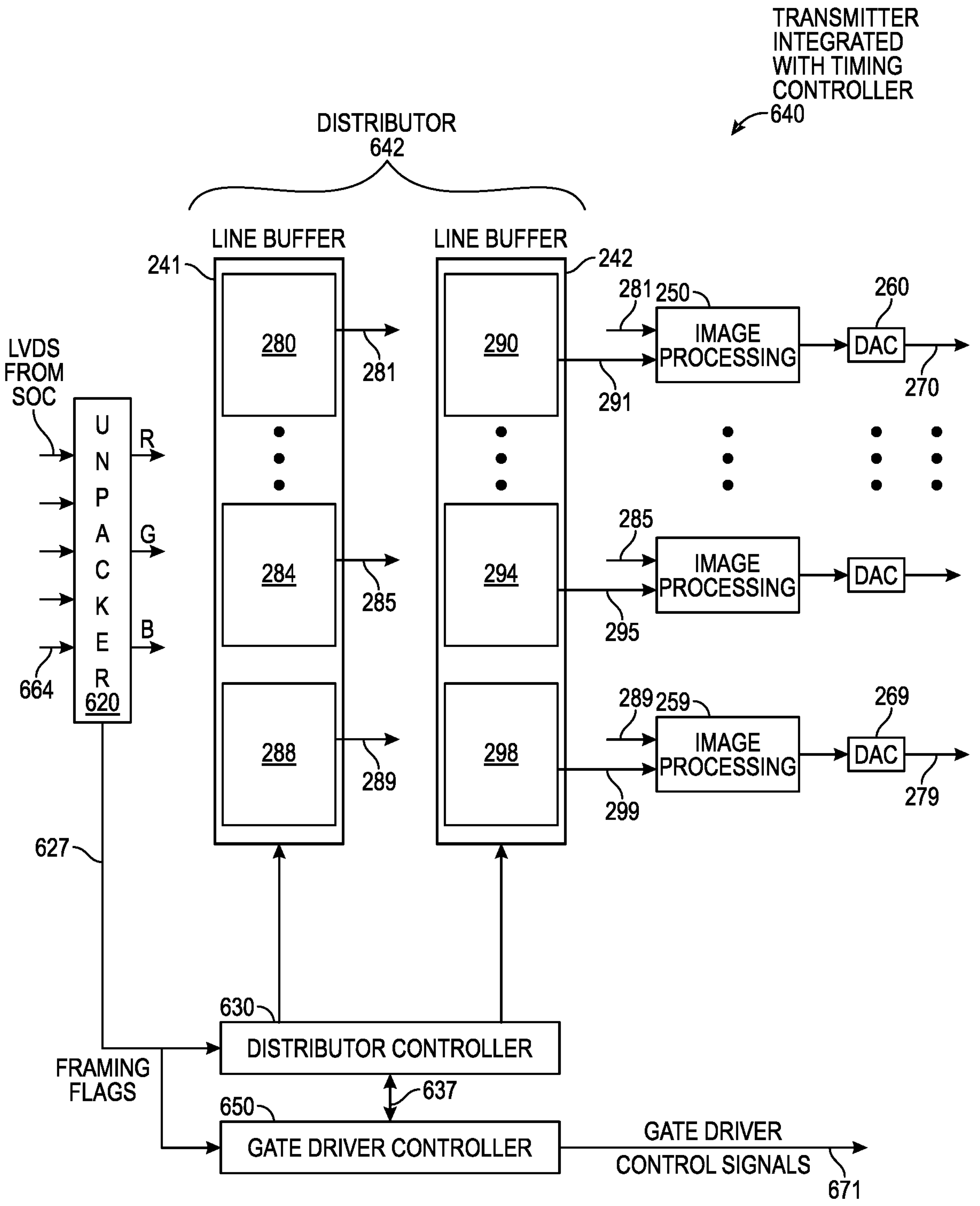
FIG. 8 shows the integrated transmitter and timing controller in greater detail.

FIG. 8 shows the integrated transmitter and timing controller 640 in greater detail using many of the same blocks from FIG. 2. Signal 664 is typically an LVDS digital signal as described above. Unpacker 620 unpacks (or exposes) these serial pixel values into parallel RGB values and outputs framing flags 627 into distributor controller 630 and into gate driver controller 650. Distributor 642 is arranged to receive the exposed color information (e.g., RGB) from unpacker 620 and to fill line buffers 241 and 242 according to the predetermined permutation.

As above, controller 630 coordinates storage and retrieval of pixel values into and from the line buffers.

As mentioned earlier, framing flags 627 come from the unpacker 620 and are input into distributor controller 630 which uses these flags to determine the location of pixels in a line in order to store and then place them into the correct input vectors. After the framing flags are output from the controller 630 (typically delayed) they are input into gate driver controller 650 which will then generate numerous gate driver control signals 671 for control of the timing of the gate drivers. These signals 671 will include at least one clock signal, at least one frame-strobe signal, and at least one line-strobe signal. Once the pixel values have been pushed into the source drivers for a specific line the line-strobe signal is used for a particular line that has been enabled by the panel gate driver controller. The line-strobe signal, thus, drives the selected line at the right time. Control of the timing of the gate drivers may be performed as is known by a person skilled in the art. Also shown is bidirectional communication 637 between controller 630 and gate driver controller 650; this communication is used for timing management between the source and gate drivers.

Operation of the two line buffers, image processors 250-259 and DACs 260-269 may occur as has been described above. Preferably, image processing occurs after unpacker 620 and before the line buffers, in which case image processing blocks 250-259 are removed and replaced with a single image processing block between 620 and 241, 242. And, as mentioned above, image processing need not occur within transmitter 640 but may occur in SoC 120 or in another location.

Transmitter Integrated with Timing Controller and System-on-Chip

As mentioned above, in an alternative embodiment the transmitter is integrated with the timing controller and SoC, rather than the discrete implementation shown in FIG. 1.

Figure 9:
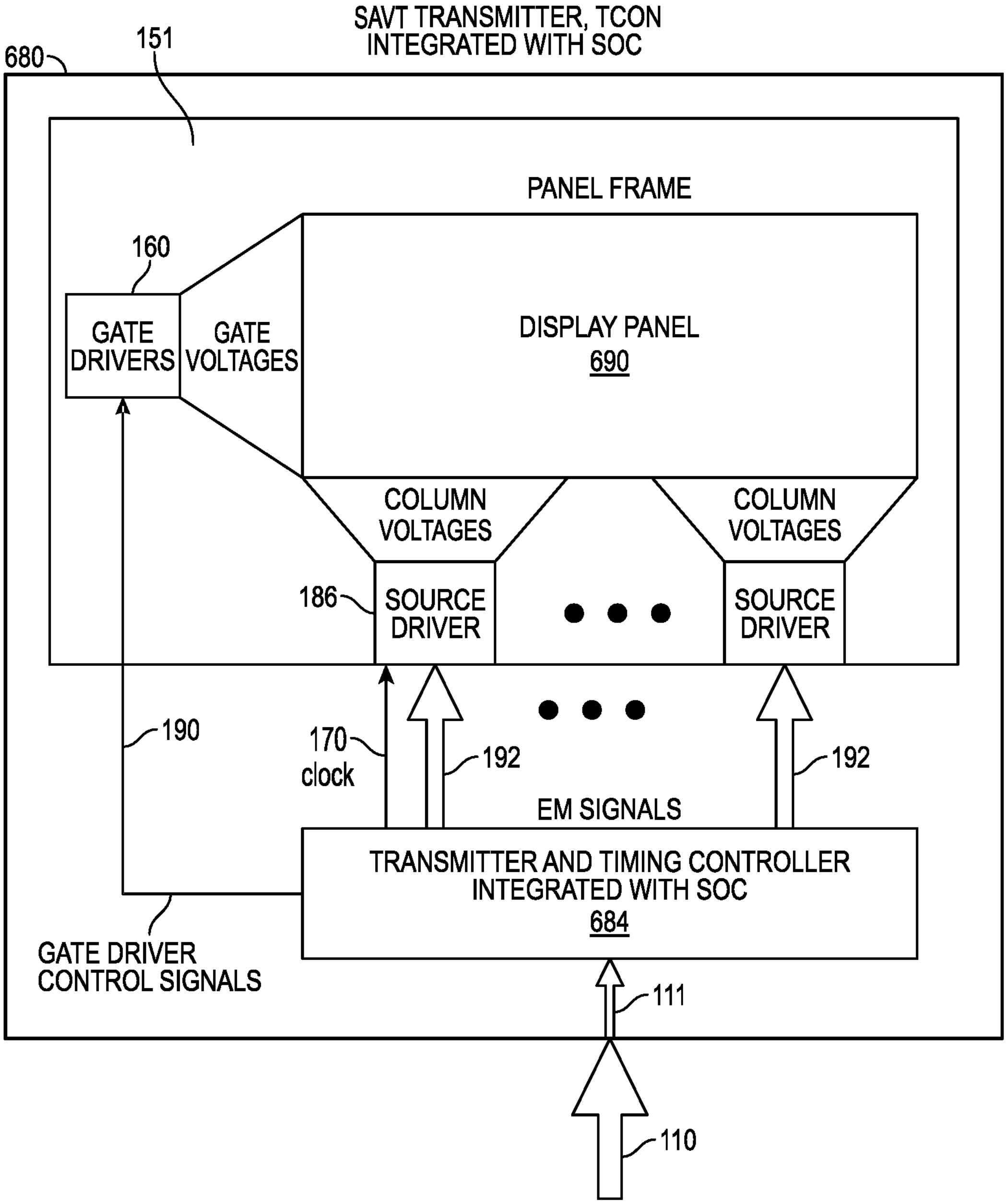
FIG. 9 is a block diagram showing an integrated transmitter, timing controller and SoC within the display unit.

FIG. 9 is a block diagram showing an integrated transmitter, timing controller and SoC 684 within the display unit 680. In this embodiment, converting of the digital video signal 110 into analog signals 192 occurs within a single chip 684 which integrates the transmitter, timing controller and SoC.

Shown is an input of a digital video signal 110 via an HDMI connector (or via LVDS, HDBaseT, MIPI, IP video, etc.) into the display unit 680, which is then transmitted internally 111 to the integrated SoC. The SoC performs its traditional functions such as display controller, reverse compression, brightness, contrast, overlays, etc. After the SoC performs its traditional functions, the modified digital video signal (not shown) is then delivered internally to the integrated transmitter and timing controller using a suitable protocol such as LVDS, V-by-one, etc. In this embodiment, the timing controller and transmitter are both integrated with the SoC and all three are implemented within a single circuit, preferably an integrated circuit on a semiconductor chip.

The transmitter within circuit 684 converts the modified digital video signal into analog EM signals 192 which are transported to display panel 690. Preferably, signals 192 are delivered to the source drivers 186 using differential pairs of wires (or metallic traces), e.g., one pair per source driver. Gate driver control signals 190 control the gate drivers 160 so that the correct line of the display is enabled in synchronization with the source drivers. Typically, the distance between chip 684 and source drivers 186 is in the range of about 5 cm to about 1.5 m, depending upon the panel size. A single reference clock 170 from transmitter, timing controller and SoC 684 may be fanned out to all source drivers.

The integrated chip 684 may be implemented as herein described, i.e., as shown in FIGS. 1-4 and 7, 8, keeping in mind that the functionality of the transmitter, timing controller and SoC are all integrated on the same chip or circuit. This embodiment of FIG. 9 has the same advantages listed above with respect to FIG. 7. In addition, by integrating the transmitter and timing controller with the SoC chip further advantages are obtained such as fewer chips, less complexity, smaller area required, and less power needed. Further, no DACs (digital-to-analog converters) are needed at the display panel nor within the source drivers for conversion of video signals.

Video Transport System Embodiment

Figure 10:
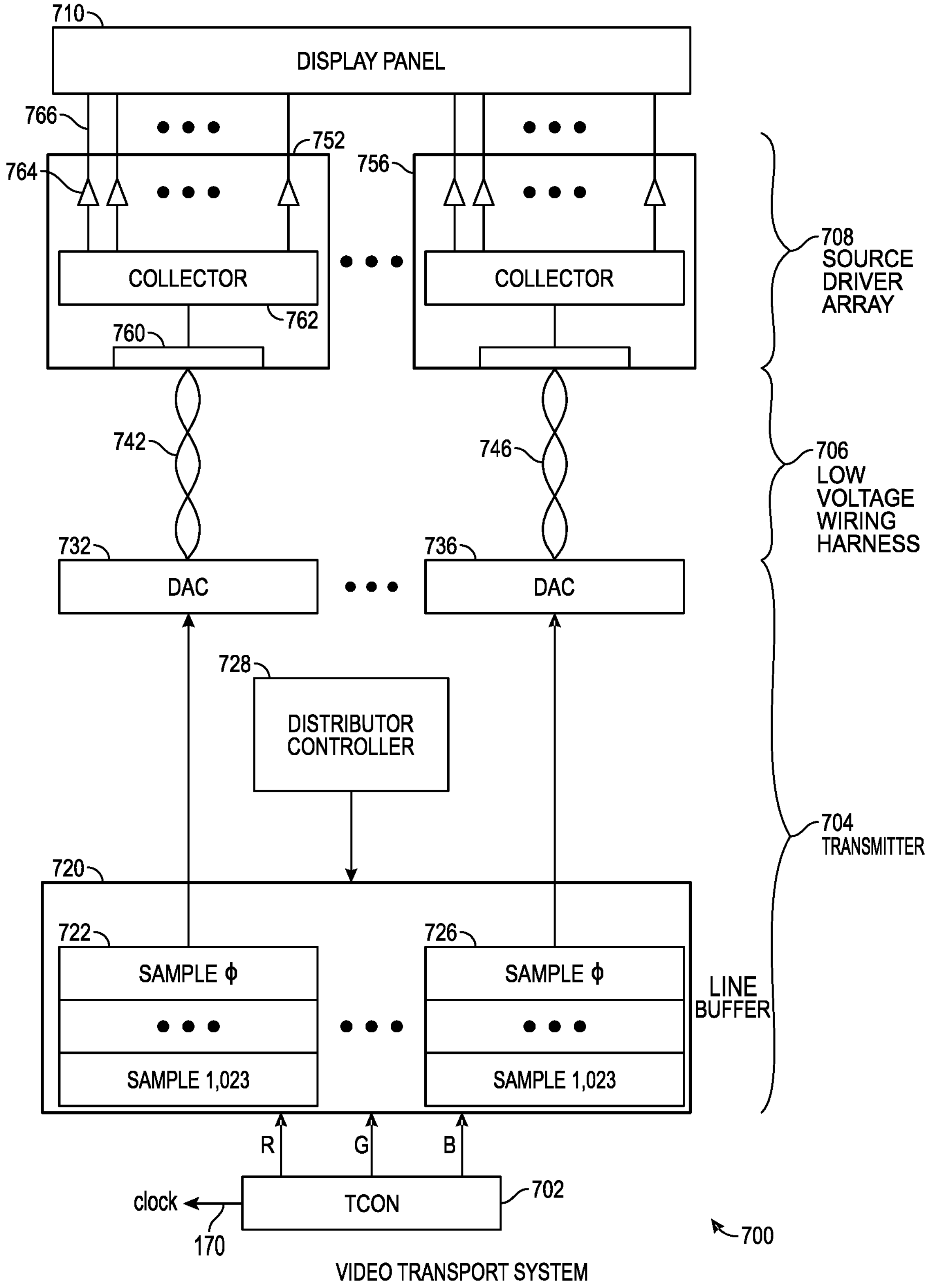
FIG. 10 illustrates a video transport system within a display unit.

FIG. 10 illustrates a video transport system 700 within a display unit. Shown is a timing controller 702 that outputs sets of color samples as described above, such as sub-pixel values in digital form representing brightness values from an image or video to be displayed upon display panel 710. The samples are input into a transmitter 704, converted into analog and transmitted over a low-voltage wiring harness 706 to a source driver array 708 for display upon display panel 710.

A distributor of the transmitter includes line buffer 720, any number of input vectors (or banks) 722-726, and a distributor controller 728. The RGB samples (or black-and-white, or any other color space) are received continuously at the distributor and are distributed into the input vectors according to a predetermined permutation which is controlled by the distributor controller 728. In this example, a row-major order permutation is used and the first portion of the row of the incoming video frame (or image) from left to right is stored into input vector 722, and so on, with the last portion of the row being stored in input vector 726. Accordingly, line buffer 720 when full, contains all of the pixel information from the first row of the video frame which will then be transported and displayed in the first line of a video frame upon display panel 710. Each input vector is read out serially into its corresponding DAC 732-736 and each sample is converted into analog for transport. As samples arrive continuously from timing controller 702 they are distributed, converted, transported and eventually displayed as video upon display panel 710. There may be two or more line buffers, as shown and described in FIGS. 2, 3 and 8.

Connecting the transmitter 704 to the source driver array 708 is a low-voltage wiring harness 706 consisting of differential wire pairs 742-746, each wire pair transporting a continuous stream of analog samples (an electromagnetic or EM signal) from one of the DACs 732-736. Each differential wire pair terminates at the input 760 of one of the source drivers 752-756. Other transmission media (e.g., wireless, optical) instead of a wiring harness are also possible.

Each source driver of the source driver array such as source driver 752 includes an input terminal 760, a collector 762 and a number of column drivers 764 (corresponding to the number of samples in each input vector, in this example, 1,024). Samples are received serially at the terminal 760 and then are collected into collector 762 which may be implemented as a one-dimensional storage array or arrays having a length equal to the size of the input vector. Each collector may be implemented using the A/B samplers (storage arrays) shown in FIG. 5 or FIG. 6. Once each collector is full, then all collected samples are output in parallel into all of the column drivers 764 of all source drivers, amplified to the appropriate high-voltage required by the display panel, and output onto columns 766 using a single-ended format. As samples arrive continuously over the wiring harness, each collector continues to collect samples and output them to the display panel, thus affecting presentation of video.

Synchronization of Sampled Analog Video Transport

Synchronization may be used to provide for horizontal synchronization (beginning of a display line), vertical synchronization (first display line of a frame) and sample phase alignment (when to sample incoming sub-pixel samples). In other words, a receiver such as a source driver receiving a stream of video pixels needs information from a transmitter telling it where the start of a frame is, where the start of a line is, and at what point to sample data representing a particular sub-pixel. For example, each switch 842 needs to know when a sample on the input is valid and stable so that the correct value can be sampled; a process referred to as sample phase alignment determines when to sample. Sample phase alignment accounts for different delays from the TCON to geographically-distributed source drivers of a display; we optimize the phase of the locally-generated clock 171 (derived from reference clock 170) relative to the locally-delivered samples as described in more detail below.

Synchronization is useful (and can be made difficult) for a variety of reasons. For one, a constant stream of video sub-pixels does not inherently have information indicating the start of a frame, the start of a line or phase alignment data. Also, the delay along cables from a transmitter to receiver is potentially variable and is typically not known. Further, attenuation on the cables (which can be different between paths to the various source driver chips) can also be problematic. Finally, the wave shape of the incoming sub-pixel value may not be known or can be variable due to ringing, overshoot, filtering, rate of change of the input value, or other kinds of distortion of the signal.

Realizing that synchronization is important and can be made difficult by the above factors, a technique herein described provides commands for synchronization and phase alignment of analog samples.

We use a timing reference (i.e., a special timing violation not occurring during normal data transmission) referred to herein as a "flag" that informs the receiver, i.e. the source driver, that it may reset its clock and that what follows are known commands or data for synchronization. For instance, once the flag has been received we then receive a command to begin phase alignment and then determine the optimal sampling phase to sample an incoming sub-pixel. To begin with, we are aware of the frequency of the transmission of samples (i.e., the rate at which samples are arriving at the input terminal of the source driver); in the example herein Fsavt is approximately 664 MHz (673.92 MHz for the HY1002). As it can be impractical to transmit that high-frequency clock, in one embodiment we transmit a slower clock, Fsavt/64=10.375 MHz (10.53 MHz for the HY1002) to each source driver and each source driver uses a phase-locked loop to multiply that frequency up to the higher frequency clock. We also know that there are 15 sub-pixel data streams arriving at Fsavt/16 at each input amplifier, that each of these input amplifiers delivers 64 samples and that there will be a control stream (either analog or digital control signals) arriving at the 16th amplifier and having 64 control signals per line.

Figure 17A:
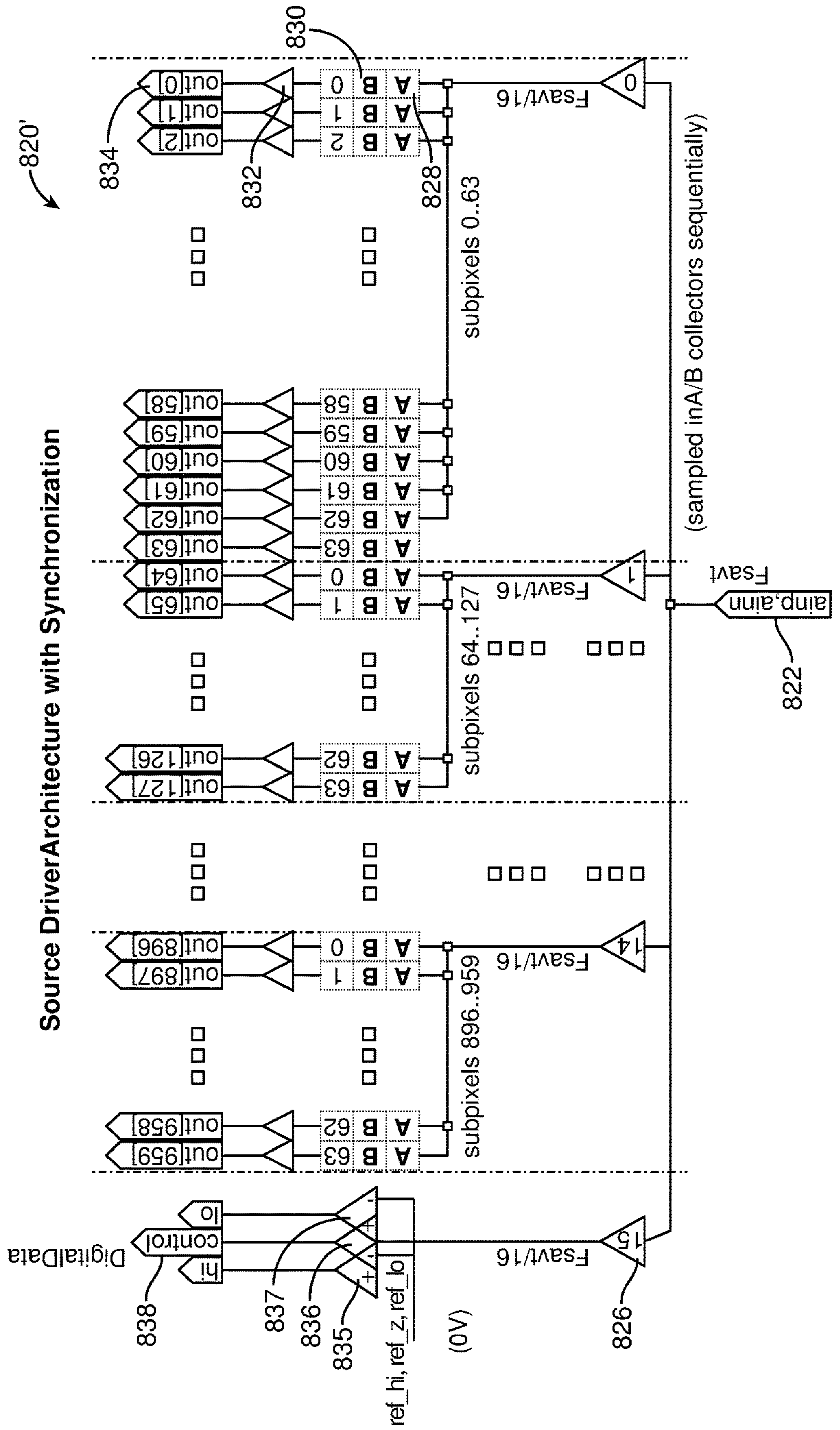
FIG. 17A illustrates the source driver of FIG. 13 showing the control channel in greater detail and three comparators used to extract phase alignment information from the control signals.

FIG. 17A illustrates the source driver of FIG. 13 showing the control channel in greater detail and three comparators used to extract phase alignment information from the control signals. In this particular embodiment, the control channel handled by amplifier 826 includes three comparators 835-837. Comparator 836 has been described above and outputs a logical "1" or a logical "0" depending upon the value of the control signal. Comparator 835 has a high reference voltage used to detect an upper threshold and comparator 837 has a low reference voltage used to detect a lower threshold; these references may be set by a DAC. Comparators 835-837 operate at Fsavt=650 MSPS.

The central comparator will be reliable (as it is a zero-crossing detector) and generally the data extracted from this central comparator will correspond to the data extracted on the high and low channels assuming all is working correctly (i.e., if the control signal is +0.4 V both the central comparator 836 and the high comparator 835 will both detect a logical "1"). But, if sampling is occurring at the wrong time it is very likely that the central comparator will provide the correct bit but the high and the low values from the other two comparators will disappear. The concept here is that the high and low data require the input to have nearly settled to receive the correct value whereas the zero-crossing detector will be right even if the input sample is still slewing. Using only one of the high or low comparators along with the central comparator is also possible. Use of this information is discussed below with regard to phase alignment.

Figure 17B:
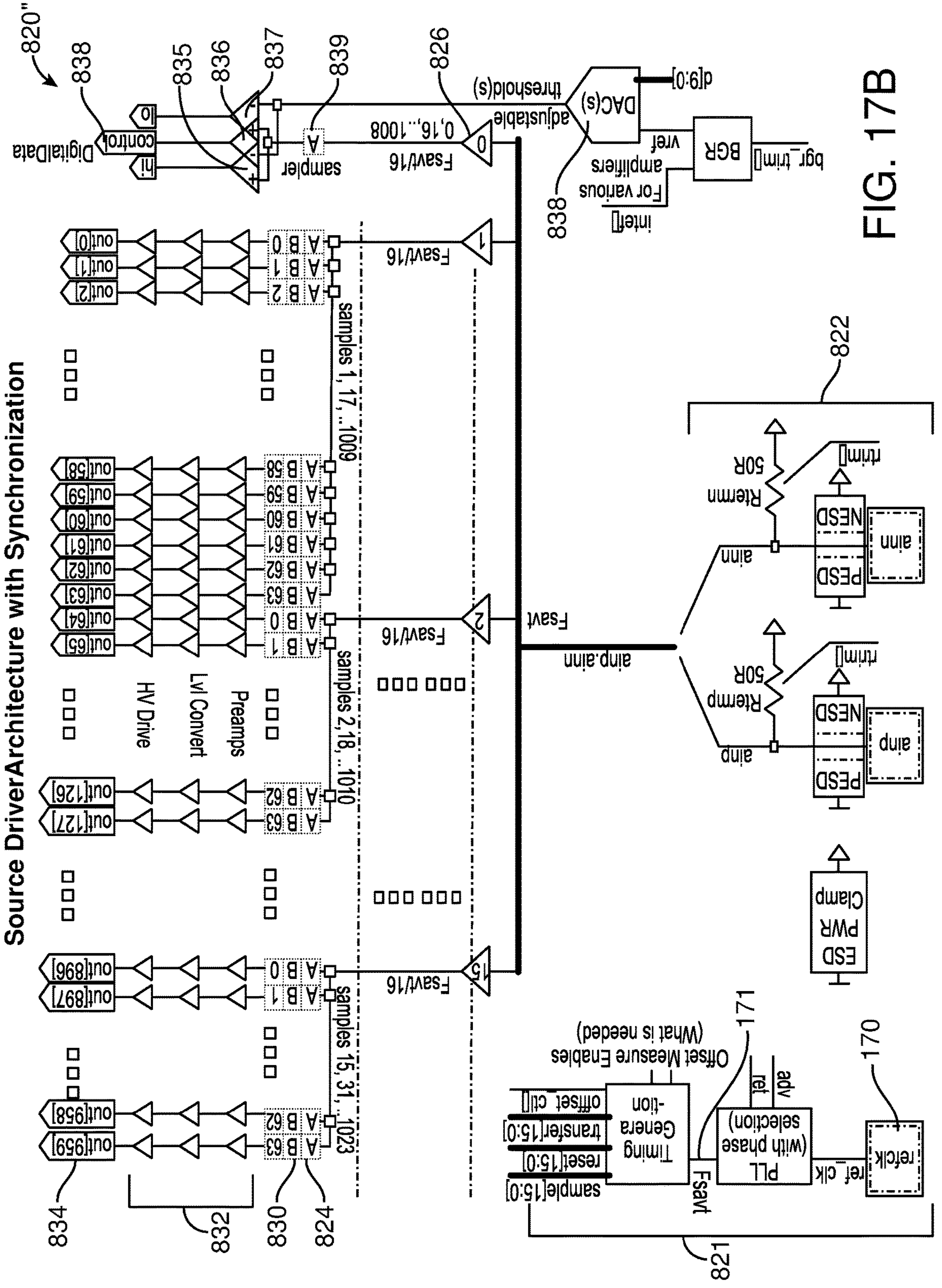
FIG. 17B illustrates an alternative source driver 820" to the source driver of FIG. 17A showing greater detail and control signals at the first amplifier.

FIG. 17B illustrates an alternative source driver 820" to the source driver of FIG. 17A showing greater detail and control signals at the first amplifier. Shown is timing generation 821 (discussed below), input terminal 822, DAC 838 for adjustable thresholds and sampler block 839. Comparators 835-837 are clocked comparators for control signal extraction. Amplifier 832 is an amplifier stage including a pre-amplifier, level conversion and a high-voltage driver. Shown are 16 interleaved sampling amplifiers with offset cancellation (SHA amplifier and offset control) including amplifier 826. Preferably, in this embodiment we use amplifier 0 (826) for control signals (rather than amplifier 15 as in FIG. 17A) so that the control information arrives with time to spare before the end of the display line time. This provides for a small amount of time to decode the control channel and set up signals that will be used within the next line time.

Figure 17C:
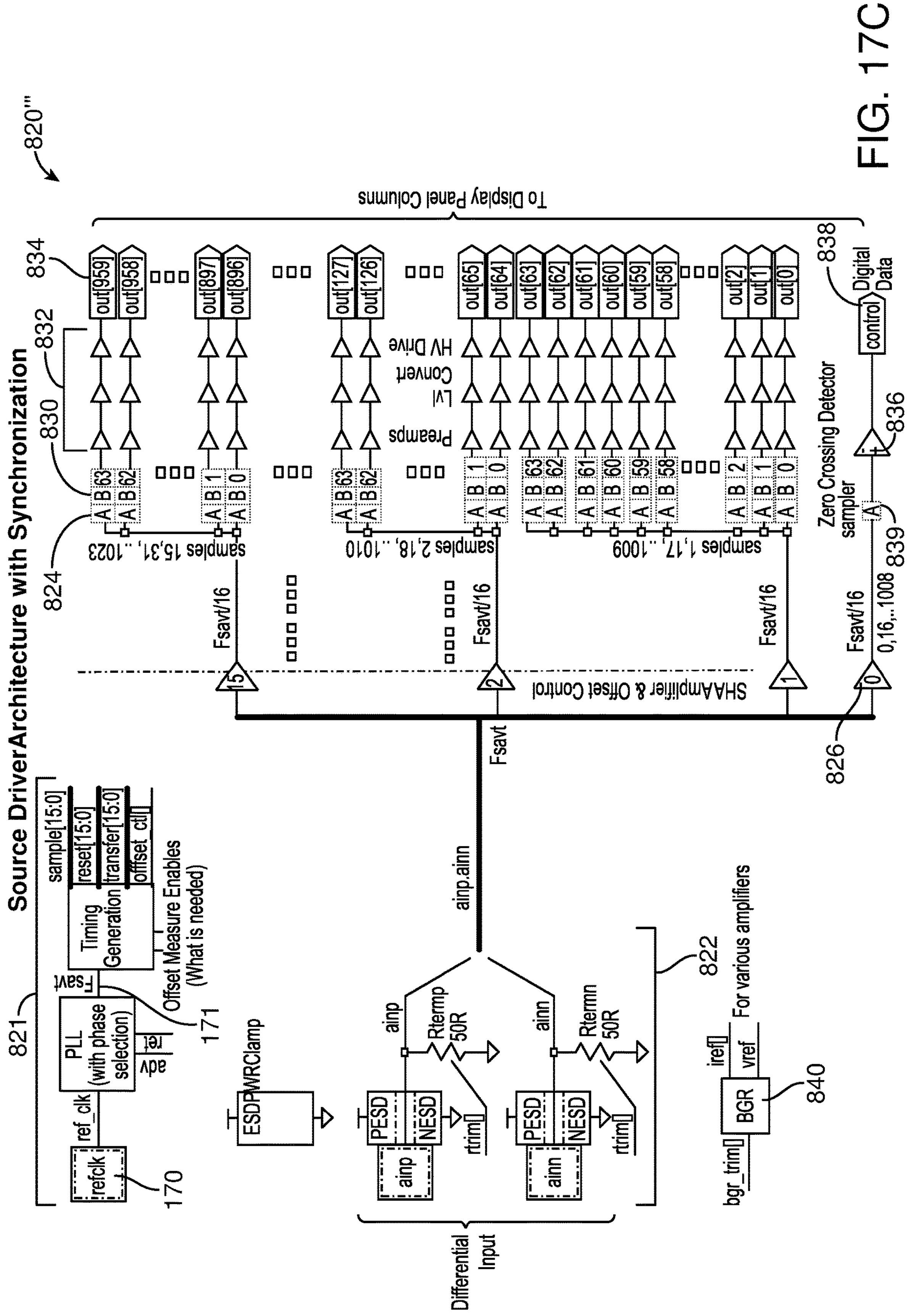
FIG. 17C illustrates a preferred source driver 820'" to the source driver of FIG. 17B.

FIG. 17C illustrates a preferred source driver 820''' to the source driver of FIG. 17B. Shown is timing generation 821, input terminal 822, and sampling block 839. Comparator 836 is a comparator for control signal extraction. Amplifier 832 is an amplifier stage including a pre-amplifier, level conversion and a high-voltage driver. Shown are 16 interleaved sampling amplifiers with offset cancellation (SHA amplifier and offset control) including amplifier 826. Preferably, in this embodiment we use amplifier 0 (826) for control signals (rather than amplifier 15 as in FIG. 17A) so that the control information arrives with time to spare before the end of the display line time. This provides for a small amount of time to decode the control channel and set up signals that will be used within the next line time.

In this embodiment, it is realized that synchronization requires only a single comparator 836 (a zero crossing detector) on a single SHA channel and does not need DACs to set comparison thresholds. The algorithm for synchronization runs in the digital domain (the zero crossing detector output) and can perform both clock-level synchronization (alignment of SHA outputs so that the side-channel is seen on one particular SHA output) and phase-level synchronization (choosing the optimal sampling phase within a clock cycle).

At input terminal 822, there is one analog input differential with matched termination and ESD protection. This is driven by a 50R source impedance per side through a 50R transmission line. Hence, there will be a 50% reduction in voltage received compared to the voltage transmitted. The PLL of 821 multiplies the relatively slow reference clock 170 from the TCON (e.g., Fsavt/64) up to the full speed Fsavt clock 171 (e.g., approximately 675 MHz in HY1002) with 11 phases (for example), selectable per clock cycle. There is also high-speed timing generation to generate sampling strobes, reset signals and output transfer strobes for the SHA amplifiers 0-15. A 16-way de-interleaver 840 is built using the SHA amplifiers as shown in FIG. 14; its ON switch rotates such that effectively only one is on at a time. (In HY1002, two amplifiers are always on at the same time, with an overlap for one SAVT cycle.) Thus, 16 consecutive samples are de-interleaved across 16 amplifiers sequentially, allowing each amplifier more time to settle. As shown, each of 15 SHAs drive 64 adjacent sub-pixel columns, consisting of pre-amplifiers, level converters (differential to single ended) and high-voltage drivers to drive the display columns. One of the SHAs drives control samples (note that each control sample is 16 samples apart). The control samples represent digital values to make the system robust, using a form of transition coding (e.g., MFM) to provide timing and control information. Bandgap voltage reference circuit 840 provides current and voltage references for the various input amplifiers.

FIG. 17D is a summary of a sub-pixel order collected by the input amplifiers of FIG. 17C. The summary shows how pixels 0-959 and control signals 0-63 are transmitted to the source driver of FIG. 17C and to which amplifier each sub-pixel is assigned. Because of the 16-way interleaving at the source driver, the preferred method of transmitting the sub-pixels to the source driver is starting at the top left from top-to-bottom and then from left-to-right, i.e., the indices of the sub-pixels (and control signals) transmitted are ctrl0, 0, 64, 128, etc., to the 16 amplifiers in turn. Shown are indices for the S/H amplifiers 842, an example of a sub-pixel index 844 and control signals 306 of the 0th amplifier 826.

This sub-pixel order minimizes the hardware in the source driver and also minimizes the wiring load on the input amplifiers. In order to best display text and other sharp transitions in intensity, it is preferable that the sampling amplifiers should be able to settle to a new value every 1/Fsavt, or approximately 1.5 ns per sample. As shown, SHA 0 carries control and timing; SHA 1-15 carries video data such that each SHA drives 64 adjacent columns of the display. Since the SHAs are sequentially sampled, this leads to a transmission order of: CTL[0], V[0], V[64], . . . V[896], CTL[1], V[1], V[65], . . . V[897], . . . , CTL[63], V[63], V[127], . . . V[959]. The order provides 64 control bits per line and 960 video samples per line and a total of 1,024 samples transmitted per line (per source driver).

Figure 18:
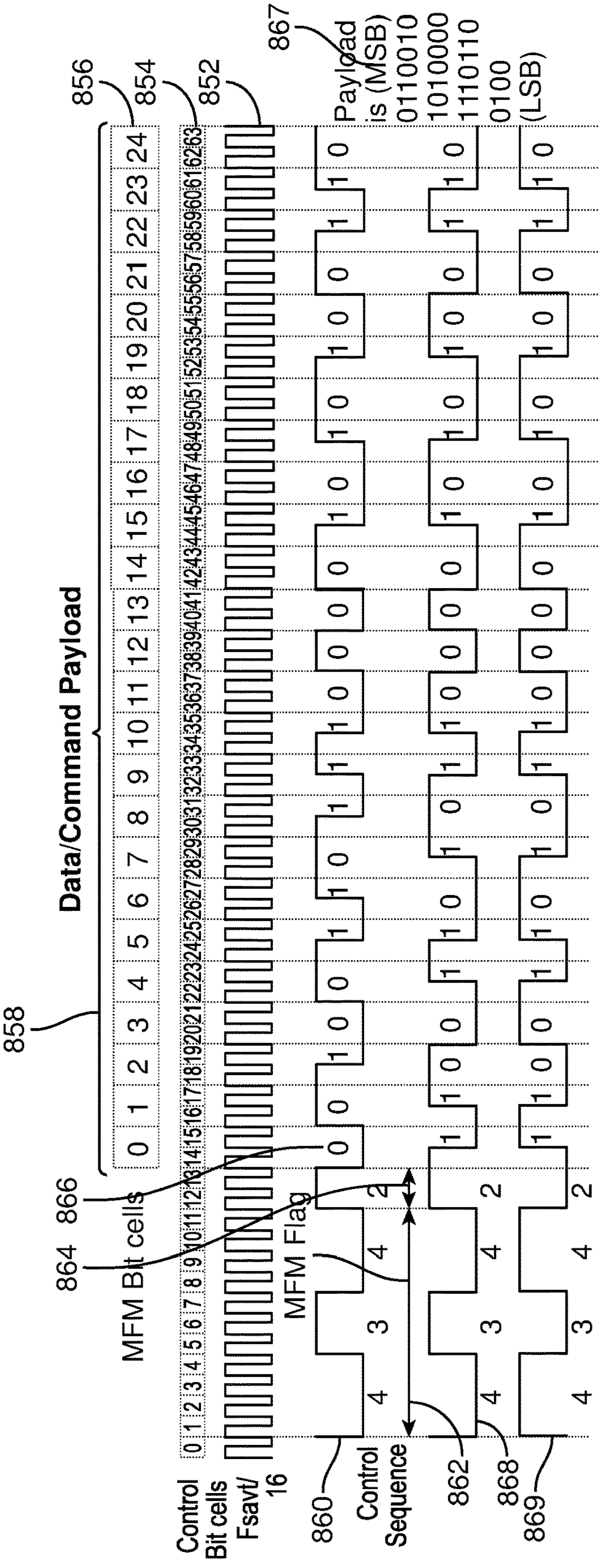
FIG. 18 illustrates a technique to introduce a timing reference into the sequence of control signals.

FIG. 18 illustrates a technique to introduce a timing reference into the sequence of control signals in order to provide synchronization and other commands on a control channel of the source driver. As the control signals look like a continuous stream of bits, we introduce a timing reference into the control sequence in order to interpret the sequence. MFM (modified frequency modulation) typically is used in radio transmissions to provide a timing reference. Although MFM is known in the art, it has not been used before to encode control sequences for video transport. We realize it may be used in the context of the present invention in order to introduce the timing reference and to send commands and data. Further, MFM has not been used in the past to send these types of commands in the context of video transmission. For example, use of the horizontal and vertical synchronization commands along with their particular parameters allows transmission of all parameters that CEDS supports. Moreover, the phase alignment commands are novel as well as the particular phase alignment techniques described below.

The timing reference indicates a point in time at which afterward what follows are commands and data in the control sequence; the timing reference is an MFM Flag which is a deliberate timing violation. We assume that the wire length from Tx to Rx is >1 SAVT cycle and that the wire length may be a variable. We extract digital data on the control channel so it is robust, even if the analog samples are not perfect. Further, level values are irrelevant, only the transitions are important, and true and complement values have the same meaning.

Timing signal 852 is Fsavt/16 which corresponds to the timing of the output from the input amplifiers, i.e., the rate at which each amplifier outputs data. Control bit cells 854 represent a sequence of 64 bits received as a control signal at output 838 of one of the source drivers. MFM cells 856 represent the MFM-encoded bits, one MFM cell for every two control bits and payload 858 is a command and data. Control sequence 860 is a sequence of control bits received on a control channel at one of the source drivers and output at control 838 of source driver 820''', for example.

As shown, the control sequence includes an MFM flag 862 which is a sequence that does not normally occur in the stream of control bits. Flag 862 consists of a sequence of transitions, spaced 4-3-4 control bits, and then the end of the fifth transition denotes the end of the flag (the timing violation). Then there is a trailing zero 864 which is an MFM-encoded zero ignored by the data receiver before the actual payload begins. The payload is then sent typically LSB first, although sending MSB first may also be used; the LSB 866 in the 0 position of MFM bit cells 856 is shown in the control sequence is having the value “0.” A total of 25 MFM-encoded cells are sent and the payload 867 is shown to the right of the control sequence. Shown at 868 is a second control sequence different from sequence 860 but having the same MFM flag and trailing zero; the payload it sends is different, reflecting different commands and data that may be sent over a single control channel. Another example of a control sequence is at 869. The payload sent may represent commands, parameters or be reserved for future use.

Synchronization is complicated because we receive data over 16 channels from the de-interleaving amplifiers. A source driver will not know which channel holds the control sequence until synchronization occurs. One proposed method is to use a flag sequence that appears on just one channel output. Identification of the MFM flag tells the source driver chip to resynchronize and be ready for commands or data, such as a horizontal or vertical synchronization command, or phase alignment mode. At power on (or after an outage) the transmitter will transmit the MFM flag and control sequence on all channels and the correct control channel (in this example, the 16th channel) will recognize the flag, resynchronize the timing and recognize commands and parameters. Once resynchronization has occurred, the control sequence need only be sent on the control channel and video data may be sent on the other 15 channels.

Another, more preferable, method is to transmit the MFM flag on one channel, not on all 16 channels initially. The receiver looks for the flag on one channel (and before synchronization is complete, this may be the wrong channel). If after one line time (~1.5 us) the flag is not detected, the clock is slipped (skipped) for 1 cycle, effectively rotating the amplifier usage. Synchronization to the clock cycle can therefore take up to 16 display line times.

Because the control stream is continuous, the commands and parameters may be extended over multiple display lines if necessary. And even though conventional CEDS transmits approximately 28-32 control bits per display line, we realize that some of these bits do not need to be conveyed each line (some, e.g., low temperature mode, power control, etc., may be frame parameters), i.e., less frequent transmission is adequate. And such a control channel disclosed herein is robust enough to not require CRC since we extract digital data and the same channels convey analog video samples to 10-bit accuracy. Nevertheless, CRC may be added. Another advantage of using MFM in the context of video transmission is that when the flag occurs it provides an immediate and accurate timing reference; there is no waiting for correlation as is the case for other techniques such as Kronecker. Further, this control channel is adequate to convey commands such as frame synchronization, line synchronization, parameter data, and phase alignment information. The commands are sent distributed (sent sequentially one symbol at a time over one line period) and the received control information applies for the next display line. Typically, the control sequence never ends. One control packet is sent every line period. Information such as the polarity of the column driver, driver strength, etc. is carried per line.

Figure 19A:
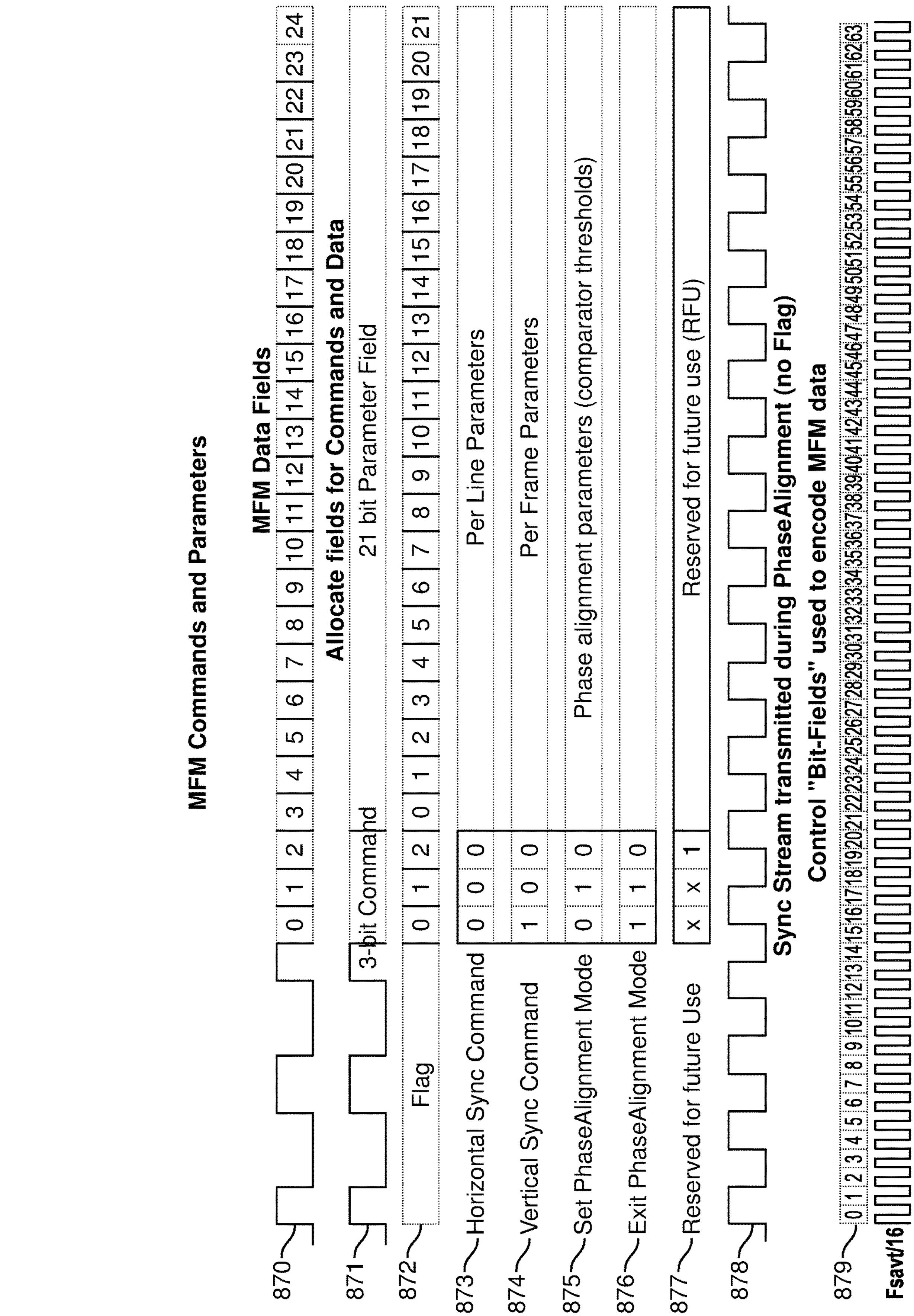
FIG. 19A illustrates control sequence commands and parameters.

FIG. 19A illustrates one embodiment for sending commands and parameters via MFM encoding. Shown is the timing clock Fsavt/16 at the bottom as described above and the control bit fields 879 used to encode the MFM data. Shown is a control sequence 870 including an initial MFM flag followed by 25 MFM cells as described above. Control sequence 871 illustrates how three of the MFM cells may be used to hold a three-cell command leaving 21 cells for parameters. Greater or fewer than three cells may be used for commands depending upon the implementation. Sequence 872 illustrates the location of the MFM flag in relation to the MFM cells. Sequence 873 illustrates a three-cell horizontal synchronization command followed by 21 cells available for parameters. Sequence 874 illustrates a three-cell vertical synchronization command followed by 21 cells available for parameters. Sequence 875 illustrates a set phase alignment mode command followed by parameters which may include comparator thresholds. Sequence 876 illustrates an exit phase alignment mode command. This command is not strictly necessary in that receipt of any other command would cause an exit of the phase alignment mode. Sequence 877 illustrates possible values of commands reserved for future use and space for their parameters.

Synchronization stream 878 is a stream transmitted on the control channel continuously during the phase alignment mode. It is contemplated that for purposes of determining the threshold of the upper comparator 835 (if phase alignment of FIG. 20 is used) that this stream will be modulated to include two levels, namely 1 V every other pulse and 1.2 V every other pulse, although these voltages may vary. Phase alignment will typically be performed before turning on the display and during frame blanking (because thermal or other effects may change the best phase in which to sample). Once the phase alignment has been set then the phase alignment mode is exited and the video will appear normal.

Figure 19B:
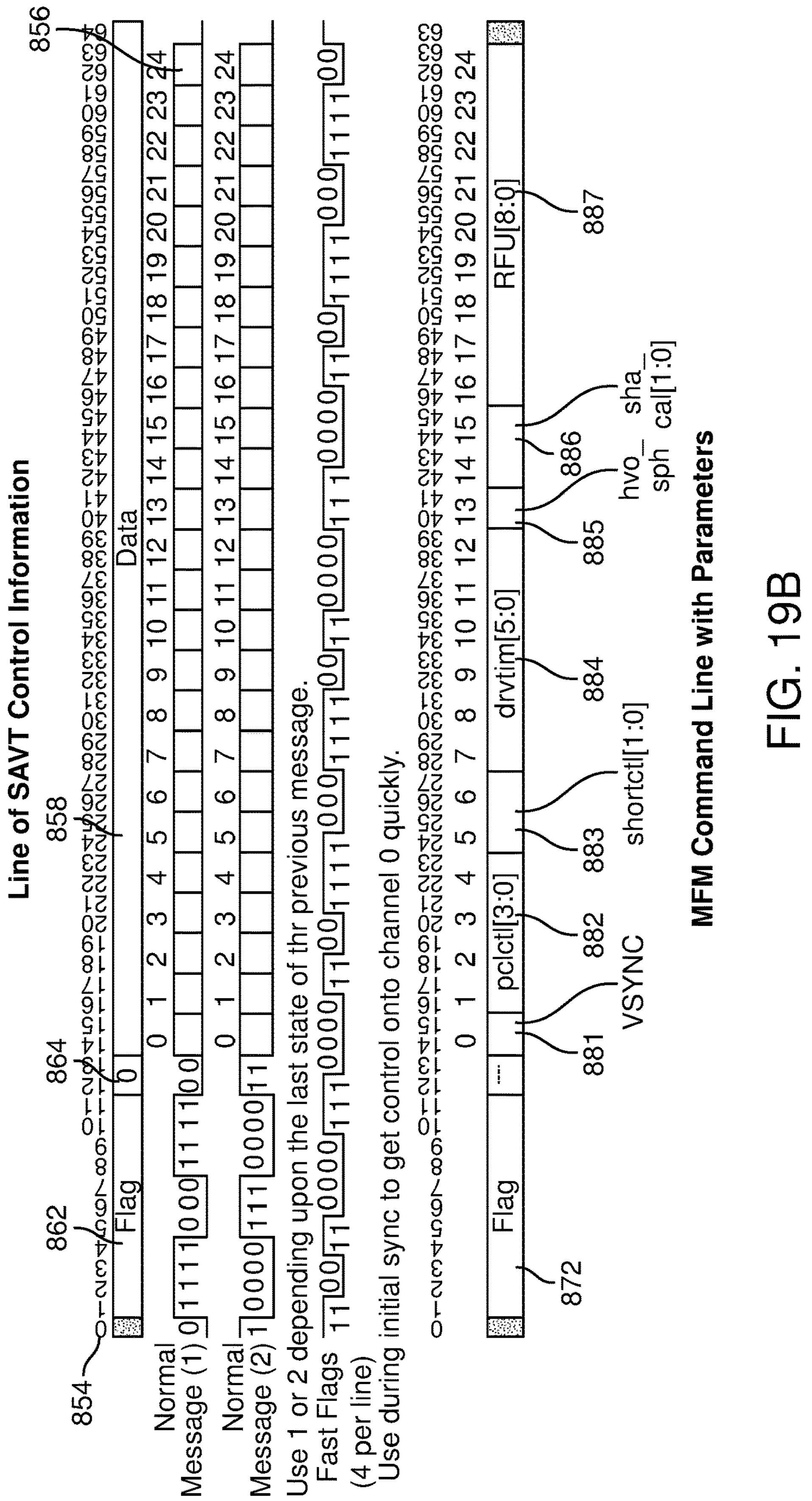
FIG. 19B illustrates another technique for sending commands and parameters using MFM.

FIG. 19B illustrates another embodiment for sending commands and parameters via MFM encoding. Whereas FIG. 19A shows different command lines and each command identified by a different 3-cell command, FIG. 19B shows a single command line including parameters for a variety of commands. Shown are control bits 854 including a flag 862, trailing zero 864 and MFM cells 856 holding commands/parameters 858. As shown, two samples are used to represent each MFM cell, there is one MFM packet per line and an MFM flag is prepended to each MFM packet with (4, 3, 4, 2) transitions. This results in 25 MFM cells per line. Receiving a flag terminates any data reception; the 25 command/parameter cells will not become effective until all 25 are received and will be ignored if a new flag is received beforehand. Either normal message (1) or (2) may be used depending upon the last state of the previous message. During initial synchronization, fast flags messages may be used to send up to four flags per line in order to speed up synchronization and provide control signals onto channel 0 more quickly. The point is that parameters and control information can be passed on a line by line basis along with the sampled-analog video data.

VSYNC 881 when asserted indicates that the current line being received is in the vertical blanking period, so no data will be displayed and the video controller state machine is re-initialized. Polarity control bits 882 determine the polarity in which pairs of columns are driven relative to the dark level). Each pair of columns is driven in a complementary fashion (one column output is driven more positive than the dark level and the adjacent column is driven more negative), and the polarity control for a column-pair determines the direction. The four polarity controls independently control the four column pairs in an 8-column group and the pattern is repeated every eight columns for all sub-pixel columns in a line. The polarity control can be updated each line. In practice it is likely that polarity control bits will be changed at most once per line (to reduce power consumption).

Shorting control bits 883 include "short_gena" which, when asserted, adjacent columns are shorted only if the corresponding polarity control bits have been changed, unless short_all is also asserted. When de-asserted no shorting is performed at all. "Short_all" enables shorting of all column pairs irrespective of the state of the polarity control changes, but only has effect if short_gena is also asserted. Drive Time Control 884 specifies the number of Fsavt/16 cycles from the start of the high voltage drivers drive period until the driver is tri-stated or charge-shared (depending on SHORTCTL). High Voltage driver's Sampling Phase 885 is a chopper clock that swaps both the inputs and outputs of the main amplifier to cancel the offset. SHA Calibration Control Signals 886 includes two SHA calibration control signals: sha_video (sha_cal[0]) and sha_meas (sha_cal[1]), both directly controllable from side-channel control bits. These signals control the SHA's Calibration_Phase1 and Calibration_Phase_2 signals respectively.

Phase Alignment Techniques

As mentioned above, due to delays and attenuation in the cables, the presence of ringing on the input samples, intersymbol interference, etc., it is desirable to determine the optimal sampling phase of the incoming samples for a particular source driver. This phase alignment may be performed at power-on or at regular intervals such as at frame synchronization, during frame blanking, etc., and the phase alignment mode may be entered by issuing the "set phase alignment mode" described above. Two phase alignment techniques are proposed below.

Figure 20A:
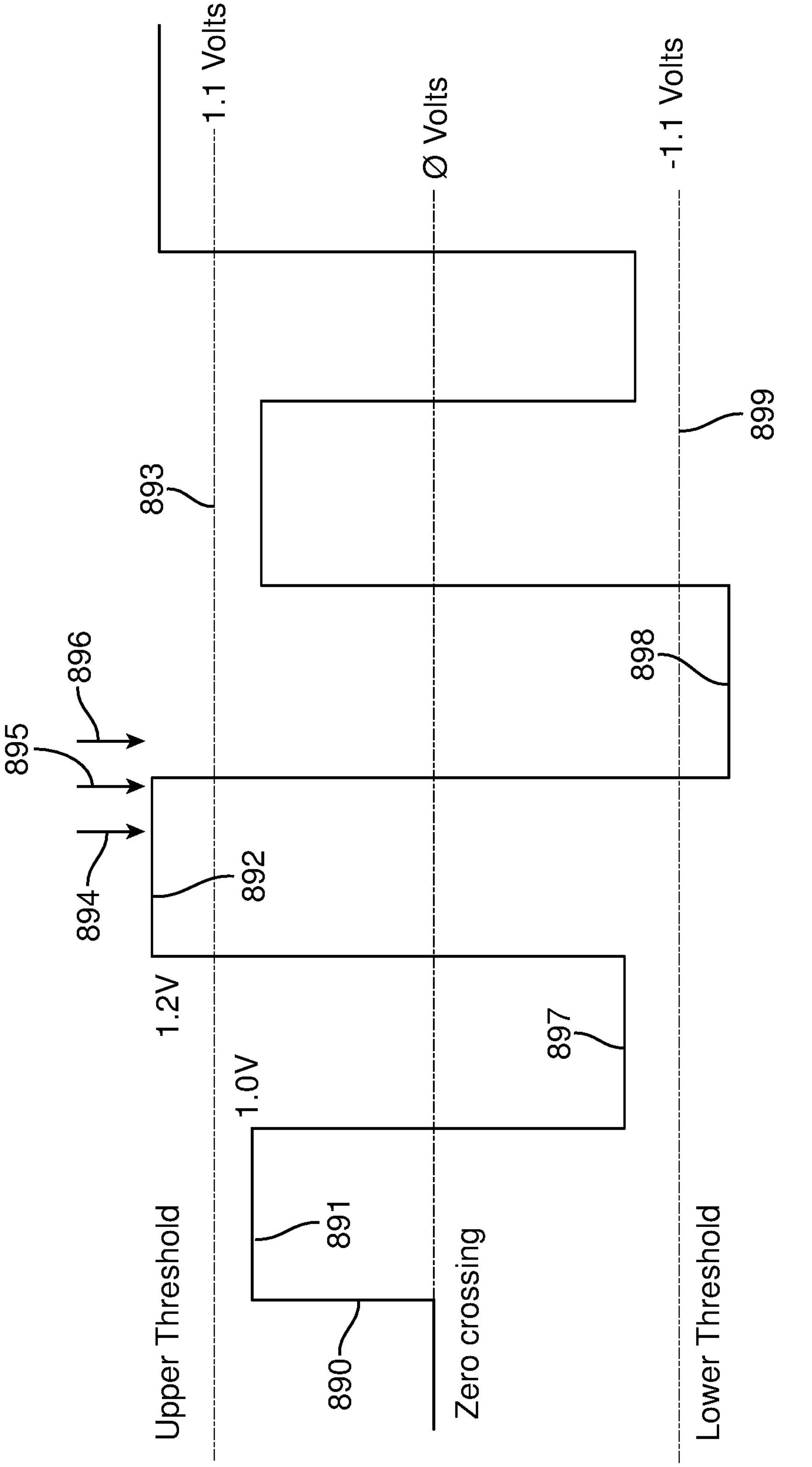
FIG. 20A illustrates a technique for performing phase alignment.

FIG. 20A illustrates one technique for performing phase alignment useful with the source drivers of FIGS. 17A and 17B having three comparators. Shown is the synchronization stream 878 in greater detail 890; a square wave is shown for ease of explanation. Preferably, each sample or pulse in stream 890 is 16 SAVT samples long (being the sampled output of a single channel of the de-interleaving amplifiers); if we compare against a threshold at the SAVT rate we will see 16 values that are the same. Preferably, the stream is modulated (using a triangle wave or trapezoid wave, for example) to produce two different levels 891 and 892 (as well as corresponding negative levels 897 and 898). For ease of explanation shown are levels of approximately 1.0 V and 1.2 V (and corresponding negative levels −1.0 V and −1.2 V) although in practice is contemplated that the positive levels will bracket approximately 0.5 V and the negative levels will bracket approximately −0.5 V. As shown, the synchronization stream repeats the two positive levels and the two negative levels continuously until the phase alignment mode is exited.

Once phase alignment mode has been entered we send a synchronization stream 878 along the control channel of the source driver, e.g., the synchronization stream arrives at input amplifier 826, and the stream is detected by a central comparator 836 as well as an upper threshold comparator 835 and a lower threshold comparator 837. This synchronization stream is preferably a valid MFM data stream (i.e., MFM zeros and MFM ones) with a regular 50% duty pattern of positive and negative values of known amplitude. Because this is a valid MFM data stream, the "exit phase alignment mode" command may be issued at any time. Comparators 835 and 837 should be sufficiently fast, but do not need absolute accuracy as long as the offset is less than the difference of the last two amplitude levels.

Basically, central comparator 836 provides zero crossing detection and indicates whether the input detected is positive or negative. When the sample is positive and the sampling phase is correct, upper threshold comparator 835 should also produce a positive value, if not, this means that sampling has occurred too early or too late, i.e., before the transition to a positive value or after the transition. Lower threshold comparator 837 provides similar information when the sample is negative. If the upper comparator or the lower comparator do not agree with the central comparator then the sampling phase is adjusted. A detailed technique for adjusting the phase to correctly sample positive input is described below and one of skill in the art will be able to apply the technique to negative input.

The upper comparator (for example) should report the same value as detected by the zero crossing detector. As the sampling phase is rotated (by advancing the phase from the PLL) we will eventually get to a point where the next transition starts to occur. That transition will cause the upper comparator to provide a result that disagrees with the zero crossing detector. We then know that we have detected the transition, and we can set the sampling phase back by one (or two, for safety) phases, so that we sample late in the symbol period after the sample has settled, but before the transition to the next sample. Note that if the transition is very quick, it is possible that the zero crossing detector will also flip when the symbol transition occurs, in which case looking at the upper comparator is not required, so "the transition" may be determined by the OR of these two events.

As mentioned, the first step is to enter phase alignment mode and to send synchronization stream 890 along the control channel. Preferably, amplitudes 891 and 892 are set far enough apart to handle any ringing, etc., of the input and to provide a window (in this example, approximately 0.2 V) in which upper threshold 893 can be set so that when the sampling phase is roughly correct that pulse 891 does not trigger the upper comparator but that pulse 892 does. In one example, if the expected amplitudes of a control signal are approximately 1.5V and approximately −1.5V then amplitudes of pulses 891, 892 are set below that expected amplitude as shown. Corresponding amplitudes for pulses 897 and 898 may be set in the same manner.

In order to choose initial voltages for these two pulse amplitudes one aim is to set the modulation levels so that we can detect the transition. One embodiment uses 50% amplitude and 75% amplitude (of a positive pulse) for these two amplitudes of the synchronization stream. That makes it easy to set the DAC threshold between the two amplitudes (with allowance for noise, etc.), yet still provides a good indication of when transitions occur (when the 75% amplitude pulse drops below the DAC upper threshold).

Selecting an initial sampling phase may be a random selection, the reset value (e.g., phase 0) or some other phase selection. Because the zero crossing detector is used to determine the expected signal level, it would be unlikely (~1/16 chance, but possible) to select a sampling phase at the symbol transition where the zero crossing output appears to be random. If that occurs, though, and we do not see a flag after all 16 clock skips, we advance the phase, and that puts us into a position where the zero crossing detector will work. There are 11 phases in our implementation; it is expected that shifting the phase about two or three positions will be sufficient. Other implementations will differ.

Once the synchronization stream arrives, logic and circuitry (not shown) in the source driver may adjust the upper threshold by sliding it up and down to determine its optimal voltage. For instance, if the upper threshold is too low the upper comparator will trigger on both pulses 891 and 892, if the upper threshold is too high it will not trigger on pulse 892; when the upper threshold is placed correctly it will not trigger on pulse 891 but will trigger on pulse 892. The source driver will not know what the amplitudes of pulses 891, 892 will be due to attenuation, etc., but as long as the amplitudes are far enough apart to place the upper threshold accurately then the source driver does not need to know what the precise values are. This adjustment process uses a sampling phase that is roughly correct, but not optimal. Once the upper threshold is correctly placed it will not be triggered by any ringing of pulse 891 but will be triggered by pulse 892. A DAC may be used to adjust the upper threshold.

Once the upper threshold has been placed then logic and circuitry in the source driver starts rotating the sampling phase around the eleven different phase positions to determine the best phase in which the sample. By way of example, an initial sampling phase may occur roughly in the middle of pulse 892 but this may not be the optimal point to sample because the pulse may not be stable at this point and may yield an incorrect value. Typically, the best point at which to sample is immediately before the transaction to the next pulse when the signal is most settled, i.e., before the trailing edge of the pulse. When the sampling phase is rotated to point 894 both the central comparator and the upper comparator trigger and signal that a positive value is received; when rotated to point 895 both trigger again. But when the sampling phase is rotated to point 896 suddenly the upper comparator will not trigger and we will know that we have just passed the transition. There will not be correspondence between the upper comparator and the central comparator. (Even though a perfect square wave is shown, the central comparator will still signal a positive value as the transition is not a steep drop down to −1.2 V but rather a more gradual descent). Accordingly, by going back one or two phase taps earlier, i.e., to point 895 or 894 we will have found the best sampling phase. Another quantity of phase positions may be used; eleven was determined by the process (number of stages of inversion that fit within the 1.5 ns clock period). An odd number of positions may work well, depending on the VCO structure.

Use of the two pulses 891, 892 in order to set the upper threshold provides certainty that the upper threshold is high enough in order to perform the search for the optimal sampling phase as described below. Providing an upper threshold that is below the amplitude of pulse 892 guarantees that when sampling occurs after the transition of pulse 892 that there will not be correspondence between the upper comparator and the central comparator, thus facilitating choosing the optimal sampling phase. Although it is possible to use a single sampling phase once detected, it is preferable to average over multiple measurements in order to handle noise and overshoot.

Above is described a technique for determining the optimal sampling phase of positive pulses. The same technique may be applied to the negative pulses as well and the results can be averaged. In one particular embodiment, the lower threshold comparator 837 is not necessary and only comparators 835 and 836 are used to determine the optimal sampling phase using the positive pulses as described above. In another embodiment, the upper threshold comparator is not used and only the lower threshold comparator and the central comparator are used with respect to negative pulses in order to determine the optimal sampling phase. In yet another embodiment, the upper threshold comparator is used exclusively with only positive pulses in the synchronization stream all having the same amplitude; the upper threshold is set to be below the amplitude of these positive pulses and the sampling phase is rotated forward and back depending upon when this upper comparator ceases to trigger. The upper threshold comparator may also be used exclusively when the synchronization stream includes alternating positive pulses of different amplitudes as shown in FIG. 20A. Similarly, in yet another embodiment, the lower threshold comparator is used exclusively with only negative pulses in the synchronization stream all having the same amplitude; the lower threshold is set to be below the amplitude of these negative pulses and the sampling phase is rotated forward and back depending upon when this lower comparator ceases to trigger. In this embodiment, the negative pulses may also be as shown in FIG. 20A.

Above, FIG. 20A describes one technique for phase alignment. Although using phase alignment commands embedded in the video stream is possible, performing phase alignment by a state machine that monitors the flag timing in the MFM sequence is preferable in which no commands in that stream are used; the payload is dynamically changing parameters. Below is described a second, preferred technique in which phase alignment is combined with searching for an MFM flag (or other flag) in a control sequence.

Figure 20B:
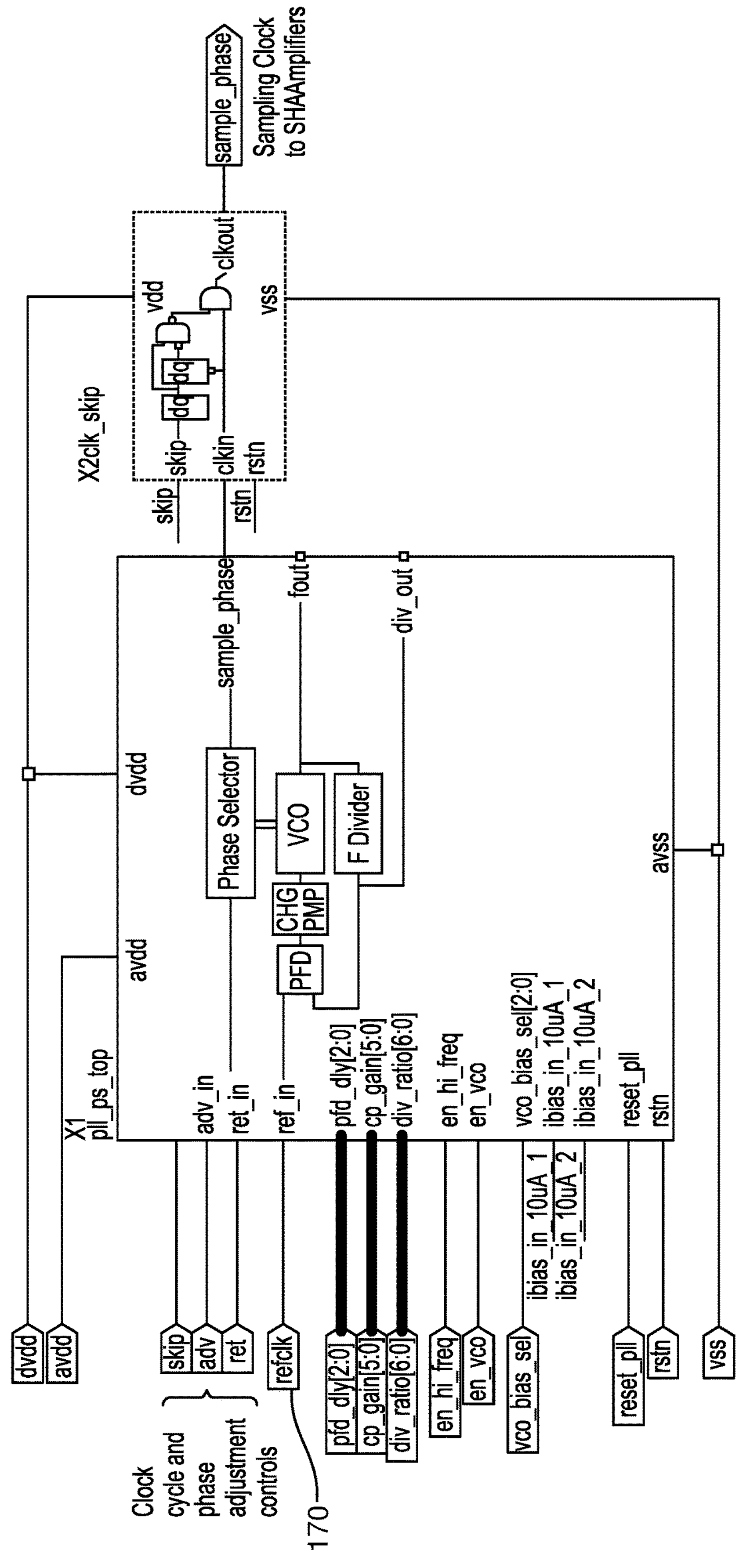
FIG. 20B illustrates a sampling phase adjustment circuit.

FIG. 20B illustrates a sampling phase adjustment circuit useful with the source driver of FIG. 17C and FIGS. 20C-20F. Input controls are clock cycle and phase adjustment controls and a sample_phase output (sampling clock) is sent to each of the SHA amplifiers. The phase rotation (and skipping of clocks) affects all sampling. These happen up front at the PLL, as shown in FIG. 20B. We can readily alter the SHA channel on which control information is seen by skipping a clock cycle. (Since the Sample and Hold amplifier/de-interleaver samples into a different channel every cycle, skipping a clock cycle thereafter rotates the information carried in each channel by one.) Phase adjustment is done by rotating phases (selecting) one of the 11 phases of the PLL (only a single phase step at a time is allowed to ensure we do not have glitch clocks). The VCO high frequency clock is the clock whose phase is adjusted to produce the sampling clock output. The input reference clock 170 remains constant. The inputs "skip," "adv" and "ret" come from the synchronization state machine in the digital logic of the chip, as described in FIG. 20F.

Figures 20C, 20D, 20E:
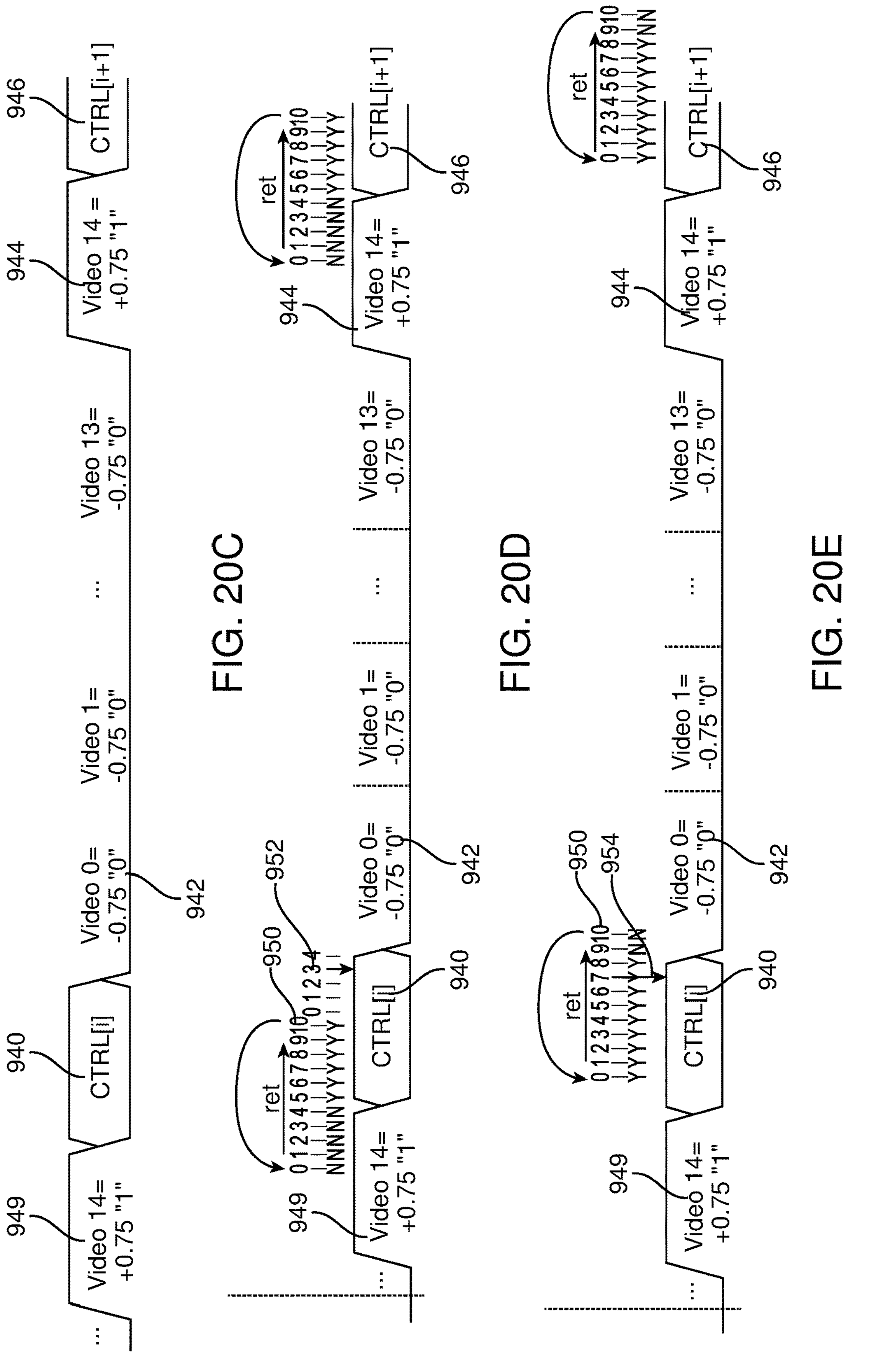
FIG. 20C illustrates a special synchronization video pattern to facilitate locking.
FIG. 20D illustrates an example of losing the MFM Flag by wrap-around of the PLL phase.
FIG. 20E illustrates an example of losing the MFM Flag when the phase extends past the end of the control bit.

FIG. 20C illustrates a special synchronization video pattern to facilitate locking. During synchronization we use this special video pattern where all video samples in a line (per source driver) are a negative constant value 942 (the zero crossing detector 836 output will be 0) except for the last video sample 944, which is sent as positive constant value (the zero crossing detector output will be 1). Shown is control data 940 on SHA channel 0 and SH amplifiers 1-15 (video 0-video 14). Thus, using this knowledge, when SHA channel 0 (control channel) samples the video stream to try to extract the control data, it will know the direction in which the phase needs to be adjusted in order to sample the control bit at the optimal time. For example, if sampling in data 940 and moving phases backward a "1" is encountered; if moving phases forward a "0" is encountered. Since all SHA channels share the same (relative) timing with respect to the sampling phase, this also means that the video samples are optimally sampled (near the end of the settling time for the sample).

FIG. 20D illustrates an example of losing the MFM flag by wraparound of the PLL phase. In this situation a clock skip is required. Eleven sampling phase steps 950 are shown, the optimal step being 952. As shown, the PLL phase rotates from step 10 to step 0 which moves sampling back into the previously transmitted sample 949. If the currently selected sampling phase lands inside the CTRL field, a flag will be detected (Y). If it falls outside the CTRL field, no flag will be seen (N: an illegal MFM on the video channels), thus indicating that we have sampled too far back; we can move the sampling phase forward by three steps.

FIG. 20E illustrates an example of losing the MFM flag when the phase extends past the end of the control bit(s). Here, sampling at steps 9 and 10 is into the next sample 942. In this situation no clock skip is required, we move phase selection back by two steps to the optimal step 7 once MFM flag detection is lost at step 9.

Figure 20F:
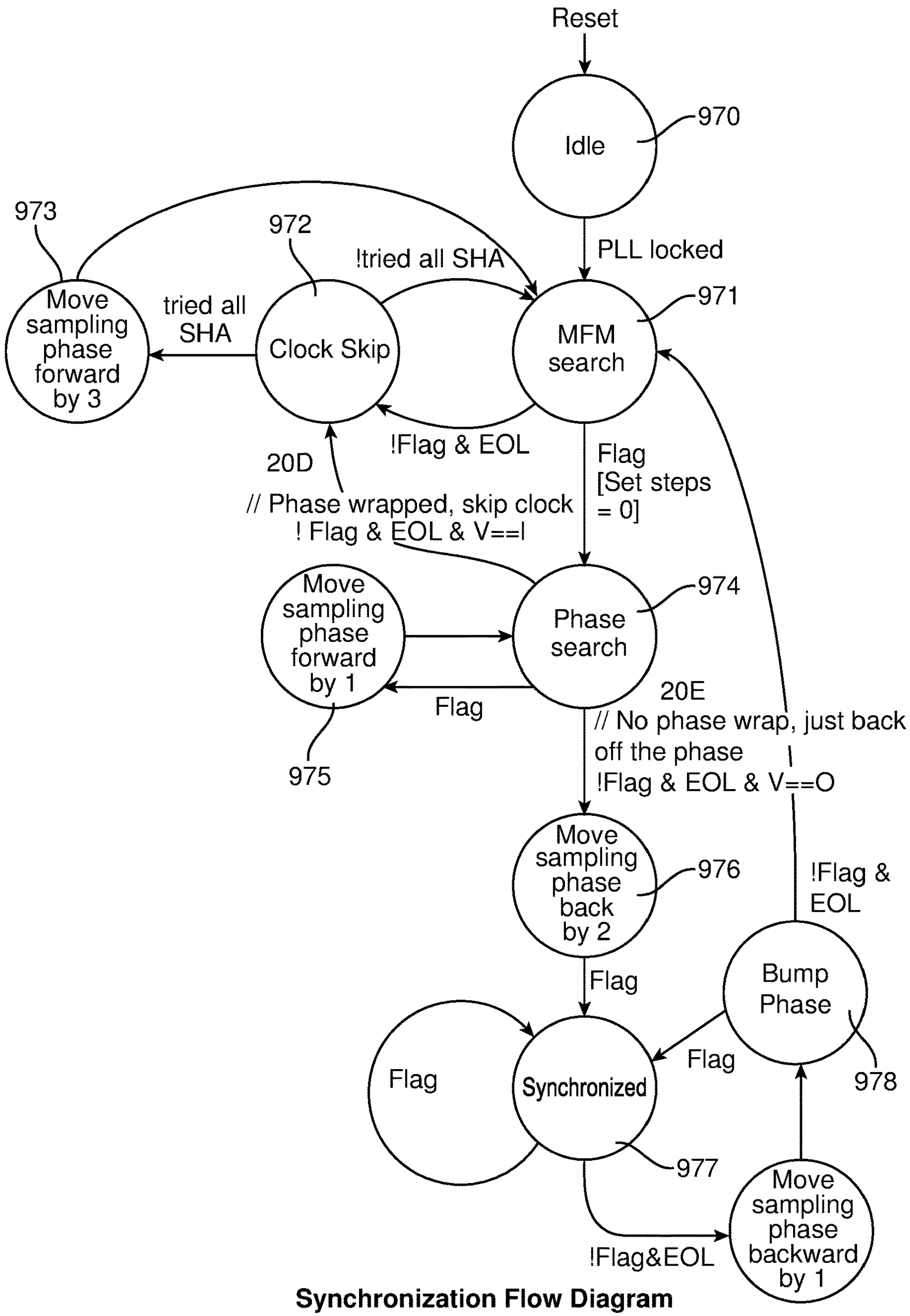
FIG. 20F is a flow diagram describing how phase alignment occurs with MFM flag search.

FIG. 20F is a flow diagram of a synchronization state machine implemented in digital logic of a source driver chip, describing how phase alignment occurs with MFM flag search. In this diagram: EOL means end of display line received (64 control samples received for a single source driver); V=1 means that the zero crossing detector output=1, indicating that we are looking at the last video sample of the previous line instead of the control bit when the MFM flag disappears; V=0 means that the zero crossing detector output=0, indicating that we are looking at the first video sample of the same line instead of the control bit when the MFM flag disappears; and "!" means negation, e.g., "!Flag" means flag not detected.

At step 974 if no flag is detected and detector output=1, then move to step 972, shown in FIG. 20D as sampling too far back into the sample 949 of the previous line. Thus, step 973 moves the phase forward by three steps. At step 974 if no flag is detected and detector output=0, then move to step 976, shown in FIG. 20E as sampling too far forward into the next sample 942. Thus, step 976 moves the phase back by two steps which will be optimal and synchronization occurs in step 977.

Once the optimal phase is determined it is implemented within the source drivers by sending the output of the sampling phase adjustment circuit as a sampling clock to the SHA amplifiers. Preferably, all amplifiers of all source drivers act in unison; i.e., there is only one sampling phase alignment circuit and one clock cycle alignment that controls all SHA amplifiers. Within each source driver, these input SHA amplifiers are time interleaved and generate sample outputs that are skewed in time by one Fsavt cycle between adjacent channels. The SHA amplifiers then transfer these samples to the collectors (A/B samplers) with skewed timing also, but after all samples for a line are gathered by the collectors, the pre-amplifiers transfer all samples to the next stage (the level converters) in unison. This effectively "wastes" 16 Fsavt cycles of the transfer time at the pre-amplifier outputs, but as there is a decimation of the sampling rate, there is sufficient time for this to occur.

Other synchronization techniques may also be used. By way of example, we can provide for horizontal and vertical synchronization by forwarding a low-frequency clock. In order to phase adjust for where we sample, another technique is to send known black/white references in the sub-band and adjust the receiver's PLL until we find the blackest black and whitest white.

In another synchronization technique, the reference clock is more than simply a reference clock; it also includes data (such as parameters), but at a lower frequency. The clock and its parameters are sent via a wire separate from the SAVT samples (which wire already exists). There is no need to intermingle the side channel data with the video data, thus the SAVT rate is reduced and it is only necessary to send 60*16=960 samples per line, thus requiring lower bandwidth for communication. By using sub-pixel color grouping, the bandwidth requirements are reduced even more. It is also possible to introduce color-transition blanking into this technique; since there are no side channel bits embedded in the video stream, there are no issues with bleeding of the side channel bits into the video bits.

Example Source Driver

FIG. 21 illustrates the analog data path of one channel of an example source driver. In this particular example the source driver drives an LCD display and various of the components shown are particular to that type of display. The invention, however, is applicable to other types of displays as well.

Shown is an input terminal 902 and one of the 16 input distribution amplifiers, in this case, SHA[0] 824, shown at 904; not shown are switches 842 of the input terminal nor the other 15 distribution amplifiers which drive video samples. The input sampling is illustrated by the switches sampling into capacitors. The input sampling switches are controlled symbolically by the signals b and t. There are 15 other identical amplifiers (with skewed timing) for carrying video, while SHA[0] carries the side channel information. It is arbitrary which SHA channel carries the side channel, but the advantage of using SHA[0] is that control information arrives before the video samples, not after it, giving some time for setup before the control information is needed. Each amplifier 904 has a nominal gain of one, which may vary.

Each SHA channel drives 64 columns 920 via a series of sampling blocks/collectors 908, preamplifiers 910, level converters 912, HV drivers 914 and column shorting switches 918 as indicated by the array notation [63:0] used in the component designators in the figures. Level converters 912 may also be referred to as differential-to-single-ended converters. Preamplifiers 910 provide the gain required for the signals coming from a transmission medium.

Shown in FIG. 21 is one of the 64 A/B sampling capacitor blocks 908 for amplifier 904 and its associated pre-amplifier 910 of the channel. In one particular embodiment, the timing skew introduced by the de-interleaving process of the input distribution amplifiers may be remedied by the timing of the preamplifiers of the source driver. For example, once all 64 samples have arrived at either the A or B sampling capacitor blocks the preamplifiers 910 wait for 16 clock cycles after the first sample arrives (or wait until the last sample arrives) before they begin to drive all 64 samples into level converters 912. Accordingly, all 960 preamplifiers of the source driver will be driving samples at the same time.

Shown also is one of 64 level converters 912 of the channel that converts the differential signal into a single-ended signal, adds an offset, changes the polarity of the signal, and provides amplification. Output out_p 913=vmax+0.5*(Vinp-Vinn) if pol=0. Output out_p 913=vmin=0.5*(Vinp-Vinn) if pol=1. High-voltage driver 914 is one of 64 such drivers of the channel that multiplies the incoming signal to provide the voltage (plus or minus) expected by the display. Column shorting switch 918 provides shorting for LCD displays as is known in the art. Finally, the expected voltage is output to the column at 920. The preamplifier 910, level converter 912 and HV driver 914 may be considered an amplification stage before each column, and in this case is a pipeline amplifier, or simply "an amplifier."

Switches 842 of FIG. 14, input amplifiers 904 and A/B sampling blocks 908 of the source driver may also be referred to as a collector 915 in that the collector inputs the incoming serial analog samples and stores (or "collects") them into the sampling blocks, such that the stored analog samples may then be output in parallel to the column drivers 916 for display as part of a line on the display panel.

Mobile Telephone Specific Embodiment

Figure 22:
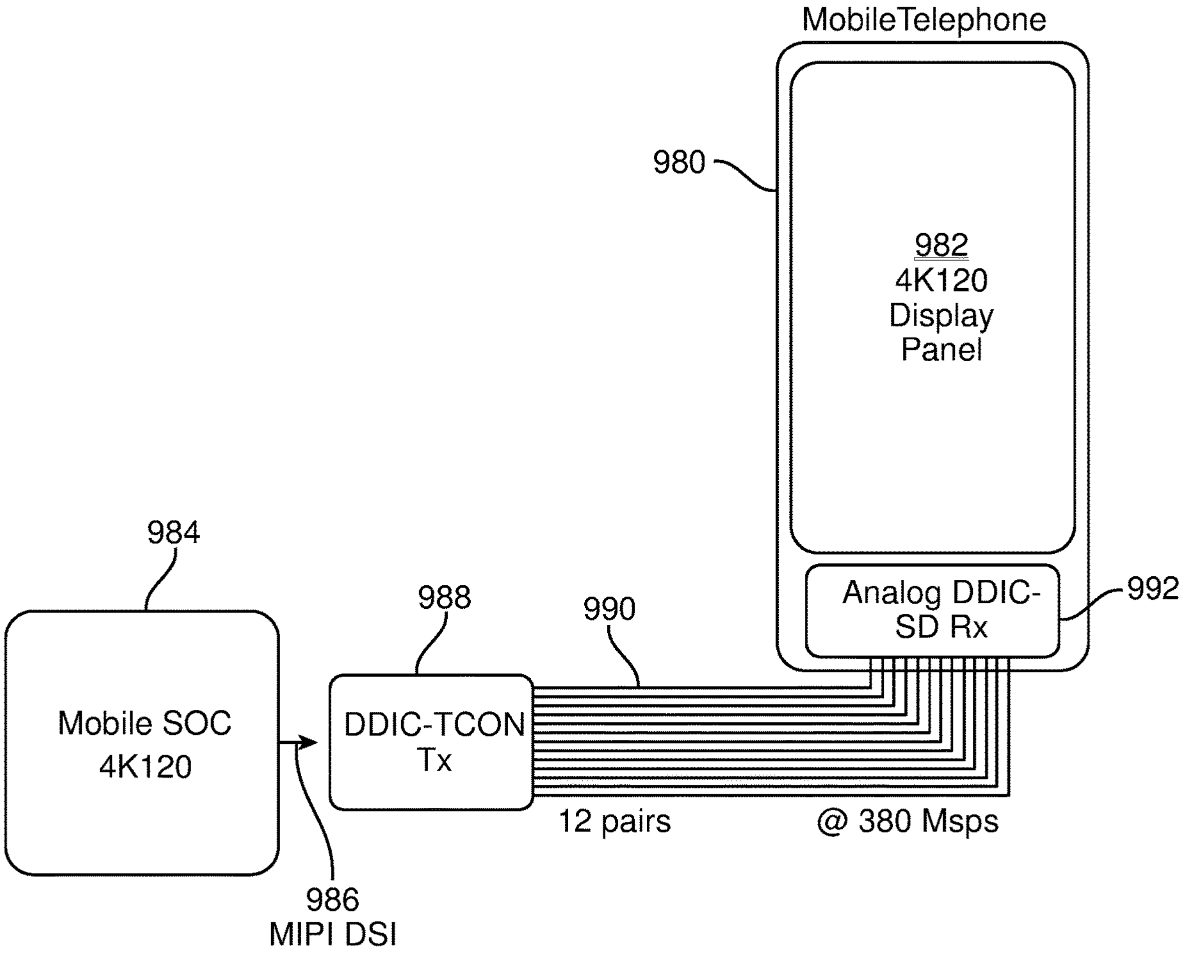
FIG. 22 is a block diagram showing transport of analog video samples within a mobile telephone.

FIG. 22 is a block diagram showing transport of analog video samples within a mobile telephone. U.S. application Ser. No. 18/442,447, entitled "Video Transport within a Mobile Device" and discloses more detail on various techniques. Prior art displays on existing OLED DDIC devices such as mobile telephones are in need of improvement due to the high refresh rate of 4K smartphone displays, the MIPI receiver, SRAM, digital image processing, and significant use of analog signals requiring approximately 1,000 digital-to-analog converters.

A split OLED DDIC architecture as shown in FIG. 22 has the following advantages: enables optimal DDIC-TCON and DDIC-SD partitioning; provides a short distance MIPI transmission from the SoC; optimizes the digital DDIC-TCON for SRAM and image processing; provides a simplified DDIC which is all analog; and only requires a small number of digital-to-analog converters in DDIC-TCON integrated with the transmitter.

Shown is a mobile telephone (or smartphone) 980 which may be any similar handheld, mobile device used for communication and display of images or video. Device 980 includes a display panel 982, a traditional mobile SoC 984, an integrated DDIC-TCON (Display Driver IC-Timing Controller) and transmitter module 988, and an integrated analog DDIC-SD (DDIC-source driver) and receiver 992. Mobile SoC 984 and module 988 are shown external to the mobile telephone for ease of explanation although they are internal components of the telephone.

Mobile SoC 984 is any standard SoC used in mobile devices and delivers digital video samples via MIPI DSI 986 (Mobile Industry Processor Interface Display Serial Interface) to the module 988 in a manner similar to Vx1 input signals discussed above. Included within module 988 is the DDIC-TCON integrated with a transmitter as is described above, for example the transmitter of FIGS. 1-4 and 7-10. Upon a reading of this disclosure and with reference to the previous drawings, one of skill in the art will understand how to implement the transmitter in order to output any number of analog EM signals 990. In this example, the transmitter outputs 12 pairs of analog EM signals at 380 Msps. Not shown are the gate driver control signals from module 988 to the gate drivers of display panel 982. Typically, for a mobile telephone, the DDICs are located at the bottom narrow edge of the telephone while the SoC is about in the middle of the device. Accordingly, the integrated DDIC-TCON/transmitter is located close to the SoC, within about 10 cm or less, or even about 1-2 centimeters or less. Since the transmission of digital data is at extreme frequencies, it is advantageous to keep the conductor lengths as short as possible. For a tablet computer, the distance is about 25-30 cm or less.

These analog signals 990 are received at the integrated analog DDIC-SD and receiver 992. DDIC-SD receiver 992 receives any number of analog signal pairs and generates voltages for driving display panel 982 and may be implemented as shown in FIGS. 5, 6, 10, 13 or 17, for example. Advantageously, only a single source driver may be needed to drive the display panel 982 and module 992 does not need any digital-to-analog converters.

Analog DDIC-SD Rx 992 may be a single integrated circuit having 12 source drivers within it (each handling a single pair) or may be 12 discrete integrated circuits each being a source driver and handling one of the 12 signal pairs. Of course, there may be fewer signal pairs meaning correspondingly fewer source drivers.

Analog Video Transport Source Driver Integration with Display Panel

As discussed above, analog video transport is used within a display unit to deliver video information to source drivers of the display panel. It is further realized that large display architecture nowadays consists of a large area of active-matrix display pixels. In early days, display drivers (source and gate) would be mounted at the glass edges, but not on the glass, providing source- and gate-driving circuits. Further integration of the driving electronics onto the glass has stagnated due to the complexity of high-speed digital circuits, as well as the large area required for D-to-A conversion. By way of example, digital transport to the source-driving circuits operates at around 3 GHz, a frequency much too high to allow integration with the glass. It is further realized that many display drivers have to be attached to the display edge in order to drive a complete, high-resolution LCD or OLED screen. A typical driver has approximately 1,000 outputs, so a typical 4K display requires 4,000×RGB=12,000 connections, meaning twelve source drivers. Increasing the panel resolution to 8K increases this number to 24 source drivers. Data rate, synchronization difficulties and bonding logistics make it difficult to continue in this direction.

A display panel (such as an LCD panel) is made from a glass substrate with thin-film transistors (TFTs) formed upon that glass substrate, i.e., field-effect transistors made by thin-film deposition techniques. These TFTs are used to implement the pixels of the display. It is therefore realized that those TFTs (along with appropriate capacitors and resistors, and other suitable analog components) can also be used to create logic circuitry to implement elements of the novel source drivers described herein which are then integrated with the glass. These elements are integrated at the extreme edges of the glass, just outside the pixel display area, but inside the perimeter seal of the glass. Thus, the source drivers disclosed herein may be integrated with the glass using these transistors, capacitors, resistors, and other analog components required, and may do so in the embodiments described below. Accordingly, the source drivers (or elements thereof) which had previously been located outside of and at the edge of the display panel glass are now moved onto the display panel glass itself. In addition, the gate driver functionality for the gate drivers may also be moved onto the display panel glass.

The SAVT video signal may be transported along the edge of the display glass using relatively simple wiring, and is less insensitive to interference, unlike existing Vx1 interfaces. The lower sample rate makes it possible to design the required analog electronics (which are less complex) of the source drivers on the edge of the TFT panel on the display panel glass itself. Building the source driver circuitry on the glass edge allows the following elements of a source driver to be integrated with the glass along with their typical functions: input terminal and switches (receives analog samples via the SAVT signal and distributes to collector); collector (receives the analog samples via input amplifiers and collects the samples in a storage array or line buffer); level converters (convert to single-ended, provide voltage inversion and voltage offset), and amplifiers such as high-voltage drivers (provide an amplified voltage and the current required to charge the display source lines capacitance).

Figure 23:
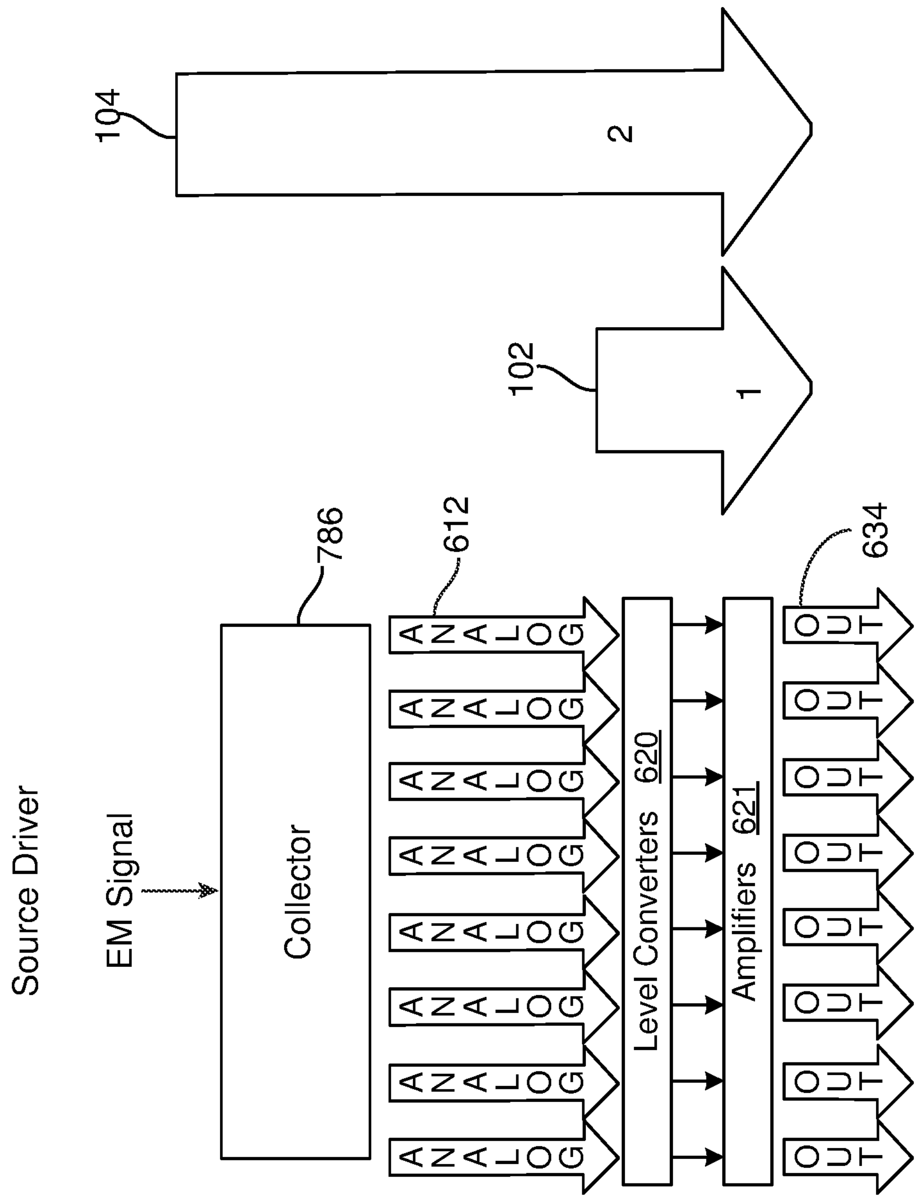
FIG. 23 illustrates implementation of the integration of source driver functionality in various embodiments.

FIG. 23 illustrates implementation of the integration of source driver functionality in various embodiments. Depending upon the transistor quality used on the glass, various elements of a source driver may be integrated with the glass. As known in the field, TFTs (for example) range from handling lower frequencies up to higher frequencies. There are three main technologies used for TFT manufacturing: amorphous silicon (a-Si); oxide (indium-gallium-zinc oxide ("IGZO" or similar materials), which can handle frequencies from about 50 kHz to 100 kHz routinely and up to about 200 kHz depending upon the voltage used (oxide is capable of frequencies of up to 1 MHz at 50 volts for certain components); and low temperature poly-silicon (LTPS) which can handle frequencies having an order of magnitude of about 5 MHz, up to about in excess of 10 MHz depending upon the voltage used. In addition, crystalline silicon TFTs implemented using CMOS technology may be able to handle even greater frequencies. Other types of TFTs may also be used.

If faster TFT transistors of higher quality are used then higher frequency portions of the source driver may be integrated with the glass. Also, smaller device sizes will allow for the transistors to switch faster, thus enabling implementation on glass of elements using those devices. For example, the channel length of a TFT affects its size; preferably the channel length for oxide TFTs is less than about 0.2 um and the preferable channel length for LTPS TFTs is less than about 0.5 um. Reducing the channel length by 50% yields an increase in speed by a factor of four. Further, implementation may depend upon the type of display; display sizes of smaller resolution 2K, 1K and smaller may use elements that do not require the high frequency of 4K and 8K displays. Typically, amorphous silicon transistors would not be used as they have a tendency to threshold shift and are not stable. Note that the source driver disclosed herein does not require any digital-to-analog converters to convert video samples nor any decoder to decode incoming video samples.

In a first embodiment 102, level converters 620 and amplifiers 621 are integrated with the glass because the level converters only require a relatively low-frequency clock. As the level converters switch once per line they require a switching frequency of about 50 kHz for a 2K display, 100 kHz for a 4K display, etc. Thus, the first embodiment of integration may use TFTs that can operate at a clock frequency of at least about 50 kHz, assuming a 2K panel (100 kHz for a 4K panel, etc.). Thus, IGZO or LTPS TFTs may be used in the first embodiment.

In a second embodiment 104 using faster transistors, level converters 620, amplifiers 621 and collector 786 may also be integrated with the glass, thus integrating the entire source driver. Collector 786 requires a higher-frequency clock as each collector is manipulating the pixel sequence and requires a switching frequency of about 50 MHz for a 2K display, 100 MHz for a 4K display, etc. Thus, the second embodiment of integration may use TFTs that can operate at a clock frequency of at least about 50 MHz, assuming a 2K panel. Thus, LTPS TFTs may be used in the second embodiment for 2K panels.

Figure 24A:
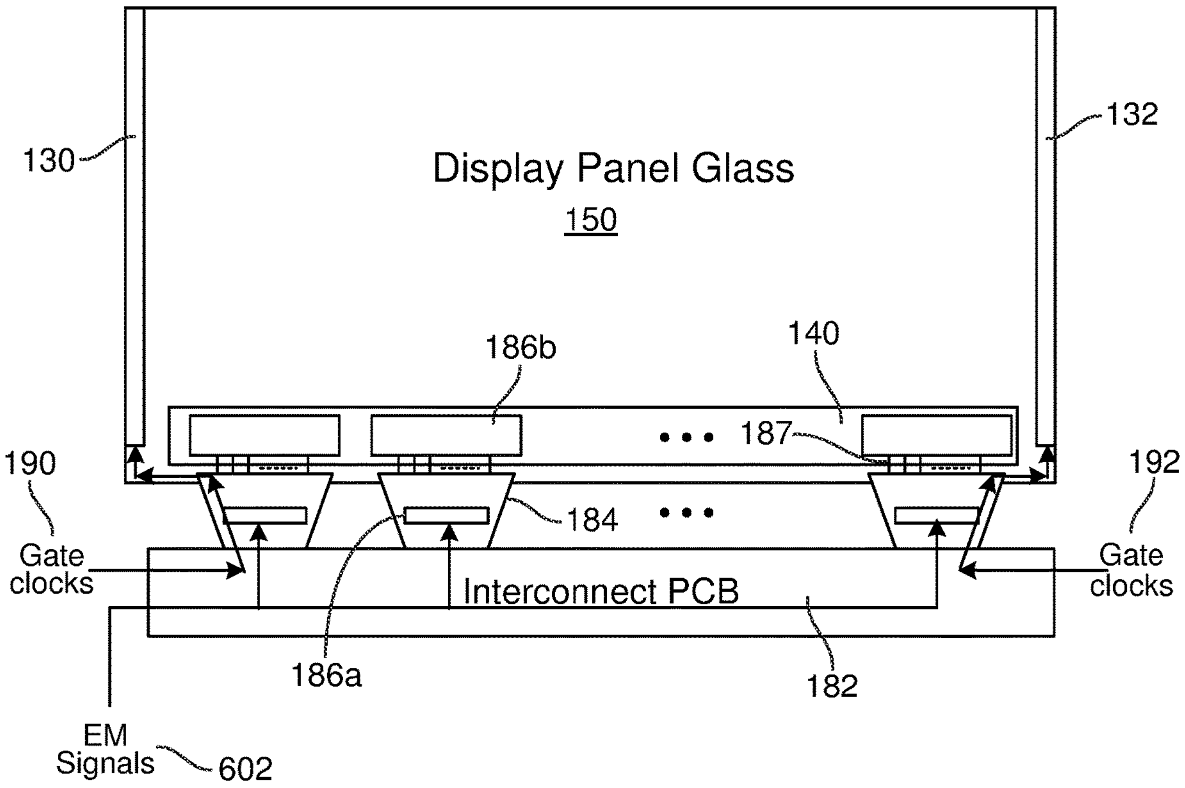
FIG. 24A illustrates placement of the gate drivers and source drivers on the display panel glass.

FIG. 24A illustrates placement of the gate drivers and source drivers on the display panel glass. Typically, a display panel will be implemented with two glass substrates, a top (or common) glass and a bottom (or active) glass, the bottom glass being smaller than the top glass. The TFTs are implemented on the bottom glass and the below description refers to this bottom glass and the drawings show only the bottom glass. Shown is display panel glass 150 by itself (not shown is the panel frame or the enclosing display unit for clarity) having two rectangular areas 130 and 132 on both sides of the display panel glass (in this example, an LCD panel) having a width of several millimeters wide. In this embodiment, the gate drivers are also integrated using TFT devices on the glass as switching elements. Since gate drivers are typically implemented as simple shift registers, these shift registers may be located in areas 130 or 132.

Shown also is rectangular area 140 also located upon the glass itself in which elements of the source drivers may be located. The source driver functionality may be partially or fully integrated with the glass by making use of TFT switches on the glass in this area 140. In the first embodiment is the integration of the amplifiers and level converters onto the glass (which are formed in region 140), while in the second embodiment is the integration of the amplifiers, level converters and collector (which are also formed in region 140).

As the source drivers disclosed herein do not receive digital signals, have no D-to-A converters and related circuitry for processing the digital video samples, nor decoders, the lower processing frequencies and smaller dimensions of these drivers allow for them to be integrated onto the glass. Thus, for example, since a typical 64-inch 4K television panel has a pixel width of 80 um (40 um in case of an 8K display), there is also sufficient width to integrate the drivers directly onto the glass because the dimensions of the output amplifiers are expected to fit within this space. Depending upon the pixel width of a particular implementation, specific TFTs may be chosen.

An interconnect printed circuit board 182 receives and passes the EM signals 602 via flexible PCBs 184 to the source drivers located on integrated circuits **186*a* and partially integrated with the glass in TFTs 186*b*. Passing the EM signal in this fashion is implemented for embodiment 1 as a portion of each source driver (at least the collector) will still be located within flexible PCBs 184 on the IC 186*a* and the level converters and amplifiers will be located on glass in TFTs 186*b*. As shown, each integrated circuit 186*a* passes analog signals 187 to its corresponding circuitry on glass 186*b*. The nature of these analog signals will depend upon whether embodiment 1 or embodiment 2 is being implemented. An implementation for embodiment 2 is shown below. Gate clocks 190 and 192 are delivered to the gate drivers via circuit board 182 and flexible PCBs 184. PCBs 184 attach to panel glass 150** as is known in the art.

Figure 24B:
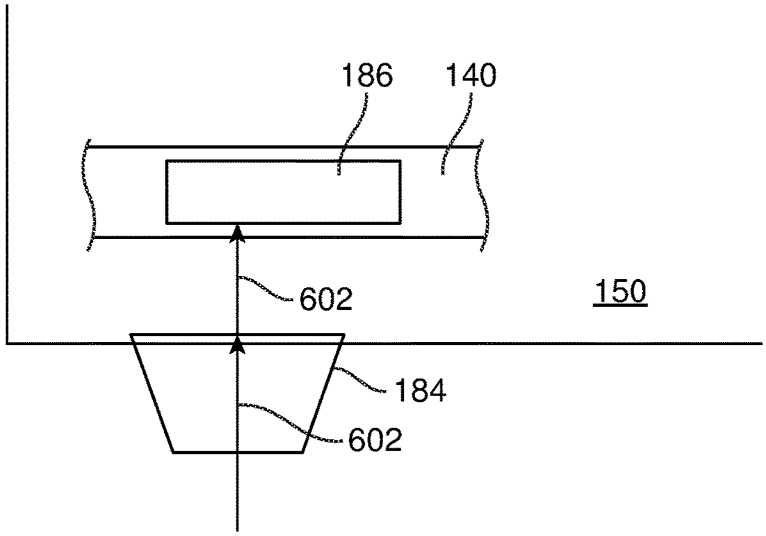
FIG. 24B shows a source driver completely implemented on the glass.

FIG. 24B shows a source driver 186 completely implemented on the glass. This second embodiment is a full integration of the source driver functionality with the glass. As shown, flexible PCB 184 includes only EM signal 602 and no source driver functionality such as collector, level converters and amplifiers; all source driver functionality is implemented in TFTs (and other analog components) on the glass at 186. Although not shown, each other source driver may have its own PCB 184 and EM signal 602 (from a corresponding transmitter); in one particular embodiment, there are 24 such source drivers.

Figure 25:
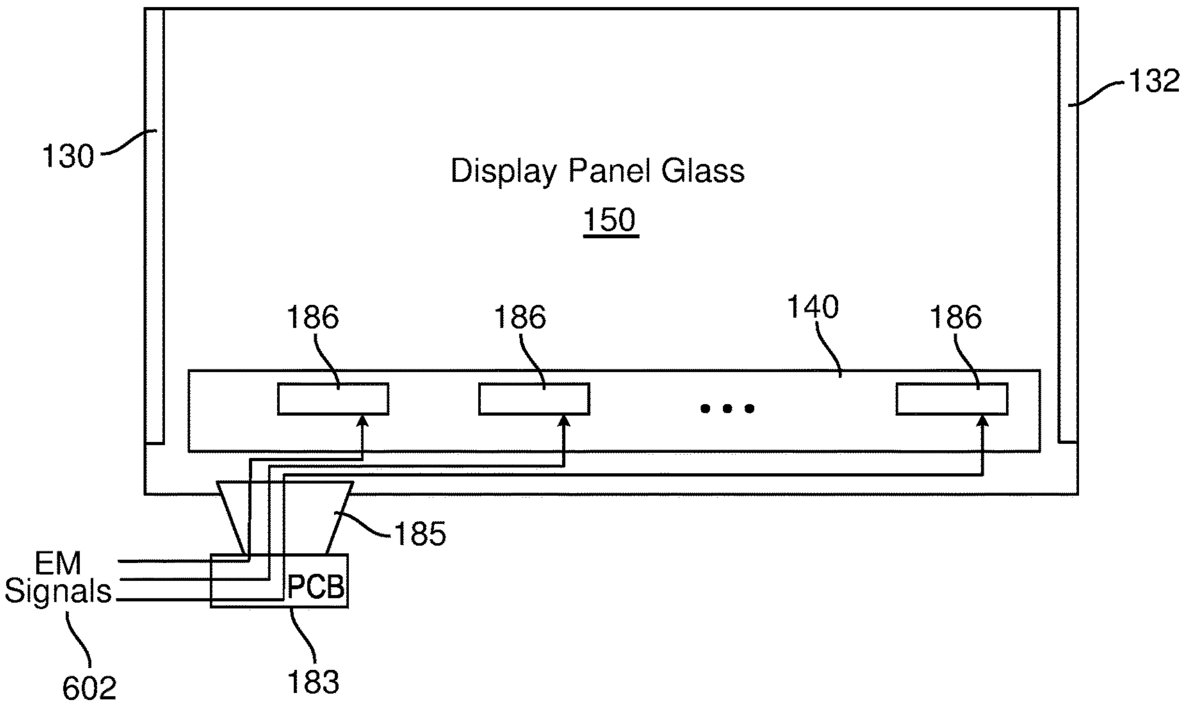
FIG. 25 illustrates another embodiment of placement of the EM signals.

FIG. 25 illustrates another embodiment of placement of the EM signals 602 when embodiment 2 is implemented. As mentioned earlier, in embodiment 2 all functionality of the source drivers are integrated with the glass, thus there is no need to deliver the EM signals 602 via a large circuit board 182 (the length of the display) and then via numerous flexible PCBs 184 as shown in FIGS. 7A and 7B. Accordingly, a much smaller printed circuit board 183 and a single flexible PCB 185 are attached to one location of the display panel glass 150 and the EM signals 602 are passed via 183 and 185 to the glass and then transported along the glass where it is delivered to each of the source drivers 186 on the glass within region 140. Further, no integrated circuit 186 is needed on the flexible PCB as all of the functionality of each source driver is now on the glass. As shown, EM signals 602 are delivered in parallel to each of the source drivers.

Returning now to the example source driver of FIG. 21, we note that portions of the source driver may be implemented on glass in numerous other embodiments. By way of example, only the high-voltage driver 914 (and optionally column shorting 918) may be implemented on glass in region **186*b* while the rest of the elements shown are implemented upon an integrated circuit 186*a* outside the edge of the glass. Or, driver 914 and level converter 912 are implemented on glass while the rest of the upstream elements are implemented outside the edge of the glass. Or, driver 914, level converter 912 and preamplifier 910 are implemented on glass while the rest of the upstream elements are implemented outside the edge of the glass. Or, driver 914, level converter 912, preamplifier 910 and A/B sampling blocks 908 are implemented on glass while the rest of the upstream elements are implemented outside the edge of the glass. Or, driver 914, level converter 912, preamplifier 910, A/B sampling blocks 908 and input distribution amplifiers 904 are implemented on glass while the rest of the upstream elements are implemented outside the edge of the glass. Or, all of the elements shown (including input terminal 902 with its switches 842) are all implemented on glass and there are no elements of the source driver implemented on flexible PCB 184 as shown in FIG. 24**B.

Alternatively, all column drivers 916 of the source driver are implemented on glass while the rest of the upstream elements (i.e., collector 915) are implemented outside the edge of the glass. Or, all column drivers 916 and collector 915 of the source driver are all implemented on glass and there are no elements of the source driver implemented on flexible PCB 184 as shown in FIG. 24B.

In one particular embodiment, the SHA input amplifiers operate at an input rate of about 664 MHZ, the A/B sampling blocks operate at $\frac{1}{16}$ of the input rate, and the preamplifiers and downstream components operate at $\frac{1}{1024}$ of the input rate ($\frac{1}{64}$ of $\frac{1}{16}$ the input rate). Of course, the input rate may be different and the fraction of the input rate at which the downstream components operate may vary depending upon the implementation, number of columns, interleaving technique used, etc. In another embodiment, only the HV driver is implemented on glass as the output from the level converter 912 is single ended (making implementation easier). Or, the preamplifiers, level converters and HV drivers are implemented on glass as they require a lower frequency than the SHA amplifiers and A/B blocks. It is also possible to only implement SHA amplifiers 904 in the source driver chip and all other downstream components on glass as the amplifiers 904 operate at the greatest frequency.

Improving Video Images Via Feedback from Column Amplifiers of a Display

FIG. 1 shows an example display panel having (typically) 24 novel source drivers 186 and FIG. 13 is one embodiment of an SAVT receiver integrated with a source driver; FIG. 21 then shows in more detail how 64 columns 920 of that source driver are driven, starting with input of samples at 902. Unfortunately, manufacturing variation among display panels and their source drivers causes the 23,000 (for example) column amplifiers (and the associated analog circuitry leading up to them) to produce different output levels when driven with identical inputs.

We disclose a technique to compensate for that variation by sending appropriate feedback to the timing controller (TCON) of the display unit. This invention thus allows the 24 (or however many) demultiplexing/source driver chips to feed back the level of a single column amplifier back to the TCON. Upon gathering performance information from all 23,000 column amplifiers, the TCON can pre-scale values intended for a given column to equalize the performance between columns. Advantageously, there is no high-speed performance requirement: the invention may be used pre-sale for screen calibration purposes. In other words, the technique may be used during a production test where all columns are available and drive characteristics may be measured without an additional area penalty on chip (due to an area overhead per column for sampling). This pre-scaling of values based upon individual column feedback is in addition to any pre-scaling the TCON may do to equalize the performance of different rows in the display; rows farther away from the column drivers may require additional current to achieve the same light output.

There are two main embodiments: analog feedback and digital feedback. Both may use an interface like JTAG, I2C or SPI so that the TCON can issue a command for a particular column driver to send back the value coming out of its column amplifier. The command may also be issued using an MFM command as described above. In the analog version, that value is sampled through an analog switch to an analog bus—a single analog connector returning to the TCON—shared by all source driver chips. The TCON then does analog-to-digital conversion (ADC) and digital processing of the result. As the source drivers outputs are high voltage the multiplexing requires the use of high voltage transistors, or a low-voltage representation of the column voltage may be generated before multiplexing (done by resistor or capacitor dividers). In any case, there is an area overhead per column.

Figure 26:
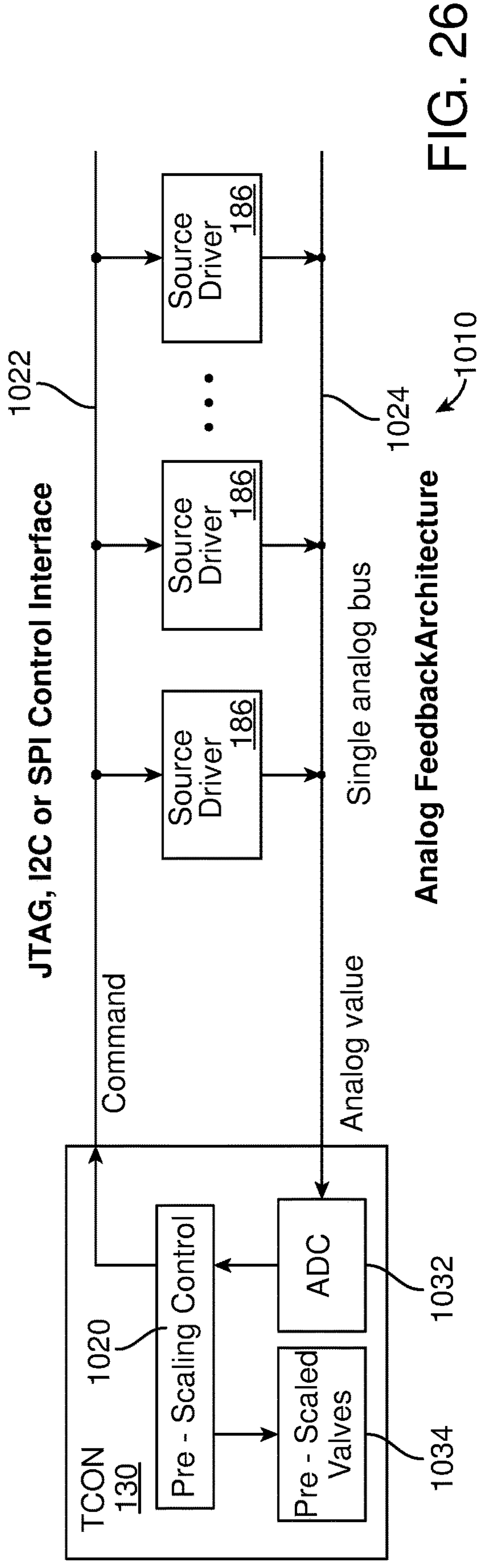
FIG. 26 shows an analog architecture for commanding and receiving feedback.

FIG. 26 shows an analog architecture 1010 for commanding and receiving feedback. A novel pre-scaling control unit 1020 of TCON 130 uses a protocol and communication lines such as JTAG, I2C or SPI 1022 (or similar) to send a command to a particular column driver (such as driver 916) in any of source drivers 186 to sample the analog value of the output from its amplifier in HV driver 914. Once sampled, the value is returned via a single analog bus 1024 back to an ADC 1032 in the TCON. The converted digital value is sent to control 1020 which collects all values from all column amplifiers in a similar manner, processes all values, determines how to pre-scale each value in order to equalize them, and outputs the results into a pre-scaled values storage 1034 which stores actual values, an offset value, a percentage, a ratio, etc. for each column. Values 1034 are then used during operation of the display (along with any other pre-scaling) to modify samples sent from the TCON to the display as is known in the art.

Figure 27:
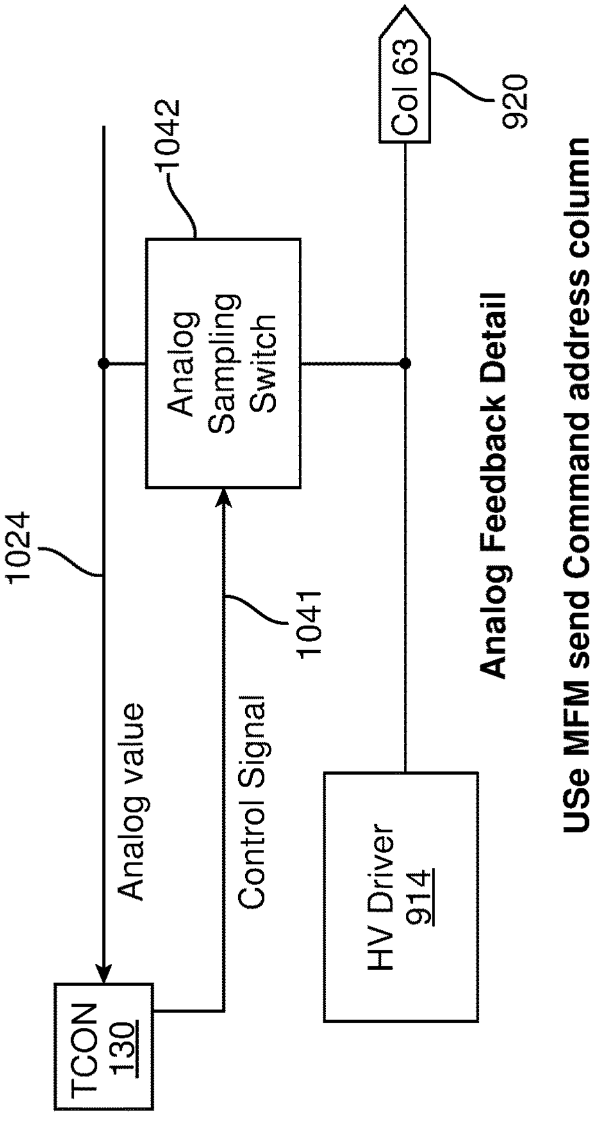
FIG. 27 shows latching a value from a column amplifier.

FIG. 27 shows sampling a value from a column amplifier. Shown is one HV driver 914 of a particular column (in this case, column 63 of SHA[0] from FIG. 21) which provides the output of its internal amplifier 1040 to analog switch 1042, the output of the switch is connected to analog bus 1024 to feed back the column output to the TCON. The command arrives via control signal 1041 (i.e., using JTAG, I2C, SPI, etc.) which samples the value. Switch 1042 is an example, other types of analog switches may be used (e.g., using FETs) and other similar sampling circuits may also be used.

In the digital version, each source driver chip has its own A-to-D converter, so it does the column amplifier sampling locally (thus avoiding any loading effects of a long analog return path), and returns the digital value to the TCON, over the same JTAG, I2C or SPI path as the command.

Figure 28:
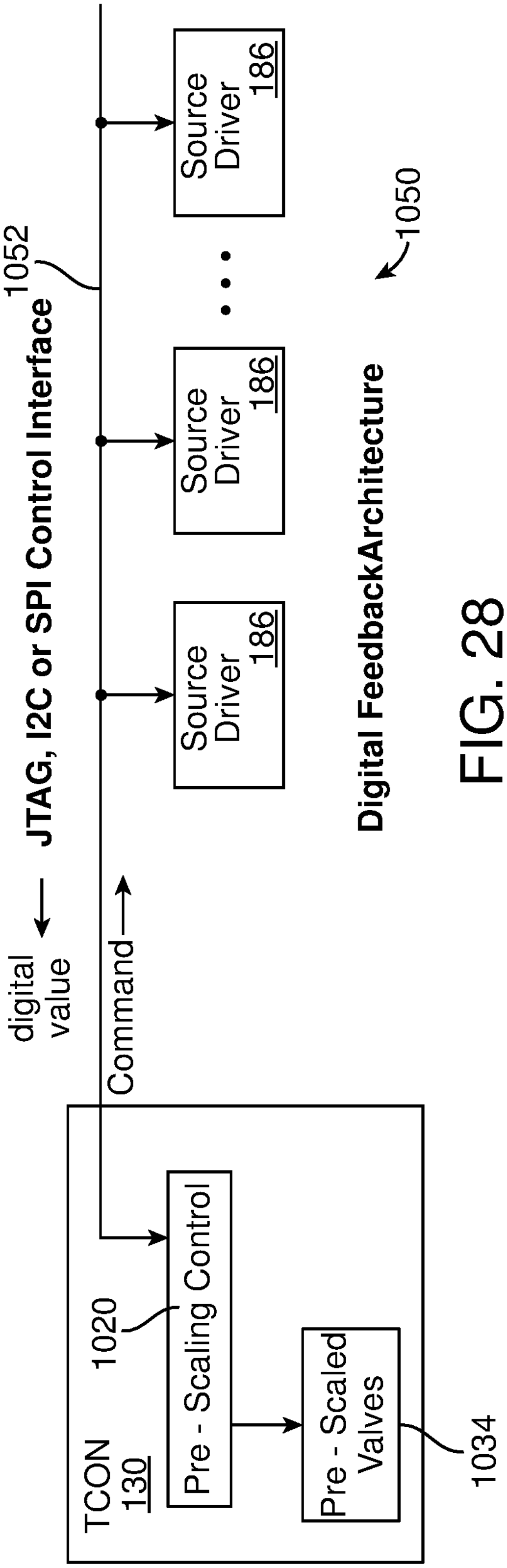
FIG. 28 shows a digital architecture for commanding and receiving feedback.

FIG. 28 shows a digital architecture 1050 for commanding and receiving feedback. A novel pre-scaling control unit 1020 of TCON 130 uses a protocol and communication lines such as JTAG, I2C or SPI 1052 (or similar) to send a command to a particular column driver (such as driver 916) in any of source drivers 186 to sample the analog value of the output from its amplifier in HV driver 914. Once sampled and converted, the digital value is also returned via line 1052 to control unit 1020 in the TCON. The control 1020 collects all values from all column amplifiers in a similar manner, processes all values, determines how to pre-scale each value in order to equalize them, and outputs the results into a pre-scaled values storage 1034 which stores actual values, an offset, a percentage, a ratio, etc. for each column. Values 1034 are then used during operation of the display (along with any other pre-scaling) to modify samples sent from the TCON to the display as is known in the art.

Figure 29:
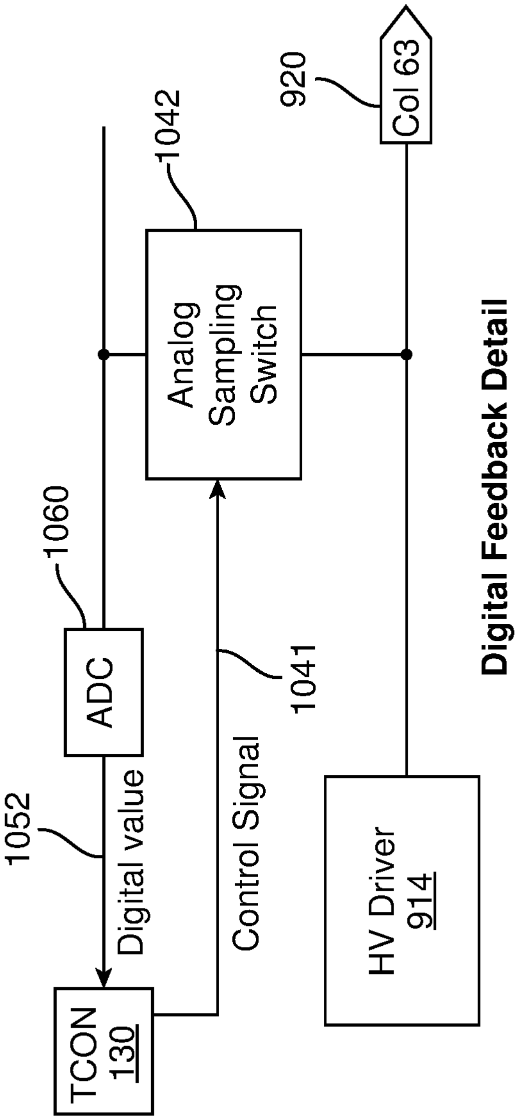
FIG. 29 shows latching a value from a column amplifier.

FIG. 29 shows sampling a value from a column amplifier. Shown is one HV driver 914 of a particular column (in this case, column 63 of SHA[0] from FIG. 21) which provides the output of its internal amplifier 1040 to analog switch 1042 which may be implemented and controlled as described above. Included is an ADC 1060 per source driver that converts the analog value from each column amplifier into a digital value to be sent back to the TCON. An ADC per HV driver or more may also be used (if the column voltage is reduced low enough to not damage ADC input circuits). The result is simple screen metrology. The display may self-calibrate after manufacture (pre sale during a production test), on user command, re-calibrate, or at other times. The ability to re-calibrate post sale is an advantage for having the additional hardware on-chip rather than performing calibration during production test.

In a separate embodiment, we model how the performance of a pixel varies with its neighbors (e.g. in the same column), we use the model to pre-scale sub-pixel inputs before they are sent to the source driver chips in order to produce the desired brightness. In general, it can be difficult for each sub-pixel to report its light output; such measurements require an elaborate testing setup. Instead, we measure the current through each sub-pixel at specific input values, we then use that measured current as a proxy for the light emitted in order to model the performance of a pixel (or sub-pixel).

In a variation, we do use real screen metrology to model the performance of the display, especially how neighboring sub-pixel values affect brightness (due to slew rate issues, etc.). We then use this model to pre-scale sub-pixel inputs before they are sent to the source driver chips in order to produce the desired brightness.

Transmission of Video Signals in Other Environments

Above are described embodiments for transmitting video signals to a display panel and within a display unit. The present invention also includes embodiments for transmission of video signals using SAVT in other environments such as directly from a camera or other image sensor, from an SoC or other processor, and for receiving SAVT signals at an SAVT receiver that is not necessarily integrated with a display panel (as shown above), such as at an SoC, at a processor of a computer, or at an SAVT receiver that is not integrated within a legacy display panel. U.S. patent application Nos. 63/611,274 and 63/625,473 (HYFYP017P2 and HYFYP018P) incorporated by reference above disclose examples of such other environments, respectively within a mobile device and within a vehicle.

Figure 30:
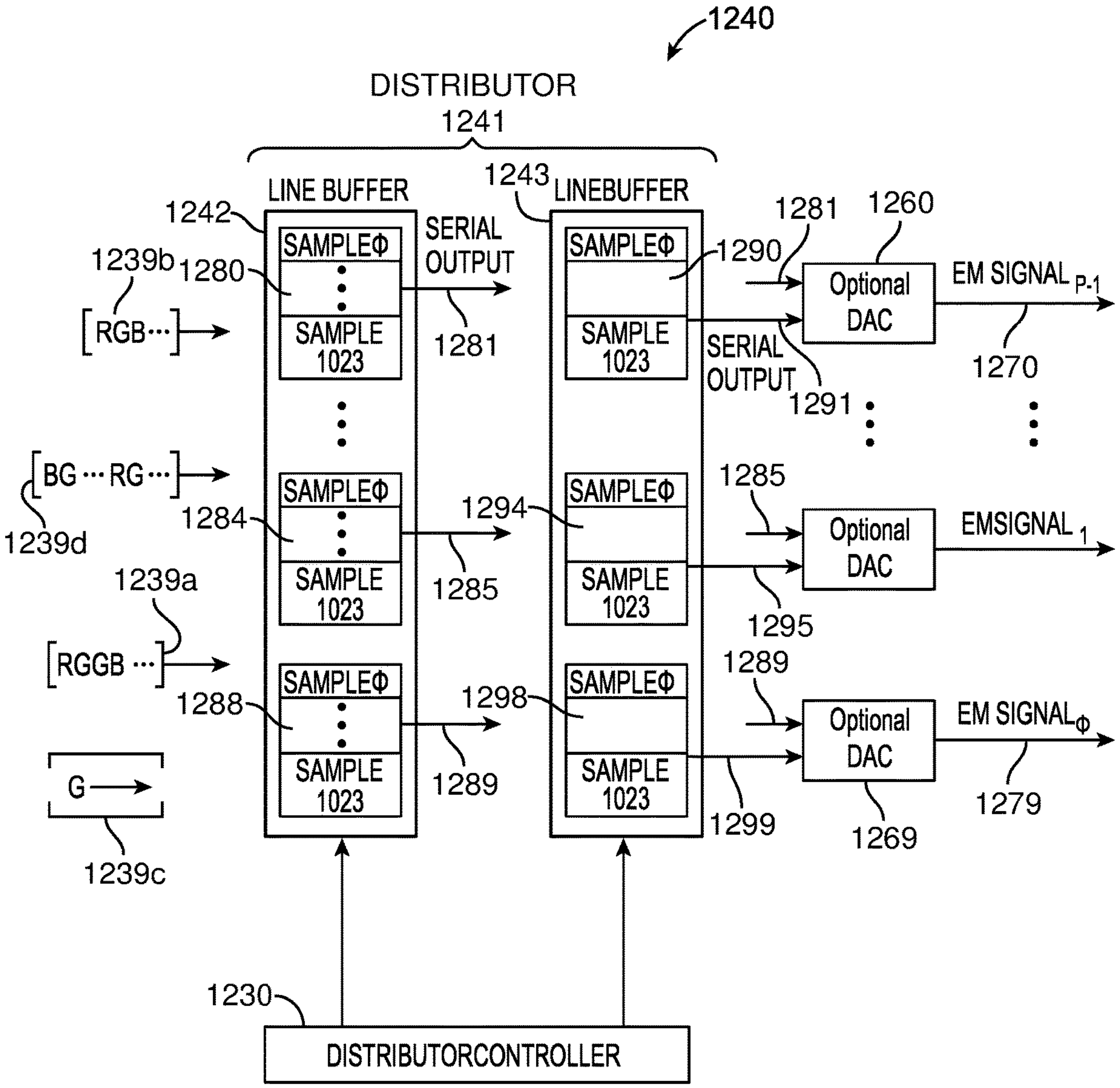
FIG. 30 illustrates an SAVT transmitter arranged to transmit a variety of video samples from a variety of sources.

FIG. 30 illustrates an SAVT transmitter 1240 arranged to transmit a variety of video samples from a variety of sources. Shown is a distributor 1241 that includes two line buffers 1242 and 1243 having input vectors, a distributor controller 1230, optional digital-to-analog converters 1260-1269, and an analog EM signal 1270-1279 output from each input vector, and may be implemented as shown and described in FIG. 2. Although outputs 1281 and 1291 indicate serial outputs, the outputs may be as described as in FIG. 2 and all samples may be output in parallel from the first buffer into the second buffer in one embodiment. As in FIG. 2, each DAC (if present) converts its received sample from the digital domain into a single analog level (if the DAC is not present the analog level is output from the line buffer), which may be transmitted as a differential pair of voltage signals having a magnitude that is proportional to its incoming digital value, the analog levels being sent serially as they are output from each DAC. Although not shown, image processors 250-259 may optionally be present depending upon the implementation and may be present after the buffers or preferably before.

In this example there are multiple EM pathways; there may be a single EM pathway or multiple EM pathways. Depending upon the implementation and design decisions, multiple outputs may increase performance but require more pathways. In order to have as few wires as possible from transmitter 1240, only a single pathway transporting a single EM signal 1270 may be used. SAVT transmitter 1240 may be implemented substantially as described above with respect to the transmitter of FIG. 2, although the inputs may be different, an image processor is not necessarily required (it may be implemented downstream in an SoC or other processor), and the DACs are optional. Further, the number of input vectors per line buffer and the number of samples N per input vector may vary widely depending upon the embodiment being implemented, the type of signals being input, bandwidth desired, whether the transmitter is implemented at the camera, on the SoC or other processor, etc. And, in order to have as few wires as possible from transmitter 1240, only a single pathway transporting a single EM signal 270 may be used.

Depending upon the embodiment discussed immediately below, analog RGGB video samples 1239*a* may be input, analog or digital RGB samples 1239*b* may be input, digital G samples 1239*c* may be input, or analog BGBG . . . RGRG samples 1239*d* may be input. If the samples are digital then DACs 1260-1269 are used. In general, the transmitter can accept analog or digital video samples from any color space used, and not necessarily RGB. The samples may arrive serially, e.g., R then G then B, or in parallel i.e., RGB in parallel as three separate signals. Using distributor 1241, we can reorder the samples as needed.

As mentioned, the inputs may vary depending upon the implementation. Input 1239*d* may originate as follows. An image sensor may output raw analog samples without using ADCs nor performing "demosaicing" using interpolation. Thus, the image sensor output is a continuous serial stream of time-ordered analog video samples, each representative of a pixel in a row, from left to right, in row-major order (for example), frame after frame, so long as the image sensor is sensing. Of course, a different ordering may also be used. When Bayer filtering is used, the samples are output by a row of BGBG . . . followed by a row of RGRG . . . , often referred to as RGGB format as each 2×2 pattern includes one each of RGGB. These rows of analog video samples 1239*d* are input into SAVT transmitter 1240, transmitted as EM signals 1270-1279 to the SAVT receiver of FIG. 31 and then output serially 1360 from that SAVT receiver. As the samples are still the raw data from the image sensor (i.e., the Bayer filter output from the sensor), downstream ADCs are used (if needed) and an ISP performs "demosaicing" using CFA interpolation and interpolates the "missing" color values at each location to create RGB samples per pixel.

Input 1239*c* may originate as follows. Raw analog samples coming from an image sensor are converted to digital in ADCs and then "demosaicing" is performed within an image signal processor (ISP), resulting in digital RGB samples per pixel. Only the green channel (i.e., one G sample per element of the array) from each set of RGB samples per pixel is selected and sent to become input 1239*c*. These rows of G digital video samples 1239*c* are input into SAVT transmitter 1240, transmitted as EM signals 1270-1279 to the SAVT receiver of FIG. 31 and then output serially from that SAVT receiver. Thus, the image latency on any display is greatly reduced providing immediate feedback to the viewer for applications where near-eye displays are used such as virtual reality, augmented reality, etc.

Alternatively, as only the green channel will be sent, interpolation only need be performed at the R and B elements of the sensor in order to obtain their G sample; no interpolation is needed at the G elements because the G sample already exists and the R and B sample at those G elements are not needed, thus making interpolation simpler and quicker. As the green channel corresponds to the luminance (or "luma") channel there will be no loss of perceived resolution, although any downstream display will show a monochrome image.

Input 1239*a* may originate as follows. We modify the readout from an image sensor and read at least two rows simultaneously. By way of example, the first two bottom rows of an image sensor are read out simultaneously which then outputs a serial stream of values such as BGRGBGRG . . . or GBGRGBGR . . . . The readout order is thus: first a blue value from the first row, then green and red values from the second row, followed by a green value from the first row, etc., resulting in a serial output BGRGBGRG. Or, an alternative readout order: first a green value from the second row, then blue and green values from the first row, followed by a red value from the second row, etc., resulting in serial output GBGRGBGR. Other readout orders may be used that intermix color values from two adjacent rows and the order of the pixel values may vary depending upon whether a particular row starts with a red, green or blue value.

Since two rows are read out at a time, every four values of those two rows (e.g. BG from the beginning of the first row and GR from the beginning of the second row i.e., two Gs an R and a B) are available to output serially, thus resulting in a serial pattern such as BGRG . . . or GBGR . . . as shown. After the first two rows are read out, then the next two rows are read out, etc. Other similar outputs are possible where each grouping of four values includes two green values, a red value and a blue value. The image sensor may be read starting from any particular corner, may be read from top-to-bottom or from bottom-to-top, may be read by rows or by columns, or in other similar manners. Thus, the output from the video source is a series of values BGRGBGRG . . . or GBGRGBGR or similar. "Demosaicing" may then occur in the analog domain in the SoC using this series of values without the need to convert these values to digital nor use any digital processing.

Such an ordering of color values facilitates interpolation in the analog domain. Other color spaces may be used in which reading out two or more rows at a time and intermixing the color values from different rows in the serial output also facilitates color interpolation in the analog domain. The video source including the image sensor then outputs a pattern such as BGRGBGRG . . . or GBGRGBGR, shown and referred to as "RGGB . . . " 1239_a_ in FIG. 30. These RGGB video samples are input serially into transmitter 1240 and then transmitted as EM signals 1270-1279 to the SAVT receiver of FIG. 31 and then output serially from that SAVT receiver.

Input 1239_b_ may originate as follows. As shown in FIG. 2, digital RGB samples may be input; analog RGB samples 1239_b_ may also be input as shown in FIG. 30. These analog RGB samples may originate within a processor that has performed demosaicing in the analog domain upon raw image sensor output, may originate within a processor that has received digital RGB samples and has converted them into analog RGB samples, or may originate in another manner. These analog RGB video samples are input into transmitter 1240 and then transmitted as EM signals 1270-1279 to the SAVT receiver of FIG. 31 and then output serially from that SAVT receiver.

Figure 31:
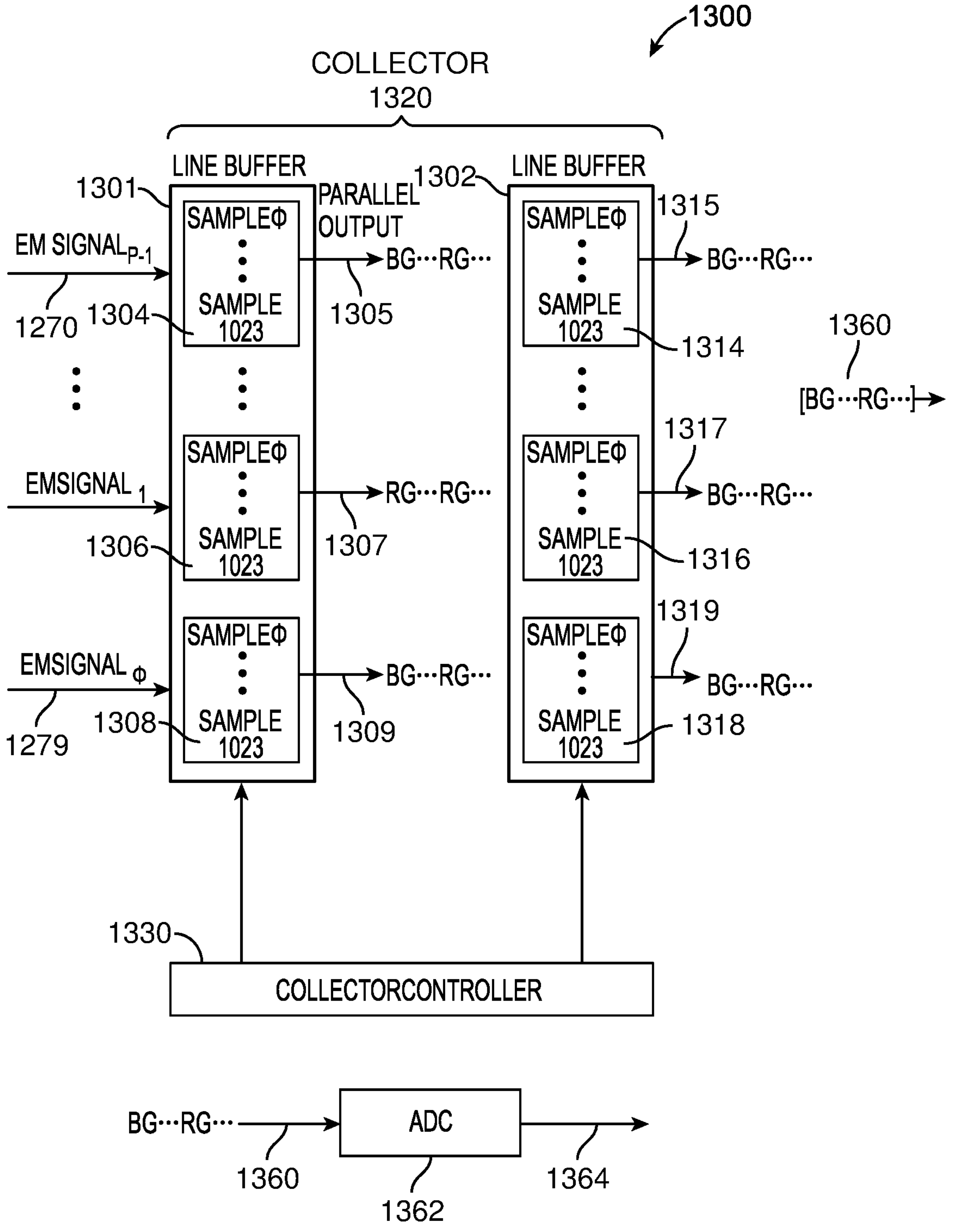
FIG. 31 illustrates an SAVT receiver at an SoC, processor, legacy display, or other location.

FIG. 31 illustrates an SAVT receiver 1300 at an SoC, processor, legacy display, or other location. The receiver receives any number of EM signals 1270-1279 and inputs those into a collector 1320 that has two line buffers 1301 and 1302. Similar to the distributor of the SAVT transmitter of FIG. 30, each line buffer has any number of output vectors 1304, 1306, 1308 (or 1314, 1316, 1318), each vector holding any number of video samples corresponding to the input vectors (e.g. N=1024). In operation, each output vector 1304-1308 of the first line buffer 1301 is filled with samples from its corresponding EM signal 1270-1279 and while buffer 1301 is outputting its samples (via outputs 1305, 1307, 1309) into receiver output 1360 the second line buffer 1302 is being filled from corresponding EM signals 1270-1279. Once the first line buffer is empty it begins refilling while the second line buffer outputs into receiver output 1360.

As with the SAVT transmitter of FIG. 30, there are preferably two line buffers but more may be used if necessary and the buffer length may be adjusted as mentioned. In the case of collector 1320, the output is serial, but the output from each buffer may be in parallel (i.e., all N samples at a time from each output vector) and may take a longer time to output per sample than does the input sampling. Thus, if you output 100 samples at a time, you can transfer to output 100 times more slowly than the input sampling (assuming the input sampling were one at a time).

The collector controller 1330 sequences the loading of samples from the inputs 1270 . . . 1279, as well as controls the timing for unloading the samples for further processing. Since the input stream is continuous, the collector controller loads samples into one line buffer while the other line buffer samples are transferred to the output for further processing.

Shown is an embodiment of the receiver suitable for use with the embodiment discussed in FIG. 30 in which rows of an image sensor are output serially, sent via the SAVT transmitter 1240 (using input 1239_d_, i.e., BG . . . RG . . . ) to collector 1320, and then output from the collector serially in the same format as input, namely, BG . . . RG . . . . Once output, the samples are sent on for further processing or display. As mentioned, the output from the collector may be in parallel if parallel input to a processor is desired. Whichever permutation is used in the corresponding SAVT transmitter in order to distribute incoming samples into the line buffers, the inverse permutation is used in the SAVT receiver such that receiver output 1360 outputs samples in the order they were received at the SAVT transmitter (i.e., as received at 1239_d_).

Although SAVT receiver 1300 only shows BG . . . RG . . . outputs, it may also receive and output samples input using the other embodiments discussed in FIG. 30. Thus, if inputs 1239_a_ are input into the SAVT transmitter then output 1360 is RGGB . . . samples, and if inputs 1239_c_ are input into the SAVT transmitter then output 1360 is G . . . samples. And, if inputs 1239_b_ are input into the SAVT transmitter then output 1360 is RGB . . . samples.

As output 1360 are analog samples, an ADC 1362 or ADCs may be used if desired to convert the samples to digital. Thus, each output vector may output its samples one at a time via analog-to-digital converter (ADC) 1362 in order to provide a continuous stream of digital samples 1364.

Additional Embodiments

The present invention includes these additional embodiments.

C1. An apparatus that integrates a DDIC-TCON (Display Driver Integrated Circuit-Timing Controller) with a transmitter, said apparatus comprising:
- a distributor arranged to receive a plurality of streams of digital video samples originating at a system-on-chip of a mobile telephone and to distribute said digital video samples into a plurality of input vectors according to a predetermined permutation;
- a plurality of digital-to-analog converters (DACs), each DAC arranged to receive said digital video samples from said input vector and to convert said digital video samples into a series of analog video samples and to output said series of analog video samples on an electromagnetic pathway to a display panel of said mobile telephone; and
- gate driver control signals that are output to gate drivers of said display panel.

C2. A transmitter as recited in claim C1 wherein said distributor further includes
- a first line buffer that stores said plurality of input vectors; and
- a second line buffer that stores a plurality of second input vectors, wherein said distributor being further arranged to alternately distribute a line of said digital video samples between said input vectors of said first line buffer and said second input vectors of said second line buffer, and wherein said image processors alternately read from said first line buffer while said distributor writes into said second line buffer and read from said second line buffer while said distributor writes into said first line buffer.

C3. A transmitter as recited in claim C1 wherein said digital video samples distributed into said input vectors make up a line of an image.

C4. A transmitter as recited in claim C1 wherein said digital video samples are distributed into said input vectors at a first frequency and wherein said digital video samples are serially output from each of said input vectors at a second frequency different from said first frequency.

C8. An integrated transmitter and timing controller as recited in claim C1 wherein said apparatus is located within about 2 cm of said system-on-chip.

C9. An apparatus as recited in claim C1 wherein said apparatus is integrated within a single integrated circuit of said mobile telephone.

C10. A transmitter as recited in claim C9 wherein said apparatus is also integrated with said system on-chip of said mobile telephone.

C11. An apparatus as recited in claim C1 further comprising:

a plurality of image processors, each image processor arranged to serially read from one of said input vectors said digital video samples of said one input vector and to perform at least Gamma correction on said digital video samples of said one input vector.

D1. An analog DDIC-SD (Display Driver Integrated Circuit-Source Driver) of a mobile telephone comprising:

an input terminal arranged to receive an analog electromagnetic signal over an electromagnetic pathway that includes a continuous series of analog video samples;

a plurality of sampling amplifiers each arranged to sample exclusively a portion of said analog video samples and to write said portion of analog video samples into positions in a storage array designated for said each sampling amplifier; and a plurality of column drivers each arranged to read one of said analog video samples from one of said positions in said storage array, to amplify said one of said analog video samples and to drive said one of said amplified analog video samples into a column of a display panel of said mobile telephone.

D2. An analog DDIC-SD as recited in claim D1 further comprising a second storage array having positions designated for each sampling amplifier, wherein said sampling amplifiers being further arranged to alternately write said respective portions of said analog video samples into said storage array or into said second storage array, and wherein said column drivers alternately read from said storage array while said sampling amplifiers write into said second storage array and read from said second storage array while said sampling amplifiers write into said storage array.

D3. An analog DDIC-SD as recited in claim D2 further comprising:

control logic circuitry arranged to enable each of said sampling amplifiers to sample said portion of said analog video samples, to enable said sampling amplifiers to write into said storage array or into said second storage array, and to enable said column drivers to read from said storage array or from said second storage array.

D3. An analog DDIC-SD as recited in claim D1 wherein a portion of said analog video samples are used for synchronization and are not driven into columns of said display panel.

D4. An analog DDIC-SD as recited in claim D1 wherein said analog DDIC-SD does not include any digital-to-analog-converters (DACs) used to convert video samples.

D5. An analog DDIC-SD as recited in claim D2 wherein said column drivers are further arranged to read in parallel from said storage array when said storage array is full or to read in parallel from said second storage array when said second storage array is full.

D6. An analog DDIC-SD as recited in claim D1 wherein said series of analog video samples arrive in a predetermined permutation that dictates that each sampling amplifier outputs its respective portion of analog video samples to contiguous storage locations in said storage array.

D7. An analog DDIC-SD as recited in claim D1 wherein said electromagnetic signal includes control signals used for synchronization and are not driven into columns of said display panel, said source driver further comprising:

a sampling amplifier dedicated to sampling said control signals.

F1. A video transport apparatus comprising:

a transmitter including a distributor arranged to receive a stream of digital video samples from a system-on-chip of a mobile telephone and to distribute said digital video samples into a plurality of input vectors in a line buffer according to a predetermined permutation, and a digital-to-analog converter (DAC) per input vector, each DAC arranged to receive serially from its corresponding input vector the digital video samples from said corresponding input vector and to convert said digital video samples into a series of analog video samples;

a plurality of electromagnetic pathways, each arranged to transport one of said series of analog video samples to a display panel of said mobile telephone; and, a source driver array including a source driver corresponding to each of said DACs, each source driver including:

a collector arranged to receive said series of analog video samples from said each DAC and to store said analog video samples of said corresponding input vector; and a plurality of column drivers arranged to receive said stored analog video samples in parallel from said collector and to amplify each of said stored analog video samples onto a column of said display panel.

F2. An apparatus as recited in claim F1 wherein said transmitter is integrated with a DDIC-TCON, said apparatus further comprising:

gate driver control signals that are output to gate drivers of said display panel.

F3. An apparatus as recited in claim F2 wherein said transmitter is located within about 2 cm of said system-on-chip.

F4. An apparatus as recited in claim F2 wherein said transmitter is integrated within a single integrated circuit of said mobile telephone.

F5. An apparatus as recited in claim F2 wherein said transmitter is also integrated with said system on-chip of said mobile telephone.

F6. An apparatus as recited in claim F1 wherein each source driver is an analog DDIC-SD (Display Driver Integrated Circuit-Source Driver) of a mobile telephone.

F7. An apparatus as recited in claim F6 wherein said analog DDIC-SD does not include any digital-to-analog-converters (DACs) used to convert video samples.

I1. A source driver of a display unit comprising:

an input terminal that receives analog sample values representing a video stream;

a collector arranged to receive said analog sample values from said input terminal, to store said analog sample values into a storage array, and to output said analog sample values in parallel, said input terminal and said collector being implemented outside an edge of a display panel of said display unit; and a plurality of column drivers that input said analog sample values in parallel and output voltages to columns of said display panel, wherein said plurality of column drivers being implemented using at least transistors on a glass substrate of said display panel.

I2. A source driver as recited in claim I1 wherein said analog sample values are an ordered sequence of continuous-amplitude analog levels.

I3. A source driver as recited in claim I1 wherein said plurality of column drivers are located on said glass substrate of said display panel between a pixel display area and a perimeter of said glass substrate.

I4. A source driver as recited in claim I1 wherein said source driver does not include a digital-to-analog converter for converting video samples.

I5. A source driver as recited in claim I1 wherein said transistors are able to operate at a clock frequency required by said column drivers.

I6. A source driver as recited in claim I5 wherein said transistors are thin-film transistors (TFTs), and are either low-temperature poly-silicon (LTPS) transistors or are indium-gallium-zinc oxide (IGZO) transistors.

I7. A source driver as recited in claim I1 wherein pixels of said display panel are implemented using the same type of transistors used to implement said column drivers.

I8. A source driver as recited in claim I1 wherein said display unit is a display of a mobile telephone.

I9. A source driver as recited in claim I1 wherein each of said column drivers includes a high-voltage driver.

I10. A source driver as recited in claim I9 wherein each of said column drivers further includes a level converter, each level converter operating at least to shift said output voltage of said column driver.

I11. A source driver as recited in claim I1 wherein said collector is a two-stage collector.

J1. A source driver of a display unit comprising:

an input terminal that receives analog sample values representing a video stream;

a collector arranged to receive said analog sample values from said input terminal, to store said analog sample values into a storage array, and to output said analog sample values in parallel; and a plurality of column drivers that input said analog sample values in parallel and output voltages to columns of said display panel, wherein said collector and said plurality of column drivers being implemented using at least transistors on a glass substrate of said display panel.

J2. A source driver as recited in claim J1 wherein said analog sample values are an ordered sequence of continuous-amplitude analog levels.

J3. A source driver as recited in claim J1 wherein said collector and said plurality of column drivers are located on said glass substrate of said display panel between a pixel display area and a perimeter of said glass substrate.

J4. A source driver as recited in claim J1 wherein said source driver does not include a digital-to-analog converter for converting video samples.

J5. A source driver as recited in claim J1 wherein said transistors are able to operate at a first clock frequency required by said column drivers and at a second clock frequency required by said collector.

J6. A source driver as recited in claim J5 wherein said transistors are thin-film transistors (TFTs), and are either low-temperature poly-silicon (LTPS) transistors or are indium-gallium-zinc oxide (IGZO) transistors.

J7. A source driver as recited in claim J1 wherein pixels of said display panel are implemented using the same type of transistors used to implement said collector and said column drivers.

J8. A source driver as recited in claim J1 wherein said display unit is a display of a mobile telephone.

J9. A source driver as recited in claim J1 wherein each of said column drivers includes a high-voltage driver.

J10. A source driver as recited in claim J9 wherein each of said column drivers further includes a level converter, each level converter operating at least to shift said output voltage of said column driver.

J11. A source driver as recited in claim J1 wherein said input terminal is implemented outside an edge of a display panel of said display unit.

J12. A source driver as recited in claim J1 wherein said input terminal is implemented on said glass substrate of said display panel.

J13. A source driver as recited in claim J1 wherein said collector is a two-stage collector.

K1. A display unit comprising:

a display panel having a glass substrate; and a plurality of source drivers, each source driver including a collector arranged to receive analog sample values representing a video stream, to store said analog sample values into a storage array, and to output said analog sample values in parallel; and a plurality of column drivers that input said analog sample values in parallel and output voltages to columns of said display panel.

K2. A display unit as recited in claim K1 wherein said collector of each source driver is implemented outside an edge of said display panel of said display unit, wherein said column drivers are implemented using at least transistors on said glass substrate of said display panel, and wherein said transistors are able to operate at a clock frequency required by said column drivers.

K3. A display unit as recited in claim K1 wherein said collector and said column drivers of said each source driver are implemented using at least transistors on said glass substrate of said display panel, and wherein said transistors are able to operate at clock frequencies required by said collector and by said column drivers.

K4. A display unit as recited in claim K1 wherein said analog sample values are an ordered sequence of continuous-amplitude analog levels.

K5. A display unit as recited in claim K2 wherein said plurality of column drivers of said each source driver are located on said glass substrate of said display panel between a pixel display area and a perimeter of said glass substrate.

K6. A display unit as recited in claim K1 wherein said each source driver does not include a digital-to-analog converter for converting video samples.

K7. A display unit as recited in claim K2 wherein said transistors are thin-film transistors (TFTs), and are either low-temperature poly-silicon (LTPS) transistors or are indium-gallium-zinc oxide (IGZO) transistors.

K8. A display unit as recited in claim K3 wherein said transistors are thin-film transistors (TFTs), and are either low-temperature poly-silicon (LTPS) transistors or are indium-gallium-zinc oxide (IGZO) transistors.

K9. A display unit as recited in claim K1 wherein said display unit is a display of a mobile telephone.

K10. A source driver as recited in claim K1 wherein each collector of said each source driver is a two-stage collector.

P1. A feedback apparatus of a source driver of a display unit, said feedback apparatus comprising:

an analog switch having an input connected to the output of an amplifier of a column driver of a display panel of said display unit, a control input arranged to receive a control signal from a timing controller of said display unit, and an output connected to an analog line connected to said timing controller, wherein said analog switch being arranged to latch a voltage value of said amplifier upon receipt of said control signal and to deliver said voltage value to said timing controller.

P2. A feedback apparatus as recited in claim P1 wherein said control signal commands said analog switch to latch said voltage value when said column driver is driving a column of said display.

P3. A feedback apparatus as recited in claim P1 further comprising:

an analog-to-digital converter located in between said output of said analog switch and said timing controller, said analog-to-digital converter being arranged to convert said voltage value from said output into a digital voltage value to be delivered to said timing controller.

P4. A feedback apparatus as recited in claim P1 wherein said voltage value delivered to said timing controller is an analog voltage value.

P5. A source driver of said display unit comprising:

a feedback apparatus as recited in claim P1 for each column of said display panel.

Q1. A method for providing feedback from a source driver to a timing controller of a display unit, said method comprising:

sending, from said timing controller, a command to a column driver of said source driver to latch a voltage value output by an amplifier of said column driver to a display panel of said display unit;

latching said voltage value at an output of said amplifier; and receiving said voltage value at said timing controller and storing said voltage value.

Q2. A method as recited in claim Q1 wherein said received voltage value is an analog voltage value, said method further comprising:

converting said analog voltage value within said timing controller into a digital voltage value and storing said digital voltage value.

Q3. A method as recited in claim Q1 wherein said voltage value is an analog voltage value at said output of said amplifier, said method further comprising:

converting, within said source driver, said analog voltage value into a digital voltage value; and receiving said digital voltage value at said timing controller.

Q4. A method as recited in claim Q3, said method further comprising:

sending said command to said column driver via a digital control interface; and receiving said digital voltage value at said timing controller via said digital control interface.

Q5. A method as recited in claim Q2, said method further comprising:

sending said command to said column driver via a digital control interface; and receiving said analog voltage value via an analog line.

Q6. A method as recited in claim Q1, said method further comprising:

performing said sending, said latching and said receiving for a plurality of column drivers; and pre-scaling output voltage values of said timing controller destined for columns of said display panel using said stored voltage values.

R1. A transmitter comprising:

a distributor arranged to receive a stream of video samples originating at an image sensor and to distribute a first selection of said digital video samples into a first line buffer as a plurality of first input vectors according to a predetermined permutation and to distribute a subsequent selection of said video samples into a second line buffer as a plurality of second input vectors according to said predetermined permutation, wherein said distributor being further arranged to alternately distributing selections of said video samples between said first line buffer and said second line buffer; and a plurality of output ports, each output port arranged to alternately read from one of said first input vectors of said first line buffer while said distributor writes into said second line buffer and to read from one of said second input vectors of said second line buffer while said distributor writes into said first line buffer, and to output a series of analog levels corresponding to said video samples of said one of said first or second input vectors as an electromagnetic signal.

R2. A transmitter as recited in claim R1 wherein said video samples are analog RGB video samples.

R3. A transmitter as recited in claim R1 wherein said video samples are digital RGB video samples, said transmitter further comprising:

a plurality of digital-to-analog converters (DACs), each DAC arranged to receive said digital RGB video samples from one of said first or second input vectors, to convert said digital RGB video samples into analog video samples and to output said analog video samples to one of said output ports.

R4. A transmitter as recited in claim R1 wherein said video samples are raw analog BGRG video samples.

R5. A transmitter as recited in claim R1 wherein said video samples are raw analog RGGB video samples output from said image sensor in modified form.

R6. A transmitter as recited in claim R1 wherein said video samples are digital G video samples, said transmitter further comprising:

a plurality of digital-to-analog converters (DACs), each DAC arranged to receive said G digital video samples from one of said first or second input vectors, to convert said digital video samples into analog video samples and to output said analog video samples to one of said output ports.

S1. A receiver comprising:

a plurality of input terminals that each receive an electromagnetic signal over an electromagnetic pathway, said each electromagnetic signal including a series of analog levels representing analog video samples;

a collector arranged to collect said analog video samples of said each electromagnetic signal into one of a plurality of first output vectors in a first line buffer and into one of a plurality of second output vectors in a second line buffer, wherein said collector being further arranged to alternate collecting selections of said analog video samples between said first line buffer and said second line buffer, wherein said collector being further arranged to output analog video samples from said first output vectors of said first line buffer according to a predetermined permutation while said second line buffer is being filled and to output analog video samples from said second output vectors of said second line buffer according to said predetermined permutation while said first line buffer is being filled, whereby said receiver continuously outputs a stream of said analog video samples.

S2. A source driver as recited in claim S1 further comprising:

a collector controller arranged to collect said input analog levels from said electromagnetic signals into said first and second line buffers and to output said analog levels from said first and second line buffers according to said predetermined permutation.

S3. A receiver as recited in claim S1 wherein said first line buffer outputs analog video samples from said first output vectors once said first line buffer is full.

S4. A receiver as recited in claim S1 wherein said receiver does not include any digital-to-analog-converters (DACs) used to convert video samples.

S5. A receiver as recited in claim S1 wherein said receiver includes at least one analog-to-digital converter) to convert said stream of analog video samples to digital video samples.

G1. A method of sending a command to a source driver of a display unit:

sending a control sequence from a transmitter within a display unit to a source driver of said display unit, said control sequence being an MFM (modified frequency modulated)-encoded sequence;

introducing an MFM flag into said control sequence that indicates to said source driver that at least one command follows said MFM flag; and after said MFM flag, sending at least one video synchronization command in said control sequence to said source driver.

G2. A method as recited in claim G1 further comprising:

performing vertical or horizontal synchronization of an image displayed on a display panel of said display unit using said video synchronization command.

G3. A method as recited in claim G1 further comprising:

at said transmitter, inserting said control sequence into a stream of analog video samples destined for said source driver such that said control sequence is received at a single input amplifier of said source driver.

G4. A method as recited in claim G1 further comprising:

introducing said MFM flag into said control sequence at power on said display unit.

G5. A method as recited in claim G1 further comprising:

sending said control sequence including said introduced MFM flag on all input channels of said source driver until resynchronization has occurred; and after resynchronization, only sending said control sequence on a single input channel of said source driver.

G6. A method as recited in claim G1 further comprising:

sending said control sequence along with said introduced MFM flag to all source drivers of said display unit at the same time.

H1. A method of receiving a command at a source driver of a display unit:

receiving a control sequence from a transmitter within a display unit at a source driver of said display unit, said control sequence being an MFM (modified frequency modulated)-encoded sequence;

receiving and recognizing an MFM flag of said control sequence that indicates to said source driver that at least one command follows said MFM flag; and after said MFM flag, interpreting the next MFM cells of said control sequence as a video synchronization command at said source driver.

H2. A method as recited in claim H1 further comprising:

performing vertical or horizontal synchronization of an image displayed on a display panel of said display unit using said video synchronization command.

H3. A method as recited in claim H1 wherein said control sequence is received at a single input amplifier of said source driver.

H4. A method as recited in claim H1 further comprising:

receiving said MFM flag of said control sequence at power on said display unit.

H5. A method as recited in claim H1 wherein said source driver receives said control sequence including said introduced MFM flag on all input channels of said source driver until resynchronization has occurred; and after resynchronization, only receiving said control sequence on a single input channel of said source driver.

H6. A method as recited in claim H1 further comprising:

receiving said control sequence along with said introduced MFM flag at all source drivers of said display unit at the same time.

L1. A method for performing phase alignment to determine a source driver sampling phase, said method comprising:

receiving at a source driver of a display unit a command to enter a phase alignment mode;

receiving a synchronization stream of at least positive pulses having a first amplitude;

setting an upper threshold of an upper comparator that receives said synchronization stream such that said upper comparator triggers upon receiving said positive pulses;

rotating a sampling phase of said positive pulses toward the trailing edge of said positive pulses until said upper comparator does not trigger at a particular sampling phase; and when it is determined that said upper comparator does not trigger, rotating said sampling phase back from said particular sampling phase by at least one tap and setting said rotated-back sampling phase as a source driver sampling phase for sampling incoming analog video samples at said source driver.

L2. A method as recited in claim L1, wherein said synchronization stream includes said positive pulses alternating with second positive pulses having a second amplitude smaller than said first amplitude, said method further comprising: setting said upper threshold of said upper comparator by adjusting said upper threshold such that said upper comparator triggers on said positive pulses but not on said second positive pulses.

L3. A method as recited in claim L1 for the comprising:
sampling, by said source driver, at least one incoming analog video sample using said source driver sampling phase and displaying said incoming analog video sample on a display panel of said display unit.

L4. A method as recited in claim L1 wherein said source driver includes a central comparator that indicates whether a pulse of said synchronization stream is positive or negative, said method further comprising:
only rotating said sampling phase back from said particular sampling phase when a result of said central comparator or does not coincide with a result of said upper comparator.

L5. A method as recited in claim L1 wherein said command is an MFM (modified frequency modulation)-encoded command and said synchronization stream is an MFM-encoded stream.

L6. A method as recited in claim L1 wherein said command and said synchronization stream are all received on a single channel of said source driver.

L7. A method as recited in claim L1 wherein said synchronization stream includes negative pulses alternating with said positive pulses, said negative pulses having a negative amplitude, said method further comprising:
setting a lower threshold of a lower comparator that receives said synchronization stream such that said lower comparator triggers upon receiving said negative pulses;
rotating a second sampling phase of said negative pulses toward the trailing edge of said negative pulses until said lower comparator does not trigger at a particular second sampling phase;
when it is determined that said lower comparator does not trigger, rotating said second sampling phase back from said particular second sampling phase by at least one tap and setting said rotated-back second sampling phase as a source driver second sampling phase; and
determining that the average of said rotated back sampling phase and said rotated back second sampling phase as the source driver sampling phase for sampling incoming analog video samples at said source driver.

M1. A sample phase adjustment circuit of a source driver of a display unit comprising:
an input reference clock;
a phase adjustment control;
a phase selector arranged to move a sampling phase of said reference clock forward when said phase adjustment control indicates that sampling has occurred before a control sequence of video samples received at said source driver and arranged to move a sampling phase of said reference clock backward when said phase adjustment control indicates that sampling has occurred after a control sequence of said video samples received at said source driver; and
an output sampling clock having a sampling phase output by said phase selector, said output sampling clock being sent to amplifiers of said source driver that receive said video samples.

M2. A sample phase adjustment circuit as recited in claim M1 further comprising:
an input clock cycle skip control arranged to cause said sample phase adjustment circuit to skip a cycle of said reference clock.

N1. A method of sending a command to a source driver of a display unit, said method comprising:
receiving a stream of samples at a source driver of a display unit;
interleaving said samples into a plurality of channels;
searching for an MFM flag in one of said channels; and
when it is determined that said MFM flag is not found in said one channel, searching a next one of said channels and determining that said MFM flag is present in said next channel.

N2. A method as recited in claim N1 further comprising:
implementing a clock cycle skip in order to search said next channel for said MFM flag.

N3. A method as recited in claim N1 further comprising:
sending said de-interleaved samples to a plurality of sample and hold amplifiers, each SH amplifier implementing one of said channels.

N4. A method as recited in claim N1 further comprising:
after determining that said MFM flag is present in said next channel, identifying a command for a display panel of said display unit after said MFM flag in said next channel.

N5. A method as recited in claim N1 further comprising:
after determining that said MFM flag is present in said next channel, performing sample phase alignment using samples received on said next channel.

O1. A method of performing phase alignment within a display unit for sampling video signals, said method comprising:
receiving a plurality of video samples and control samples at a source driver of said display unit, said video samples arriving immediately before said control samples having a different analog level than video samples arriving immediately after said control samples;
changing a sampling phase of one of said control samples by a phase step in order to sample one of said samples;
when it is determined that sampling has occurred in a sample previous to said control sample, skipping a clock cycle in order to sample in said control sample; and
when it is determined that sampling has occurred in a sample after said control sample, moving said sampling phase back by at least one phase step.

O2. A method as recited in claim O1 further comprising:
after skipping said clock cycle in order to sample in said control sample, moving said sampling phase forward by at least one phase step.

O3. A method as recited in claim O1 further comprising:
determining that said sampling has occurred in a previous sample or determining that said sampling has occurred in a sample after said control sample by using a single comparator.

O4. A method as recited in claim O1 further comprising:
after skipping said clock cycle or moving said sampling phase back, sending said sampling phase to each of a plurality of amplifiers that sample said video samples and said control samples.

We claim:

1. A display unit comprising:
a transmitter including a distributor and a plurality of digital-to-analog converters,
said distributor arranged to receive a stream of digital video samples and to distribute said digital video samples into a plurality of input vectors according to a predetermined permutation, and one of said digital-to-analog converters (DAC) per input vector, each DAC arranged to receive serially from its corresponding input vector the digital video samples from said corresponding input vector and to convert said digital video samples into a series of analog video samples;

a plurality of electromagnetic pathways, each arranged to transport one of said series of analog video samples to a display panel of said display unit; and, a source driver array including a source driver corresponding to each of said DACs, each source driver including a collector arranged to receive said series of analog video samples from said each DAC and to store said analog video samples of said corresponding input vector, and a plurality of column drivers arranged to receive said stored analog video samples in parallel from said collector and to amplify each of said stored analog video samples onto a column of said display panel, wherein said each source driver does not decode said analog video samples.

2. A display unit as recited in claim 1 wherein said predetermined permutation permits each collector to store its respective analog video samples into contiguous storage locations.

3. A display unit as recited in claim 1 wherein said predetermined permutation permits that a sampling amplifier of said collector samples exclusively control signals.

4. A display unit as recited in claim 1 wherein said received digital video samples are gamma-corrected digital video samples.

5. A display unit as recited in claim 1, wherein said each corresponding source driver does not convert said digital video samples into said analog video samples.

6. A display unit as recited in claim 1, wherein said transmitter is located separately in said display unit from one or more integrated circuits that include said source drivers.

7. A display unit as recited in claim 1, wherein conversion of said digital video samples to said analog video samples occurs within said transmitter.

8. A display unit as recited in claim 1, wherein said distributor further includes a first line buffer that stores said plurality of input vectors; and a second line buffer that stores a plurality of second input vectors, wherein said distributor being further arranged to alternately distribute a line of said digital video samples between said input vectors of said first line buffer and said second input vectors of said second line buffer, and wherein said DACs alternately read from said first line buffer while said distributor writes into said second line buffer and read from said second line buffer while said distributor writes into said first line buffer.

9. A display unit as recited in claim 1, wherein said each DAC being further arranged to serially output said series of analog video samples on one of said electromagnetic pathways to said corresponding source driver of said display panel.

10. A display unit as recited in claim 1, wherein said each DAC not being located in said corresponding source driver.

11. A display unit as recited in claim 1, wherein said each series of analog video samples includes all samples of a first color followed by all samples of a second color of a line of said display panel.

12. A display unit video transport apparatus as recited in claim 1, wherein each of said digital video samples represents an amount of light in a color space.

13. A display unit as recited in claim 6, wherein said transmitter is located separately from said display panel of said display unit.

14. A display unit as recited in claim 12, wherein each of said digital video samples is a sub-pixel value.

15. A display unit as recited in claim 1 wherein said transmitter is integrated with a system-on-chip of said display unit.

16. A display unit as recited in claim 1 wherein said each collector further comprises a storage array and a second storage array, wherein said collector being further arranged to alternately write said respective portions of said analog video samples into said storage array or into said second storage array, and wherein said column drivers alternately read from said storage array while said collector stores into said second storage array and read from said second storage array while said collector stores into said storage array.

* * * * *